US012706642B2

(12) United States Patent
Gao et al.

(10) Patent No.: US 12,706,642 B2
(45) Date of Patent: Aug. 11, 2026

(54) CHANNEL STATE INFORMATION REPORTING METHOD AND RELATED DEVICE

(71) Applicant: HUAWEI TECHNOLOGIES CO., LTD., Shenzhen (CN)

(72) Inventors: Xiang Gao, Beijing (CN); Kunpeng Liu, Beijing (CN); Leiming Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 374 days.

(21) Appl. No.: 18/222,078

(22) Filed: Jul. 14, 2023

(65) Prior Publication Data

US 2023/0361833 A1 Nov. 9, 2023

Related U.S. Application Data

(63) Continuation of application No. PCT/CN2021/072332, filed on Jan. 15, 2021.

(51) Int. Cl.
*H04B 7/06* (2006.01)

(52) U.S. Cl.
CPC ......... *H04B 7/0626* (2013.01); *H04B 7/0634* (2013.01)

(58) Field of Classification Search
CPC .... H04B 7/0626; H04B 7/0634; H04B 7/048; H04W 72/046; Y02D 30/70
See application file for complete search history.

(56) References Cited

U.S. PATENT DOCUMENTS

2019/0363760 A1* 11/2019 Wu ...................... H04B 7/0469
2020/0295812 A1* 9/2020 Rahman ............... H04B 7/0695
2022/0263560 A1* 8/2022 Cai ...................... H04B 7/0456

FOREIGN PATENT DOCUMENTS

WO WO-2020253815 A1 * 12/2020 ............ H04B 7/065

* cited by examiner

*Primary Examiner* — Habte Mered
(74) *Attorney, Agent, or Firm* — Rimon PC

(57) ABSTRACT

Embodiments of this application provide for a channel state information reporting method and a related device. In the method, indication information may be generated and sent. In the indication information, a first group of indication information includes reference amplitude indication information corresponding to each spatial layer, and differential amplitude indication information and phase indication information of X weighting coefficients, and a second group of indication information includes differential amplitude indication information and phase indication information of Y weighting coefficients. Values of X and Y are related to a first parameter, and a sum of X and Y is equal to $K^{NZ}-v$. It can be learned that the quantity of weighting coefficients included in each of the first group of indication information and the second group of indication information is determined based on the first parameter.

20 Claims, 6 Drawing Sheets

$max(K^{NZ} - v, 0)$ represents a largest value between $K^{NZ} - v$ and 0

1103
1101
Chip
Memory
Processor
1102
Interface

CHANNEL STATE INFORMATION REPORTING METHOD AND RELATED DEVICE

CROSS-REFERENCE TO RELATED APPLICATIONS

This application is a continuation of International Application No. PCT/CN2021/072332, filed on Jan. 15, 2021, the disclosure of which is hereby incorporated by reference in its entirety.

TECHNICAL FIELD

This application generally relates to the field of communication technologies, and in particular, to a channel state information reporting method and a related device.

BACKGROUND

An emergence of a multiple input multiple output (MIMO) technology has brought a revolutionary change to wireless communication. In the MIMO technology, a plurality of antennas are deployed on a transmitting device and a receiving device, so that performance of a wireless communication system can be significantly improved. For example, in a diversity scenario, the MIMO technology can effectively improve transmission reliability and in a multiplexing scenario, the MIMO technology can increase a transmission throughput by a multitude.

An important branch of the MIMO technology is a precoding technology. In this technology, a to-be-transmitted signal is processed by using a precoding matrix that matches a channel attribute, so that a precoded to-be-transmitted signal adapts to a channel. Therefore, a transmission process may be optimized, and a received signal quality (for example, a signal to interference plus noise ratio (SINR)) is improved. An optimal precoding matrix for downlink transmission is usually obtained through feedback by a terminal device or based on a precoding matrix index. For example, the terminal device may feed back precoding matrix indicator information to a network device. The precoding matrix indicator information may include a plurality of spatial domain vectors, a plurality of frequency domain vectors, some weighting coefficients, and the like. Then the network device may perform linear combination on the plurality of spatial domain vectors and the plurality of frequency domain vectors by using the some weighting coefficients, to obtain the optimal precoding matrix for downlink transmission. This precoding matrix may be referred to as a space-frequency compressed codebook.

It can be learned that the space-frequency compressed codebook is constructed based on at least a plurality of weighting coefficients, a plurality of space domain components (for example, spatial domain vectors), and a plurality of frequency domain components (for example, frequency domain vectors), and at least some content of the weighting coefficients, the space domain components, and the frequency domain components. For example, at least some weighting coefficients, at least some space domain components, and/or at least some frequency domain components, need to be reported by the terminal to a base station. Therefore, in a channel state information reporting solution, a two-level channel state information (CSI) reporting structure is used, for example, a CSI part 1 and a CSI part 2.

The CSI part 1 has a fixed payload size, and the CSI part 1 includes a rank indication (RI), a channel quality indication (CQI), and a total quantity of weighting coefficients correspondingly reported at all spatial layers. The total quantity of weighting coefficients correspondingly reported at all the spatial layers may be used to determine a length of information bits included in the CSI part 2, namely, a payload size of the CSI part 2. The total quantity of weighting coefficients correspondingly reported at all the spatial layers is $K^{NZ}$. A value of $K^{NZ}$ is limited by $K_0$, and $K_0=\lceil 2LM_1 \rceil$, where L is a quantity of spatial domain vectors selected for reporting at each spatial layer, $M_1$ is a quantity of frequency domain vectors selected for reporting when a rank is 1, and β indicates a scaling factor of a quantity of reported weighting coefficients.

The CSI part 2 includes index indication information of a selected spatial domain vector, location indication information of a strongest weighting coefficient corresponding to each spatial layer, index indication information of a frequency domain vector selected at each spatial layer, reference amplitude indication information corresponding to each spatial layer, location indication information of a weighting coefficient correspondingly reported at each spatial layer, and differential amplitude indication information and phase indication information of the weighting coefficients reported at all the spatial layers.

To flexibly control channel state information reporting overheads, in the channel state information reporting solution, when overheads of channel state information exceed a specific limit, the terminal device may selectively delete indication information in the CSI part 2 based on priorities and importance of the indication information in the CSI part 2. Therefore, based on the priorities and the importance of the indication information in the CSI part 2, the indication information included in the CSI part 2 is divided into the following three groups: a group 0, a group 1, and a group 2. The group 0 includes the index indication information of the selected spatial domain vector and the location indication information of the strongest weighting coefficient corresponding to each spatial layer. In the CSI part 2, the total quantity of weighting coefficients correspondingly reported at all the spatial layers is $K^{NZ}$, where the superscript "NZ" of $K^{NZ}$ has no physical meaning, and is merely a mark. Other than v, strongest weighting coefficients corresponding to v transport layers in the group 0, differential amplitude indication information and phase indication information of $K^{NZ}-v$ weighting coefficients in the group 1 and the group 2 further need to be reported. The group 1 includes differential amplitude indication information and phase indication information of $\lceil K^{NZ}/2 \rceil - v$ weighting coefficients with higher priorities in the $K^{NZ}-v$ weighting coefficients, and the group 2 includes differential amplitude indication information and phase indication information of $\lfloor K^{NZ}/2 \rfloor$ weighting coefficients with lower priorities in the $K^{NZ}-v$ weighting coefficients.

However, it has been found through research that $\lceil K^{NZ}/2 \rceil - v$ may be less than 0 and that $\lfloor K^{NZ}/2 \rfloor$ in the group 2 may be greater than $K^{NZ}-v$. In this case, the terminal device cannot determine a quantity of non-zero weighting coefficients whose differential amplitude indication information and phase indication information need to be added to the group 1 and the group 2. Further, when receiving channel state information reported by the terminal device, the network device cannot correctly interpret differential amplitude information or phase information of a reported weighting coefficient. Consequently, the space-frequency compressed codebook is unavailable.

SUMMARY

Embodiments of this application provide for a channel state information reporting method and a related device, to avoid a problem that a terminal device incorrectly groups to-be-reported differential amplitude indication information and phase indication information, and a network device cannot correctly interpret channel state information after receiving the channel state information.

According to a first aspect, this application provides a channel state information reporting method. In the method, indication information may be generated, where the indication information includes a first group of indication information and a second group of indication information. The first group of indication information includes reference amplitude indication information corresponding to each spatial layer of a precoding matrix, and differential amplitude indication information and phase indication information of X weighting coefficients. The second group of indication information includes differential amplitude indication information and phase indication information of Y weighting coefficients. Also in the method, the indication information is sent. Both X and Y are integers, values of X and Y are related to a first parameter, and a sum of X and Y is equal to $K^{NZ}-v$ where $K^{NZ}$ is a total quantity of weighting coefficients correspondingly reported at all of the spatial layers, v is a quantity of the spatial layers, $K^{NZ}$ is an integer, and v is a positive integer.

It can be learned that, in the channel state information reporting method, a manner of allocating the differential amplitude indication information and the phase indication information of the $K^{NZ}-v$ weighting coefficients to the first group of indication information and the second group of indication information is determined based on the first parameter. This helps avoid a situation where a terminal device incorrectly groups to-be-reported differential amplitude indication information and phase indication information, and a network device cannot correctly interpret the differential amplitude indication information or the phase indication information of a reported weighting coefficient after receiving the indication information.

According to a second aspect, this application further provides a channel state information reporting method. The method corresponds to the channel state information reporting method in the first aspect, and is described from a perspective of a network device. In the method, indication information may be received, where the indication information includes a first group of indication information and a second group of indication information. The first group of indication information includes reference amplitude indication information corresponding to each spatial layer of a precoding matrix, and differential amplitude indication information and phase indication information of X weighting coefficients. The second group of indication information includes differential amplitude indication information and phase indication information of Y weighting coefficients. Also in the method, a weighting coefficient correspondingly reported by a terminal device is determined based on the indication information. Both X and Y are integers, values of X and Y are related to a first parameter, and a sum of X and Y is equal to $K^{NZ}-v$, where $K^{NZ}$ is a total quantity of weighting coefficients correspondingly reported at all of the spatial layers, v is a quantity of the spatial layers, $K^{NZ}$ is an integer, and v is a positive integer.

It can be learned that, in the indication information received by the network device, the quantities X and Y of weighting coefficients included in the first group of indication information and the second group of indication information respectively are determined based on the first parameter, so that the network device can correctly interpret the differential amplitude indication information and the phase indication information of the reported weighting coefficients after receiving the indication information.

The following describes optional implementations applicable to the foregoing two aspects.

In an optional implementation, the values of X and Y are related to a first condition, and the first condition is related to the first parameter. When the first condition is met, X is equal to 0, and Y is equal to $K^{NZ}-v$. When the first condition is not met, X is equal to $\lceil K^{NZ}/2 \rceil - v$, and Y is equal to $\lfloor K^{NZ}/2 \rfloor$.

In an optional implementation, the first parameter is $\lceil K^{NZ}/2 \rceil - v$, and the first condition is $\lceil K^{NZ}/2 \rceil - v \le 0$ or $\lceil K^{NZ}/2 \rceil - v < 0$.

In another optional implementation, the first parameter is $\lceil K^{NZ}/2 \rceil$, and the first condition is $\lceil K^{NZ}/2 \rceil \le v$ or $\lceil K^{NZ}/2 \rceil < v$.

In still another optional implementation, the first parameter is $K^{NZ}$, and the first condition is $K^{NZ} \le 2v$ or $K^{NZ} < 2v$.

In another optional implementation, the first parameter is $\lceil K^{NZ}/2 \rceil - v$. Optionally, when $\lceil K^{NZ}/2 \rceil - v \le 0$ or $\lceil K^{NZ}/2 \rceil - v < 0$, X is equal to 0, and Y is equal to $K^{NZ}-v$. Optionally, when $\lceil K^{NZ}/2 \rceil - v \ge 0$ or $\lceil K^{NZ}/2 \rceil - v > 0$, X is equal to $\lceil K^{NZ}/2 \rceil - v$, and Y is equal to $\lfloor K^{NZ}/2 \rfloor$.

In still another optional implementation, the first parameter is $\lceil K^{NZ}/2 \rceil$. Optionally, when $\lceil K^{NZ}/2 \rceil \le v$ or $\lceil K^{NZ}/2 \rceil < v$, X is equal to 0, and Y is equal to $K^{NZ}-v$. Optionally, when $\lceil K^{NZ}/2 \rceil \ge v$ or $\lceil K^{NZ}/2 \rceil > v$, X is equal to $\lceil K^{NZ}/2 \rceil - v$, and Y is equal to $\lfloor K^{NZ}/2 \rfloor$.

In still another optional implementation, the first parameter is $K^{NZ}$. Optionally, when $K^{NZ} \le 2v$ or $K^{NZ} < 2v$, X is equal to 0, and Y is equal to $K^{NZ}-v$. Optionally, when $K^{NZ} \ge 2v$ or $K^{NZ} > 2v$, X is equal to $\lceil K^{NZ}/2 \rceil - v$, and Y is equal to $\lfloor K^{NZ}/2 \rfloor$.

In still another optional implementation, X is equal to $\max(\lceil K^{NZ}/2 \rceil - v, 0)$, and Y is equal to $K^{NZ}-v-\max(\lceil K^{NZ}/2 \rceil - v, 0)$. To be specific, the first group of indication information includes reference amplitude indication information corresponding to each spatial layer, and differential amplitude indication information and phase indication information of $\max(\lceil K^{NZ}/2 \rceil - v, 0)$ weighting coefficients, and the second group of indication information includes differential amplitude indication information and phase indication information of $(K^{NZ}-v-\max(\lceil K^{NZ}/2 \rceil - v, 0)$ weighting coefficients. Optionally, in this implementation, the first parameter may be $\lceil K^{NZ}/2 \rceil - v$, $\lceil K^{NZ}/2 \rceil$, or $K^{NZ}$.

In still another optional implementation, X is equal to $\lceil K^{NZ}/2 \rceil - \min(v, \lceil K^{NZ}/2 \rfloor)$, and Y is equal to $\lfloor K^{NZ}/2 \rfloor - v \pm \min(v, \lceil K^{NZ}/2 \rceil)$. To be specific, the first group of indication information includes reference amplitude indication information corresponding to each spatial layer, and differential amplitude indication information and phase indication information of $(\lceil K^{NZ}/2 \rceil - \min(v, \lceil K^{NZ}/2 \rceil))$ weighting coefficients, and the second group of indication information includes differential amplitude indication information and phase indication information of $(\lceil K^{NZ}/2 \rceil - v + \min(v, \lceil K^{NZ}/2 \rceil)$ weighting coefficients. Optionally, in this implementation, the first parameter may be $\lceil K^{NZ}/2 \rceil - v$, $\lceil K^{NZ}/2 \rceil$, or $K^{NZ}$.

In an optional implementation, priorities of the differential amplitude indication information and the phase indication information in the first group of indication information are higher than priorities of the differential amplitude indication information and the phase indication information in the second group of indication information. In this way, when reporting overheads are limited, a group of indication information with a lower priority can be deleted, to meet a requirement for reporting overheads.

In an optional implementation, the first parameter is related to an index of configuration information, a quantity $N_f$ of frequency domain units, and the quantity v of spatial layers, where the configuration information, the quantity of frequency domain units, and the quantity v of spatial layers are used to determine a maximum value of $K^{NZ}$.

Optionally, when the index of the configuration information is 1, $2<N_f<5$, and v=2, X is equal to 0, and Y is equal to 0;

- when the index of the configuration information is 1, $4<N_f<9$, and v=2, X is equal to 0, and Y is equal to 1;
- when the index of the configuration information is 1, $4<N_f<9$, and v=4, X is equal to 0, and Y is equal to 0;
- when the index of the configuration information is 1, $8<N_f<13$, and v=4, X is equal to 0, and Y is equal to 2;
- when the index of the configuration information is 2, $N_f=3$ or 4, and v=3, X is equal to 0, and Y is equal to 1;
- when the index of the configuration information is 2, $N_f=3$ or 4, and v=4, X is equal to 0, and Y is equal to 0;
- when the index of the configuration information is 3, $N_f=3$ or 4, and v=3, X is equal to 0, and Y is equal to 1; or
- when the index of the configuration information is 3, $N_f=3$ or 4, and v=4, X is equal to 0, and Y is equal to 0.

It can be learned that, in this implementation, the following problem can be avoided through definition in a protocol: When some configuration parameters are used, a quantity of weighting coefficients in the first group of indication information is a negative value, and a quantity of weighting coefficients in the second group of indication information is greater than a total quantity $K^{NZ}$ of weighting coefficients that need to be reported in the first group of indication information and the second group of indication information minus v.

According to a third aspect, this application further provides a channel state information reporting method. In the method, indication information may be generated, where the indication information includes a first group of indication information and a second group of indication information, the first group of indication information includes differential amplitude indication information and phase indication information of X weighting coefficients. The second group of indication information includes differential amplitude indication information and phase indication information of Y weighting coefficients. Also in the method, the indication information is sent. Both X and Y are integers, a difference between X and Y is less than or equal to 1, and a sum of X and Y is equal to $K^{NZ}-v$ where $K^{NZ}$ is a total quantity of weighting coefficients correspondingly reported at all spatial layers, v is a quantity of spatial layers, $K^{NZ}$ is an integer, and v is a positive integer.

It can be learned that, in the channel state information reporting method, the differential amplitude indication information and the phase indication information of the $K^{NZ}-v$ weighting coefficients are allocated to the first group of indication information and the second group of indication information as evenly as feasibly possible. This helps avoid a situation where a terminal device incorrectly groups to-be-reported differential amplitude indication information and phase indication information, and a network device cannot then correctly interpret the differential amplitude indication information or the phase indication information of a reported weighting coefficient after receiving the CSI.

According to a fourth aspect, this application further provides a channel state information reporting method. The method corresponds to the channel state information reporting method in the third aspect, and is described from another side (e.g., network device, receiving side). In the method, indication information may be received, where the indication information includes a first group of indication information and a second group of indication information, the first group of indication information includes differential amplitude indication information and phase indication information of X weighting coefficients, and the second group of indication information includes differential amplitude indication information and phase indication information of Y weighting coefficients. Also in the method, a weighting coefficient reported by a terminal device is determined based on the indication information. Both X and Y are integers, a difference between X and Y is less than or equal to 1, and a sum of X and Y is equal to $K^{NZ}-v$, where $K^{NZ}$ is a total quantity of weighting coefficients correspondingly reported at all spatial layers, v is a quantity of spatial layers, $K^{NZ}$ is an integer, and v is a positive integer.

It can be learned that, in the indication information received by the network device, quantities of weighting coefficients included in the first group of indication information and the second group of indication information are approximately equal, so that the network device can correctly interpret the differential amplitude indication information and the phase indication information of the reported weighting coefficients in the indication information.

The following describes optional implementations applicable to the third aspect and the fourth aspect.

In an optional implementation, X is equal to $\lfloor (K^{NZ}-v)/2 \rfloor$, and Y is equal to $\lceil K^{NZ}-v)/2 \rceil$. In another optional implementation, X is equal to $\lceil K^{NZ}-v)/2 \rceil$, and Y is equal to $\lfloor (K^{NZ}-v)/2 \rfloor$.

In an optional implementation, priorities of the differential amplitude indication information and the phase indication information in the first group of indication information are higher than priorities of the differential amplitude indication information and the phase indication information in the second group of indication information. In this way, when reporting overheads are limited, a group of indication information with a lower priority can be deleted, to meet a requirement for reporting overheads.

In an optional implementation, values of X and Y are related to an index of configuration information, a quantity $N_f$ of frequency domain units, and the quantity v of spatial layers, where the configuration information, the quantity of frequency domain units, and the quantity v of spatial layers are used to determine a maximum value of the total quantity $K^{NZ}$ of reported weighting coefficients.

In an optional implementation, when the index of the configuration information is 1, $2<N_f<5$, and v=2, X is equal to 0, and Y is equal to 0. When the index of the configuration information is 1, $4<N_f<9$, and v=3, X is equal to 0, and Y is equal to 1. When the index of the configuration information is 1, $4<N_f<9$, and v=4, X is equal to 0, and Y is equal to 0. When the index of the configuration information is 1, $8<N_f<13$, v=4, X is equal to 1, and Y is equal to 1. When the index of the configuration information is 2, $N_f=3$ or 4, and v=3, X is equal to 0, and Y is equal to 1. When the index of the configuration information is 2, $N_f=3$ or 4, and v=4, X is equal to 0, and Y is equal to 0. When the index of the configuration information is 3, $N_f=3$ or 4, and v=3, X is equal to 0, and Y is equal to 1. When the index of the configuration information is 3, $N_f=3$ or 4, and v=4, X is equal to 0, and Y is equal to 0.

According to a fifth aspect, this application further provides a channel state information reporting method. In the method, indication information may be generated and sent. The indication information includes amplitude information and phase information of $K^{NZ}$ weighting coefficients. A value of $K^{NZ}$ is related to $K_0$. $K^{NZ}$ is a total quantity of weighting coefficients correspondingly reported at all spatial layers. $K_0$ is configured by a network device and is used to determine a maximum value within a value range of $K^{NZ}$. Both $K^{NZ}$ and $K_0$ are integers.

It can be learned that, in the method, 2v weighting coefficients can be reported when an upper limit of a configured quantity of to-be-reported weighting coefficients is excessively small, for example, when $v>1$ and $K_0<v$, or when $v=1$ and $K_0<2v$. This helps avoid the scenario when a quantity of reported weighting coefficients is excessively small. Consequently, a quantity of weighting coefficients included in one group of indication information in a CSI part 2 is a negative value, and a quantity of weighting coefficients included in another group of indication information exceeds a predetermined total quantity of to-be-reported weighting coefficients. In addition, this further helps avoid an unavailability of some polarization directions of some spatial layers due to reporting of an excessively small quantity of weighting coefficients, and therefore ensures availability of each polarization direction of each spatial layer to the maximum extent.

According to a sixth aspect, this application further provides a channel state information reporting method. The method corresponds to the method in the fifth aspect, and is described from another side (e.g., network device, receiving side). In the method, indication information is received, and a weighting coefficient reported by a terminal device may be determined based on the indication information. The indication information includes amplitude information and phase information of $K^{NZ}$ weighting coefficients. A value of $K^{NZ}$ is related to $K_0$. $K^{NZ}$ is a total quantity of weighting coefficients correspondingly reported at all spatial layers. $K_0$ is configured by a network device and is used to determine a maximum value within a value range of $K^{NZ}$. Both $K^{NZ}$ and $K_0$ are integers.

It can be learned that, in the method, 2v weighting coefficients can be reported when an upper limit, configured by the network device, of a quantity of to-be-reported weighting coefficients is excessively small, for example, when $v>1$ and $K_0<v$, or when $v=1$ and $K_0<2v$. This helps avoid the scenario when a quantity of reported weighting coefficients is excessively small. Consequently, a quantity of weighting coefficients included in one group of indication information in a CSI part 2 is a negative value, and a quantity of weighting coefficients included in another group of indication information exceeds a predetermined total quantity of to-be-reported weighting coefficients.

The following describes optional implementations applicable to the method in the fifth aspect or the sixth aspect.

In an optional implementation, when $v>1$ and $K_0<v$, or when $v=1$ and $K_0<2v$, the 2v weighting coefficients are v first weighting coefficients and v second weighting coefficients. The first weighting coefficient is a weighting coefficient corresponding to each spatial layer. The second weighting coefficient is a weighting coefficient corresponding to a polarization direction other than a polarization direction in which the first weighting coefficient corresponding to each spatial layer is located. It can be learned that this implementation avoids unavailability of some polarization directions of some spatial layers due to reporting of an excessively small quantity of weighting coefficients, and therefore ensures availability of each polarization direction of each spatial layer to the maximum extent.

In another optional implementation, the first weighting coefficient in the foregoing implementation is a strongest weighting coefficient corresponding to each spatial layer, and the second weighting coefficient is a strongest weighting coefficient corresponding to another polarization direction. It can be learned that, in this implementation, a weighting coefficient with a largest amplitude in each polarization direction of each spatial layer is reported. This is equivalent to there being no differential amplitude that needs to be reported. To be specific, amplitude information of the weighting coefficient can be obtained based on reported reference amplitude indication information. This helps reduce reporting overheads.

In an optional implementation, the indication information includes a first group of indication information and a second group of indication information. The first group of indication information includes amplitude indication information of the v second weighting coefficients, and the second group of indication information includes phase indication information of the v second weighting coefficients. The amplitude indication information is reference amplitude indication information in a polarization direction of a corresponding spatial layer, and indicates amplitude information of the second weighting coefficient.

Optionally, for a manner of allocating information of the v first weighting coefficients to the indication information in the foregoing two implementations in this application, refer to related content in a current protocol. Details are not described herein.

According to a seventh aspect, this application further provides a channel state information reporting method. In the method, indication information may be generated and sent. The indication information includes a first group of indication information and a second group of indication information. The first group of indication information includes reference amplitude indication information corresponding to each spatial layer, and differential amplitude indication information and phase indication information of X weighting coefficients, where X is an integer. The second group of indication information includes differential amplitude indication information and phase indication information of Y weighting coefficients, where Y is an integer. Values of X and Y are related to a first parameter, and a sum of X and Y is equal to $\max(K^{NZ}-v, 0)$, where $K^{NZ}$ is a total quantity of weighting coefficients correspondingly reported at all spatial layers, v is a quantity of spatial layers, $K^{NZ}$ is an integer, v is a positive integer, and $\max(K^{NZ}-v, 0)$ represents a largest value between $K^{NZ}-v$ and 0.

It can be learned that, in the channel state information reporting method, a manner of allocating the differential amplitude indication information and the phase indication information of the $K^{NZ}-v$ weighting coefficients to the first group of indication information and the second group of indication information is determined based on the first parameter. This helps avoid a situation where a terminal device incorrectly groups to-be-reported differential amplitude indication information and phase indication information, and a network device cannot correctly interpret the differential amplitude indication information or the phase indication information of a reported weighting coefficient after receiving the indication information. In addition, in the channel state information reporting method, when $K^{NZ}-v$ is less than 0, the terminal device may not add differential amplitude indication information or phase indication information of weighting coefficients to the first group of indication information or the second group of indication information. This also avoids a problem that the network device cannot parse out a correct weighting coefficient because the terminal device performs incorrect grouping.

According to an eighth aspect, this application further provides a channel state information reporting method. The method corresponds to the method in the seventh aspect, and is described from a perspective of a network device side. In the method, indication information may be received, and a weighting coefficient reported by a terminal device is determined based on the indication information. The indication information includes a first group of indication information and a second group of indication information. The first group of indication information includes reference amplitude indication information corresponding to each spatial layer, and differential amplitude indication information and phase indication information of X weighting coefficients, where X is an integer. The second group of indication information includes differential amplitude indication information and phase indication information of Y weighting coefficients, where Y is an integer. Values of X and Y are related to a first parameter, and a sum of X and Y is equal to $\max(K^{NZ}-v, 0)$, where $K^{NZ}$ is a total quantity of weighting coefficients correspondingly reported at all spatial layers, v is a quantity of spatial layers, $K^{NZ}$ is an integer, v is a positive integer, and $\max(K^{NZ}-v, 0)$ represents a largest value between $K^{NZ}-v$ and 0.

It can be learned that, in the indication information received by the network device, the quantities X and Y of weighting coefficients included in the first group of indication information and the second group of indication information respectively are determined based on the first parameter, so that the network device can correctly interpret the differential amplitude indication information and the phase indication information of the reported weighting coefficients after receiving the indication information. In addition, in the channel state information reporting method, when $K^{NZ}-v$ is less than 0, the terminal device may not add differential amplitude indication information or phase indication information of weighting coefficients to the first group of indication information or the second group of indication information. This also avoids a situation where the network device cannot parse out a correct weighting coefficient because the terminal device performs incorrect grouping.

The following describes optional implementations applicable to the seventh aspect and the eighth aspect.

In this application, when $K^{NZ} \leq v$ or $K^{NZ} < v$, X is equal to 0, and Y is equal to 0.

In this application, when $K^{NZ} \geq v$ or $K^{NZ} > v$, a sum of X and Y is equal to $K^{NZ}-v$.

In an optional implementation, when $v < K^{NZ} \leq 2v$, $v < K^{NZ} < 2v$, $v \leq K^{NZ} \leq 2v$, or $v \leq K^{NZ} < 2v$, X is equal to 0, and Y is equal to $K^{NZ}-v$; or when $K^{NZ} \geq 2v$ or $K^{NZ} > 2v$, X is equal to $\lceil K^{NZ}/2 \rceil - v$, and Y is equal to $\lfloor K^{NZ}/2 \rfloor$.

In an optional implementation, X is equal to $\max(\lceil K^{NZ}/2 \rceil - v, 0)$, and Y is equal to $\max(0, K^{NZ}-v-\max(\lceil K^{NZ}/2 \rceil - v, 0)$, where $\max(\lceil K^{NZ}/2 \rceil - v, 0)$ represents a largest value between $\lceil K^{NZ}/2 \rceil - v$ and 0, and $\max(0, K^{NZ}-v-\max(\lceil K^{NZ}/2 \rceil - v, 0)$ represents a largest value between $K^{NZ}-v-\max(\lceil K^{NZ}/2 \rceil - v, 0)$ and 0.

In another optional implementation, X is equal to $\lceil K^{NZ}/2 \rceil - \min(v, \lceil K^{NZ}/2 \rceil)$, and Y is equal to $\max(0, \lceil K^{NZ}/2 \rceil - v + \min(v, \lceil K^{NZ}/2 \rceil))$, where $\min(v, \lceil K^{NZ}/2 \rceil)$ represents a smallest value between v and $\lceil K^{NZ}/2 \rceil$, and $\max(0, \lfloor K^{NZ}/2 \rfloor - v + \min(v, \lceil K^{NZ}/2 \rceil))$ represents a largest value between $\lfloor K^{NZ}/2 \rfloor - v + \min(v, \lceil K^{NZ}/2 \rceil)$ and 0.

In still another optional implementation, the first parameter is related to an index of configuration information, a quantity $N_f$ of frequency domain units, and the quantity v of spatial layers, where the configuration information, the quantity of frequency domain units, and the quantity v of spatial layers are used to determine a maximum value of $K^{NZ}$.

In this implementation, optionally, when the index of the configuration information is 1 and $2 < N_f \leq 5$, X is equal to 0, and Y is equal to 0;

when the index of the configuration information is 1, $4 < N_f \leq 9$, and v=3, X is equal to 0, and Y is equal to 1;

when the index of the configuration information is 1, $4 < N_f \leq 9$, and v=4, X is equal to 0, and Y is equal to 0;

when the index of the configuration information is 1, $8 < N_f \leq 13$, and v=4, X is equal to 0, and Y is equal to 2;

when the index of the configuration information is 2, $N_f$=3 or 4, and v=3, X is equal to 0, and Y is equal to 1;

when the index of the configuration information is 2, $N_f$=3 or 4, and v=4, X is equal to 0, and Y is equal to 0;

when the index of the configuration information is 3, $N_f$=3 or 4, and v=3, X is equal to 0, and Y is equal to 1; or when the index of the configuration information is 3, $N_f$=3 or 4, and v=4, X is equal to 0, and Y is equal to 0.

According to a ninth aspect, this application further provides a channel state information reporting method. In the method, a network device determines and sends indication information. In some embodiments, the indication information indicates an index of configuration information, and a value of the index of the configuration information is related to a quantity $N_f$ of frequency domain units. In some embodiments, the indication information indicates configuration information, and a value of one or more parameters in the configuration information is related to a quantity $N_f$ of frequency domain units. Optionally, for a value of one or more parameters in configuration information corresponding to the index of the configuration information, refer to Table 1 in the following descriptions. Details are not described herein.

The configuration information includes one or more of a quantity L of space domain base vectors, a factor $p_v$ related to the quantity of frequency domain base vectors, and a scaling factor β of a quantity of weighting coefficients.

It can be learned that, in this implementation, the network device can consider the quantity $N_f$ of frequency domain units when indicating the index of the configuration information to a terminal device, to avoid a case that a quantity $\lceil K^{NZ}/2 \rceil - v$ of weighting coefficients reported in a group 1 is less than 0 and a case that a quantity $\lfloor K^{NZ}/2 \rfloor$ of weighting coefficients in a group 2 is greater than $K^{NZ}-v$.

According to a tenth aspect, this application further provides a channel state information reporting method. The method corresponds to the method in the ninth aspect, and is described from a perspective of a terminal device. In the method, the terminal device receives indication information, and reports a weighting coefficient based on the indication information. The indication information indicates an index of configuration information, and a value of the index of the configuration information is related to a quantity $N_f$ of frequency domain units. In some embodiments, the indication information indicates configuration information, and a value of a parameter in the configuration information is related to a quantity $N_f$ of frequency domain units. Optionally, for a value of one or more parameters in configuration information corresponding to the index of the configuration information, refer to Table 1 in the following descriptions. Details are not described herein.

The configuration information includes one or more of a quantity L of space domain base vectors, a factor $p_v$ related to the quantity of frequency domain base vectors, and a scaling factor β of a quantity of weighting coefficients.

It can be learned that, in this implementation, the terminal device receives the index of the configuration information. This helps avoid a case that a quantity $\lceil K^{NZ}/2 \rceil - v$ of weighting coefficients reported in a group 1 is less than 0 and a case that a quantity $\lfloor K^{NZ}/2 \rfloor$ of weighting coefficients in a group 2 is greater than $K^{NZ}-v$.

The following describes optional implementations applicable to the method in the ninth aspect or the tenth aspect.

In an optional implementation, that a value of the index of the configuration information is related to a quantity $N_f$ of frequency domain units may include one or more of the following:

- when $N_f \geq 13$, a value of the indicated index of the configuration information is one of 1 to 8;
- when $5 \leq N_f < 13$, a value of the indicated index of the configuration information is one of 2 to 8; or
- when $N_f < 5$, a value of the indicated index of the configuration information is one of 4 to 8.

In an optional implementation, that a value of the index of the configuration information is related to a quantity $N_f$ of frequency domain units may include one or more of the following:

- when $N_f < 13$, a value of the indicated index of the configuration information is a value other than 1;
- when $N_f < 5$, a value of the indicated index of the configuration information is a value other than 2, and/or a value of the indicated index of the configuration information is a value other than 3;
- when $N_f < 13$, a value of the index of the configuration information being 1 is invalid, that is, the indicated index of the configuration information cannot be 1;
- when $N_f < 5$, a value of the index of the configuration information being 2 is invalid, that is, the indicated index of the configuration information cannot be 2; or
- when $N_f < 5$, a value of the index of the configuration information being 3 is invalid, that is, the indicated index of the configuration information cannot be 3.

According to an eleventh aspect, this application further provides a channel state information reporting method. In the method, a terminal device receives indication information, where the indication information indicates an index of configuration information. The terminal device reports a quantity v of spatial layers based on the index of the configuration information, where a value range of the quantity v of spatial layers is related to a value of the index of the configuration information. Optionally, precoding matrix indicator (PMI) information reported by the terminal device corresponds to the quantity v of spatial layers.

Alternatively, the indication information indicates configuration information, and a value of a parameter in the configuration information is related to a value range of the quantity v of spatial layers. Optionally, for a value of one or more parameters in configuration information corresponding to the index of the configuration information, refer to Table 1 in the following descriptions. Details are not described herein.

The configuration information includes one or more of a quantity L of space domain base vectors, a factor $p_v$ related to the quantity of frequency domain base vectors, and a scaling factor β of a quantity of weighting coefficients.

It can be learned that, in this implementation, when determining a total quantity of to-be-reported weighting coefficients, the terminal device can determine the quantity v based on the value of the index of the configuration information to avoid a case that a quantity $\lceil K^{NZ}/2 \rceil - v$ of weighting coefficients reported in a group 1 is less than 0 and a case that a quantity $\lfloor K^{NZ}/2 \rfloor$ of weighting coefficients in a group 2 is greater than $K^{NZ}-v$.

According to a twelfth aspect, this application further provides a channel state information reporting method. The method corresponds to the method in the eleventh aspect, and is described from a perspective of a network device. In the method, the network device may determine and send the indication information, and then the network device may receive a quantity v of spatial layers that is reported by a terminal device. The indication information indicates an index of configuration information, or indicates configuration information. A value range of the quantity v of spatial layers is related to a value of the index of the configuration information. Optionally, PMI information reported by the terminal device corresponds to the quantity v of spatial layers.

The configuration information includes one or more of a quantity L of space domain base vectors, a factor $p_v$ related to the quantity of frequency domain base vectors, and a scaling factor β of a quantity of weighting coefficients. Optionally, for a value of one or more parameters in configuration information corresponding to the index of the configuration information, refer to Table 1 in the following descriptions. Details are not described herein.

It can be learned that, in this implementation, when determining a total quantity of to-be-reported weighting coefficients, the terminal device can determine, based on the value of the index of the configuration information, the quantity v of spatial layers that is to be reported. This avoids a case that a quantity $\lceil K^{NZ}/2 \rceil - v$ of weighting coefficients reported in a group 1 is less than 0 and a case that a quantity $\lfloor K^{NZ}/2 \rfloor$ of weighting coefficients in a group 2 is greater than $K^{NZ}-v$. In this way, when the network device determines, based on the index of the configuration information, that the quantity v of spatial layers that is reported by the terminal device is invalid, the network device does not need to further interpret indication information in a CSI part 2.

The following describes optional implementations applicable to the eleventh aspect and the twelfth aspect.

In an optional implementation, that a value range of the quantity v of spatial layers is related to a value of the index of the configuration information may include one or more of the following:

- when a value of the indicated index of the configuration information is 1, the quantity v of spatial layers that is reported by the terminal device is equal to 1;
- when a value of the indicated index of the configuration information is 2, the quantity v of spatial layers that is reported by the terminal device is equal to 1 or 2;
- when a value of the indicated index of the configuration information is 3, the quantity v of spatial layers that is reported by the terminal device is equal to 1 or 2; or
- when a value of the indicated index of the configuration information is greater than 3, the quantity v of spatial layers that is reported by the terminal device is greater than or equal to 1 and is less than or equal to 4.

In other words, on the network device side, that a value range of the quantity v of spatial layers is related to a value of the index of the configuration information may include one or more of the following:

- when a value of the indicated index of the configuration information is 1, the quantity v of spatial layers that is reported by the terminal device being greater than 1 is invalid;
- when a value of the indicated index of the configuration information is 2, the quantity v of spatial layers that is reported by the terminal device being greater than 3 is invalid; or when a value of the indicated index of the configuration information is 3, the quantity v of spatial layers that is reported by the terminal device being greater than 3 is invalid.

According to a thirteenth aspect, this application further provides a channel state information reporting method. In the method, a terminal device may receive indication information, where the indication information indicates an index of configuration information. The terminal device reports a quantity v of spatial layers based on the indication information. A value range of the quantity v of spatial layers is related to a value of the index of the configuration information and/or a quantity $N_f$ of frequency domain units. Optionally, PMI information reported by the terminal device corresponds to the quantity v of spatial layers.

It can be learned that, in this implementation, when determining a total quantity of to-be-reported weighting coefficients, the terminal device can determine the quantity v based on the value of the index of the configuration information and/or the quantity $N_f$ of frequency domain units to avoid a case that a quantity $\lceil K^{NZ}/2 \rceil - v$ of weighting coefficients reported in a group 1 is less than 0 and a case that a quantity $\lfloor K^{NZ}/2 \rfloor$ of weighting coefficients in a group 2 is greater than $K^{NZ}-v$.

According to a fourteenth aspect, this application further provides a channel state information reporting method. The method corresponds to the method in the thirteenth aspect, and is described from a perspective of a network device. In the method, a network device determines and sends indication information, where the indication information indicates an index of configuration information. Also in the method, the network device may receive a quantity v of spatial layers that is reported by a terminal device.

In a manner, a value range of the quantity v of spatial layers is related to a value of the index of the configuration information and/or a quantity $N_f$ of frequency domain units. In another manner, a value range of the quantity v of spatial layers is related to a value of the index of the configuration information. Optionally, in the two manners, the value of the index of the configuration information is related to the quantity $N_f$ of frequency domain units. To be specific, the network device considers a constraint relationship between the value of the index of the configuration information and the quantity $N_f$ of frequency domain units when indicating the value of the index of the configuration information. Optionally, PMI information reported by the terminal device corresponds to the quantity v of spatial layers.

The configuration information includes one or more of a quantity L of space domain base vectors, a factor $p_v$ related to the quantity of frequency domain base vectors, and a scaling factor β of a quantity of weighting coefficients.

Optionally, the value of the index of the configuration information may alternatively be expressed as a value of one or more parameters in the configuration information. Optionally, for a value of one or more parameters in configuration information corresponding to the index of the configuration information, refer to Table 1 in the following descriptions. Details are not described herein.

It can be learned that, in this implementation, when determining a total quantity of to-be-reported weighting coefficients, the terminal device can determine the quantity v based on the value of the index of the configuration information and/or the quantity $N_f$ of frequency domain units. This avoids a case that a quantity $\lceil K^{NZ}/2 \rceil - v$ of weighting coefficients reported in a group 1 is less than 0 and a case that a quantity $\lfloor K^{NZ}/2 \rfloor$ of weighting coefficients in a group 2 is greater than $K^{NZ}-v$. In this way, when the network device determines, based on the index of the configuration information, that the quantity v of spatial layers that is reported by the terminal device is invalid, the network device does not need to further interpret indication information in a CSI part 2. Further, the network device may consider the constraint relationship between the value of the index of the configuration information and the quantity $N_f$ of frequency domain units when determining the indicated index of the configuration information, to avoid, to the maximum extent, a case that a quantity $\lceil K^{NZ}/2 \rceil - v$ of weighting coefficients in a group 1 reported by the terminal device is less than 0, and a case that a quantity $\lfloor K^{NZ}/2 \rfloor$ of weighting coefficients in a group 2 is greater than $K^{NZ}-v$.

The following describes optional implementations applicable to the method in the thirteenth aspect or the fourteenth aspect.

In an optional implementation, that a value range of the quantity v of spatial layers is related to a value of the index of the configuration information and/or a quantity $N_f$ of frequency domain units may include one or more of the following:

when a value of the indicated index of the configuration information is 1 and $N_f \geq 13$, the quantity v of spatial layers that is reported by the terminal device needs to meet the following condition: $1 \leq v \leq 4$;

when a value of the indicated index of the configuration information is 1 and $9 \leq N_f < 13$, the quantity v of spatial layers that is reported by the terminal device needs to meet the following condition: $1 \leq v \leq 3$;

when a value of the indicated index of the configuration information is 1 and $5 \leq N_f < 9$, the quantity v of spatial layers that is reported by the terminal device needs to meet the following condition: $1 \leq v \leq 2$;

when a value of the indicated index of the configuration information is 1 and $N_f < 5$, the quantity v of spatial layers that is reported by the terminal device needs to meet the following condition: $v=1$;

when a value of the indicated index of the configuration information is 2 and $N_f \geq 5$, the quantity v of spatial layers that is reported by the terminal device needs to meet the following condition: $1 \leq v \leq 4$;

when a value of the indicated index of the configuration information is 2 and $N_f < 5$, the quantity v of spatial layers that is reported by the terminal device needs to meet the following condition: $1 \leq v \leq 2$;

when a value of the indicated index of the configuration information is 3 and $N_f \geq 5$, the quantity v of spatial layers that is reported by the terminal device needs to meet the following condition: $1 \leq v \leq 4$; or when a value of the indicated index of the configuration information is 3 and $N_f < 5$, the quantity v of spatial layers that is reported by the terminal device needs to meet the following condition: $1 \leq v \leq 2$.

In other words, on the network device side, that a value range of the quantity v of spatial layers is related to a value of the index of the configuration information and/or a quantity $N_f$ of frequency domain units may include one or more of the following:

when a value of the indicated index of the configuration information is 1 and $9 \leq N_f < 13$, the quantity v of spatial layers that is reported by the terminal device being 4 is invalid;

when a value of the indicated index of the configuration information is 1 and $5 \leq N_f < 9$, the quantity v of spatial layers that is reported by the terminal device being greater than 2 is invalid;

when a value of the indicated index of the configuration information is 1 and $N_f$<5, the quantity v of spatial layers that is reported by the terminal device being greater than 1 is invalid;

when a value of the indicated index of the configuration information is 2 and $N_f$<5, the quantity v of spatial layers that is reported by the terminal device being greater than 2 is invalid; or when a value of the indicated index of the configuration information is 3 and $N_f$<5, the quantity v of spatial layers that is reported by the terminal device being greater than 2 is invalid.

According to a fifteenth aspect, this application provides a communication apparatus. The communication apparatus has a function of implementing the method example in any one of the first aspect, the third aspect, the fifth aspect, the seventh aspect, the tenth aspect, the eleventh aspect, or the thirteenth aspect or the optional implementations of the aspects. For example, the communication apparatus may have functions in some or all of embodiments of this application, or may have a function of independently implementing any embodiment of this application. The function may be implemented by hardware, or may be implemented by hardware executing corresponding software. The hardware or the software includes one or more units or modules corresponding to the function.

In an implementation, a structure of the communication apparatus may include a processing unit and a communication unit (e.g., communication circuit). The processing unit is configured to enable the communication apparatus to perform a corresponding function in the foregoing method. The communication unit is configured to support communication between the communication apparatus and another device. The communication apparatus may further include a storage unit (e.g., storage circuit). The storage unit is coupled to the processing unit and a sending unit (e.g., sending circuit), and stores a computer program and data that are necessary for the communication apparatus.

In an implementation, the communication apparatus includes: a processing unit configured to generate indication information and a communication unit configured to send the indication information.

The manner in the first aspect or the seventh aspect may be used for the indication information. For example, the indication information includes a first group of indication information and a second group of indication information. The first group of indication information includes reference amplitude indication information corresponding to each spatial layer, and differential amplitude indication information and phase indication information of X weighting coefficients. The second group of indication information includes differential amplitude indication information and phase indication information of Y weighting coefficients. Both X and Y are integers. Values of X and Y are related to a first parameter, and a sum of X and Y is equal to $K^{NZ}-v$; or values of X and Y are related to a first parameter, and a sum of X and Y is equal to $\max(K^{NZ}-v, 0)$. $K^{NZ}$ is a total quantity of weighting coefficients correspondingly reported at all spatial layers, v is a quantity of spatial layers, $K^{NZ}$ is an integer, and v is a positive integer. It can be learned that, in this manner, a manner of allocating the differential amplitude indication information and the phase indication information of the $K^{NZ}-v$ weighting coefficients to the first group of indication information and the second group of indication information is determined based on the first parameter. This helps avoid a problem that a terminal device incorrectly groups to-be-reported differential amplitude indication information and phase indication information, and a network device cannot correctly interpret differential amplitude indication information or phase indication information of a reported weighting coefficient after receiving the indication information.

Optionally, the manner in the third aspect may be used for the indication information. A difference from the manner in the first aspect lies in that a difference between X and Y is less than or equal to 1, and a sum of X and Y is equal to $K^{NZ}-v$ where $K^{NZ}$ is a total quantity of weighting coefficients correspondingly reported at all spatial layers, v is a quantity of spatial layers, $K^{NZ}$ is an integer, and v is a positive integer. It can be learned that the differential amplitude indication information and the phase indication information of the $K^{NZ}-v$ weighting coefficients are allocated to the first group of indication information and the second group of indication information as evenly as possible. This helps avoid a situation where a terminal device incorrectly groups to-be-reported differential amplitude indication information and phase indication information, and a network device cannot correctly interpret the differential amplitude indication information or the phase indication information of a reported weighting coefficient after receiving the CSI.

Optionally, the manner in the fifth aspect may be used for the indication information. The indication information includes amplitude indication information and phase indication information of $K^{NZ}$ weighting coefficients. A value of $K^{NZ}$ is related to $K_0$. $K^{NZ}$ is a total quantity of weighting coefficients correspondingly reported at all spatial layers. $K_0$ is configured by a network device and is used to determine a maximum value within a value range of $K^{NZ}$. Both $K^{NZ}$ and $K_0$ are integers. It can be learned that, in this manner, 2v weighting coefficients can be reported when an upper limit, configured by the network device, of a quantity of to-be-reported weighting coefficients is excessively small. For example, when v>1 and $K_0$<v, or when v=1 and $K_0$<2v. This helps avoid the problem that a quantity of reported weighting coefficients is excessively small. Consequently, a quantity of weighting coefficients included in one group of indication information in a CSI part 2 is a negative value, and a quantity of weighting coefficients included in another group of indication information exceeds a predetermined total quantity of to-be-reported weighting coefficients. In addition, this further helps avoid an unavailability of some polarization directions of some spatial layers due to reporting of an excessively small quantity of weighting coefficients, and therefore ensures availability of each polarization direction of each spatial layer to the maximum extent.

Optionally, the indication information may alternatively include the indication information in the tenth aspect, the eleventh aspect, or the thirteenth aspect. Details are not described herein again.

For example, the processing unit may be a processor, the communication unit may be a transceiver unit (e.g., transceiver circuit), a transceiver, or a communication interface, and the storage unit may be a memory. It can be understood that the communication unit may be a transceiver in the communication apparatus, and is implemented, for example, by using an antenna, a feeder, and a codec in the communication apparatus. Alternatively, if the communication apparatus is a chip disposed in a terminal device, the communication unit may be an input/output interface of the chip, for example, an input/output circuit or a pin.

In another implementation, the communication apparatus includes: a processor configured to generate indication information and a transceiver configured to send the indication information.

Optionally, the manner in any one of the first aspect, the third aspect, the fifth aspect, the seventh aspect, the tenth aspect, the eleventh aspect, or the thirteenth aspect may be used for the indication information. In addition, optionally, the communication apparatus may alternatively perform any one or more of the implementations of the first aspect, the third aspect, the fifth aspect, the seventh aspect, the tenth aspect, the eleventh aspect, or the thirteenth aspect. Details are not described herein again.

According to a sixteenth aspect, this application further provides another communication apparatus. The communication apparatus has a function of implementing the method example in the second aspect, the fourth aspect, the sixth aspect, the eighth aspect, the ninth aspect, the twelfth aspect, or the fourteenth aspect. For example, the communication apparatus may have functions of some or all of embodiments of this application, or may have a function of independently implementing any embodiment of this application. The function may be implemented by hardware, or may be implemented by hardware executing corresponding software. The hardware or the software includes one or more units or modules corresponding to the function.

In an implementation, a structure of the communication apparatus may include a processing unit and a communication unit. The processing unit is configured to enable the communication apparatus to perform a corresponding function in the method in the second aspect, the fourth aspect, the sixth aspect, the eighth aspect, the ninth aspect, the twelfth aspect, or the fourteenth aspect. The communication unit is configured to support communication between the communication apparatus and another device. The communication apparatus may further include a storage unit. The storage unit is coupled to the processing unit and a sending unit, and stores a computer program and data that are necessary for the communication apparatus.

In an implementation, the uplink transmission apparatus includes: a communication unit configured to receive indication information and a processing unit configured to determine, based on the indication information, a weighting coefficient reported by a terminal device.

The manner in the second aspect or the eighth aspect may be used for the indication information. For example, the indication information includes a first group of indication information and a second group of indication information. The first group of indication information includes reference amplitude indication information corresponding to each spatial layer, and differential amplitude indication information and phase indication information of X weighting coefficients. The second group of indication information includes differential amplitude indication information and phase indication information of Y weighting coefficients. Both X and Y are integers. Values of X and Y are related to a first parameter, and a sum of X and Y is equal to $K^{NZ}-v$; or values of X and Y are related to a first parameter, and a sum of X and Y is equal to $\max(K^{NZ}-v, 0)$. $K^{NZ}$ is a total quantity of weighting coefficients correspondingly reported at all spatial layers, v is a quantity of spatial layers, $K^{NZ}$ is an integer, and v is a positive integer. It can be learned that, in this manner, in the indication information received by the communication apparatus, the quantities X and Y of weighting coefficients included in the first group of indication information and the second group of indication information respectively are determined based on the first parameter, so that the communication apparatus can correctly interpret the differential amplitude indication information and the phase indication information of the reported weighting coefficients after receiving the indication information.

Optionally, the manner in the fourth aspect may be used for the indication information. A difference from the manner in the second aspect lies in that a difference between X and Y is less than or equal to 1, and a sum of X and Y is equal to $K^{NZ}-v$ where $K^{NZ}$ is a total quantity of weighting coefficients correspondingly reported at all spatial layers, v is a quantity of spatial layers, $K^{NZ}$ is an integer, and v is a positive integer. It can be learned that the differential amplitude indication information and the phase indication information of the $K^{NZ}-v$ weighting coefficients are allocated to the first group of indication information and the second group of indication information as evenly as possible. In this way, the communication apparatus can correctly interpret the differential amplitude indication information and the phase indication information of the reported weighting coefficients in the indication information.

Optionally, the manner in the sixth aspect may be used for the indication information. The indication information includes amplitude indication information and phase indication information of $K^{NZ}$ weighting coefficients. A value of $K^{NZ}$ is related to $K_0$. $K^{NZ}$ is a total quantity of weighting coefficients correspondingly reported at all spatial layers. $K_0$ is configured by a network device and is used to determine a maximum value within a value range of $K^{NZ}$. Both $K^{NZ}$ and $K_0$ are integers. It can be learned that, in this manner, 2v weighting coefficients can be reported when an upper limit, configured by the network device, of a quantity of to-be-reported weighting coefficients is excessively small. For example, when $v>1$ and $K_0<v$, or when $v=1$ and $K_0<2v$. This helps avoid the problem that a quantity of reported weighting coefficients is excessively small. Consequently, a quantity of weighting coefficients included in one group of indication information in a CSI part 2 is a negative value, and a quantity of weighting coefficients included in another group of indication information exceeds a predetermined total quantity of to-be-reported weighting coefficients. Further, the communication apparatus can correctly parse out the reported weighting coefficients.

Optionally, the indication information may alternatively include the indication information in the tenth aspect, the eleventh aspect, or the thirteenth aspect. Details are not described herein again.

For example, the processing unit may be a processor, the communication unit may be a transceiver unit, a transceiver, or a communication interface, and the storage unit may be a memory. It can be understood that the communication unit may be a transceiver in the apparatus, and is implemented, for example, by using an antenna, a feeder, and a codec in the apparatus. Alternatively, if the communication apparatus is a chip disposed in a network device, the communication unit may be an input/output interface of the chip, for example, an input/output circuit or a pin.

In another implementation, the communication apparatus includes: a transceiver configured to receive indication information and a processor configured to determine, based on the indication information, a weighting coefficient reported by a terminal device.

Optionally, the manner in any one of the second aspect, the fourth aspect, the sixth aspect, the eighth aspect, the ninth aspect, the twelfth aspect, or the fourteenth aspect may be used for the indication information. Optionally, the communication apparatus may alternatively perform any one or more of the implementations of the second aspect, the fourth aspect, the sixth aspect, the eighth aspect, the ninth aspect, the twelfth aspect, or the fourteenth aspect. Details are not described herein again.

According to a seventeenth aspect, an embodiment of the present disclosure provides a computer-readable storage medium, configured to store a computer program. When the computer program runs on a communication apparatus, the communication apparatus performs the channel state information reporting method in the first aspect, the third aspect, the fifth aspect, the seventh aspect, the tenth aspect, the eleventh aspect, or the thirteenth aspect.

According to an eighteenth aspect, an embodiment of the present disclosure provides a computer-readable storage medium, configured to store a computer program. When the computer program runs on a communication apparatus, the communication apparatus performs the channel state information reporting method in the second aspect, the fourth aspect, the sixth aspect, the eighth aspect, the ninth aspect, the twelfth aspect, or the fourteenth aspect.

According to a nineteenth aspect, this application further provides a computer program product including a computer program. When the computer program product runs on a communication apparatus, the communication apparatus is enabled to perform the uplink transmission method in the first aspect, the third aspect, the fifth aspect, the seventh aspect, the tenth aspect, the eleventh aspect, or the thirteenth aspect.

According to a twentieth aspect, this application further provides a computer program product including a computer program. When the computer program product runs on a communication apparatus, the communication apparatus is enabled to perform the uplink transmission method in the second aspect, the fourth aspect, the sixth aspect, the eighth aspect, the ninth aspect, the twelfth aspect, or the fourteenth aspect.

According to a twenty-first aspect, this application provides a chip system. The chip system includes at least one processor and an interface, configured to enable a terminal device to implement the functions in the first aspect, the third aspect, the fifth aspect, the seventh aspect, the tenth aspect, the eleventh aspect, or the thirteenth aspect. For example, a function of determining or processing at least one of data and information in the foregoing method. In a possible design, the chip system further includes a memory, and the memory is configured to store a computer program and data that are necessary for the terminal device. The chip system may include a chip, or may include a chip and another discrete device.

According to a twenty-second aspect, this application provides a chip system. The chip system includes at least one processor and an interface, configured to enable a network device to implement the functions in the second aspect, the fourth aspect, the sixth aspect, the eighth aspect, the ninth aspect, the twelfth aspect, or the fourteenth aspect. For example, a function of determining or processing at least one of data and information in the foregoing method. In a possible design, the chip system further includes a memory, and the memory is configured to store a computer program and data that are necessary for the network device. The chip system may include a chip, or may include a chip and another discrete device.

DESCRIPTION OF EMBODIMENTS

Figure 1:
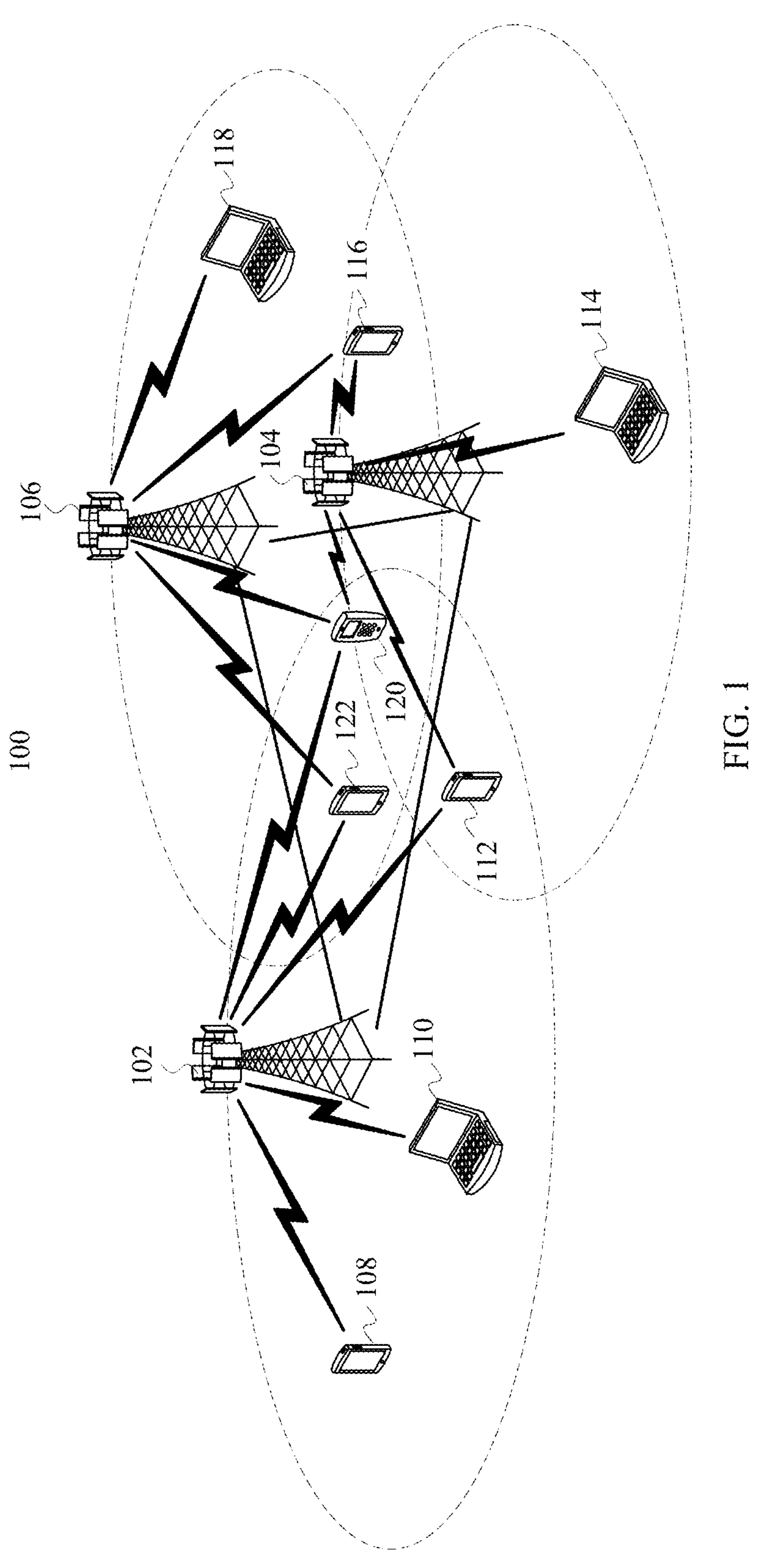
FIG. 1 is a schematic diagram of a communication system.

FIG. 1 is a schematic diagram of a wireless communication network 100 to which an embodiment of this application is applicable. As shown in FIG. 1, the wireless communication network 100 includes base stations 102 to 106 and terminal devices 108 to 122. The base stations 102 to 106 may communicate with each other through backhaul links (indicated by straight lines between the base stations 102 to 106). The backhaul link may be a wired backhaul link (for example, an optical fiber or a copper cable) or a wireless backhaul link (for example, microwave). The terminal devices 108 to 122 may communicate with the corresponding base stations 102 to 106 through radio links (for example, indicated by broken lines between the base stations 102 to 106 and the terminal devices 108 to 122).

The base stations 102 to 106 usually serve as access devices to provide radio access services for the terminal devices 108 to 122 that usually serve as user equipment. Specifically, each base station corresponds to one service coverage area (which may also be referred to as a cellular, indicated by each elliptical area in FIG. 1), and a terminal device entering the area may communicate with the base station through a radio signal, to receive a radio access service provided by the base station. Service coverage areas of base stations may overlap. A terminal device in an overlapping area may receive radio signals from a plurality of base stations. Therefore, the base stations may collaborate with each other to provide a service for the terminal device. For example, the plurality of base stations may provide a service for the terminal device in the overlapping area by using a coordinated multipoint (CoMP) technology. For example, as shown in FIG. 1, service coverage areas of the base station 102 and the base station 104 overlap, and the terminal device 112 is in an overlapping area. Therefore, the terminal device 112 may receive radio signals from the base station 102 and the base station 104, and the base station 102 and the base station 104 may collaborate with each other to provide a service for the terminal device 112. For another example, as shown in FIG. 1, service coverage areas of the base stations 102, 104, and 106 have a common overlapping area, and the terminal device 120 is in the overlapping area. Therefore, the terminal device 120 may receive radio signals from the base stations 102, 104, and 106, and the base stations 102, 104, and 106 may collaborate with each other to provide a service for the terminal device 120.

Depending on a used wireless communication technology, the base station may also be referred to as a NodeB, an evolved NodeB (eNodeB), an access point (AP), or the like. In addition, based on a size of a provided service coverage area, base stations may be further classified into a macro base station for providing a macro cell, a micro base station for providing a micro cell, a pico base station for providing a pico cell, a femto base station for providing a femto cell, and the like. With continuous evolution of wireless communication technologies, a future base station may also be referred to as another name.

The base station usually includes a plurality of components, for example, but not limited to, a baseband part, a radio frequency part, and an antenna array part.

The baseband part is configured to perform a plurality of baseband processing operations, for example, but not limited to, encoding/decoding, modulation/demodulation, precoding, and time-frequency conversion. During implementation, the baseband part is usually implemented by using, for example, but not limited to, a baseband unit (BBU).

The radio frequency part is configured to perform a plurality of radio frequency processing operations, for example, but not limited to, intermediate frequency processing and filtering. During implementation, the radio frequency part is usually implemented by using, for example, but not limited to, a radio frequency unit (RFU).

Antenna arrays may be classified into an active antenna array and a passive antenna array, and are configured to transmit and receive signals.

The base station has a variety of product forms. For example, during product implementation, the BBU and the RFU may be integrated into one device, and the device is connected to the antenna array through a cable (for example, but not limited to, a feeder). Alternatively, the BBU and the RFU may be disposed separately and are connected through an optical fiber, and communicate with each other based on, for example, but not limited to, the common public radio interface (CPRI) protocol. In this case, the RFU is usually referred to as an RRU (remote radio unit), and is connected to the antenna array through a cable. In addition, the RRU may alternatively be integrated with the antenna array. For example, this structure is used in an active antenna unit (AAU) product currently available on the market.

In addition, the BBU may be further divided into a plurality of parts. For example, the BBU may be further divided into a central unit (CU) and a distributed unit (DU) based on real-time performance of processed services. The CU processes a non-real-time protocol and service, and the DU processes a physical layer protocol and a real-time service. Further, some physical layer functions may be alternatively separated from the BBU or the DU and integrated into the AAU.

It can be learned from the foregoing descriptions that the base station may include a plurality of parts and have a plurality of different product forms. In this case, technical solutions described in embodiments of this application may relate only to one or more parts of the base station, or may relate to the entire base station. Therefore, the base station in embodiments of this application may be a base station product that includes only several parts for implementing technical solutions in embodiments of this application, or may be an entire base station. The several parts may include but are not limited to one or more of the baseband part, the radio frequency part, the antenna array, the BBU, the RRU, the RFU, the AAU, the CU, the DU, and the like that are described above. Further, technical solutions provided in embodiments of this application may only be implemented by a corresponding chip in each of the foregoing several parts. In each part, technical solutions provided in embodiments of this application may relate to one chip, or may relate to a plurality of chips. It can be learned that technical solutions provided in embodiments of this application may be implemented by the entire base station, or may be implemented by the several parts of the base station, or may be implemented by one or more chips in the parts, that is, implemented by one or more chips in the base station. For example, a technical solution may only be implemented by a part related to baseband processing in the base station. Further, the technical solution may be implemented by the BBU, the CU, the DU, a combination of the CU and the DU, the AAU, or one or more chips in these devices.

Functions and product forms of the base station are clearly described in the conventional technology, and details are not described in this specification.

The terminal devices 108 to 122 may be various wireless communication devices with a wireless communication function, for example, but not limited to, a mobile cellular phone, a cordless phone, a personal digital assistant (PDA), a smartphone, a notebook computer, a tablet computer, a wireless data card, a wireless modem (e.g., Modulator demodulator), or a wearable device such as a smartwatch. With emergence of an internet of things (IOT) technology and an internet of vehicles (e.g., Vehicle-to-everything, V2X) technology, an increasing quantity of devices that originally did not have a communication function, for example, but not limited to, a household appliance, a vehicle, a tool device, a service device, and a service facility, have begun to obtain a wireless communication function through configuration of a wireless communication unit, so as to access a wireless communication network and facilitate for remote control. These devices obtain the wireless communication function through configuration of the wireless communication unit, and therefore are also wireless communication devices. In addition, the terminal devices 108 to 122 may also be referred to as mobile stations, mobile devices, mobile terminals, wireless terminals, handheld devices, clients, or the like.

The base stations 102 to 106 and the terminal devices 108 to 122 each may be equipped with a plurality of antennas to support a MIMO (multiple input multiple output) technology. Further, the base stations 102 to 106 and the terminal devices 108 to 122 may not only support a single-user MIMO (SU-MIMO) technology but also a multi-user MIMO (MU-MIMO) technology. The MU-MIMO may be implemented based on a space division multiple access (SDMA) technology. Because a plurality of antennas are configured, the base stations 102 to 106 and the terminal devices 108 to 122 may further flexibly support a single input single output (SISO) technology, a single input multiple output (SIMO) technology, and a multiple input single output (MISO) technology, to implement various diversity technologies (for example, but not limited to, transmit diversity and receive diversity) and multiplexing technologies. The diversity technology may include, for example, but is not limited to, a transmit diversity (TD) technology and a receive diversity (RD) technology. The multiplexing technology may be a spatial multiplexing technology. In addition, the foregoing technologies may further include a plurality of implementation solutions. For example, the transmit diversity technology may include transmit diversity.

An important function of the MIMO technology is transmit diversity (TD). In the transmit diversity, an original signal (for example, a symbol) is transmitted in a redundant manner in time, frequency, and space (for example, through an antenna) or in any combination of the three dimensions, to improve transmission reliability. During implementation, a quantity for redundant transmission may be set based on a channel model or channel quality. An object of the redundant transmission may be the original signal, or may be a signal obtained by processing the original signal. The processing may include, for example, but is not limited to, processing such as delaying, negation, conjugation, and rotation, and processing obtained through derivation, evolution, and combination of the foregoing processing.

Currently, common transmit diversity includes, for example, but is not limited to, diversity modes such as space-time transmit diversity (STTD), space-frequency transmit diversity (SFTD), time switched transmit diversity (TSTD), frequency switched transmit diversity (FSTD), orthogonal transmit diversity (OTD), and cyclic delay diversity (CDD), and a diversity mode obtained through derivation, evolution, and combination of the foregoing diversity modes. For example, currently, transmit diversity modes such as space time block coding (STBC), space frequency block coding (SFBC), and the CDD are used in the long term evolution (LTE) standard.

The foregoing disclosure generally describes the transmit diversity by using examples. A person skilled in the art should understand that, in addition to the foregoing examples, the transmit diversity further includes a plurality of other implementations. Therefore, the foregoing descriptions should not be construed as a limitation on technical solutions of this application, and technical solutions of this application should be understood as being applicable to various possible transmit diversity schemes.

In addition, the base stations 102 to 106 and the terminal devices 108 to 122 may perform communication by using various wireless communication technologies.

With a continuous development of communication theories and practice, an increasing quantity of wireless communication technologies have emerged and gradually become mature. The wireless communication technologies include but are not limited to a time division multiple access (TDMA) technology, a frequency division multiple access (FDMA) technology, a code division multiple access (CDMA) technology, a time division-synchronous code division multiple access (TD-SCDMA) technology, an orthogonal frequency division multiple access (OFDMA) technology, a single carrier frequency division multiple access (SC-FDMA) technology, a space division multiple access (SDMA) technology, technologies evolved and derived from the foregoing technologies, and the like. As radio access technologies (RAT), the foregoing wireless communication technologies are used in many wireless communication standards, to construct various currently well-known wireless communication systems (or networks), including but not limited to a global system for mobile communications (GSM), CDMA2000, wideband CDMA (WCDMA), Wi-Fi defined in the 802.11 series standards, worldwide interoperability for microwave access (WiMAX), LTE, LTE-advanced (LTE-A), 5G, evolved systems of the foregoing wireless communication systems, and the like. Unless otherwise specified, technical solutions provided in embodiments of this application may be used in the foregoing various wireless communication technologies and wireless communication systems. In addition, the terms "system" and "network" are interchangeable.

It should be noted that the wireless communication network 100 shown in FIG. 1 is only an example, and is not intended to limit technical solutions of this application. A person skilled in the art should understand that, during implementation, the wireless communication network 100 may alternatively include another device, and a quantity of base stations and a quantity of terminal devices may alternatively be configured according to a specific requirement.

To better understand embodiments of this application, the following several items are described before embodiments of this application are described.

1. For ease of description, when numbering is performed, consecutive numbering may start from 1. For example, $N_f$ frequency domain units may include a $1^{st}$ frequency domain unit to an NP frequency domain unit. Certainly, implementation is not limited thereto. For example, consecutive numbering may alternatively start from 0. For example, $N_f$ frequency domain units may include a $0^{th}$ frequency domain unit to an $(N_f-1)^{th}$ frequency domain unit. For brevity, examples are not listed one by one herein. In addition, numbering of corresponding indexes may start from 1 or 0. For example, an index of the $1^{st}$ frequency domain unit is 1, and an index of the NP frequency domain unit is $N_f$, or an index of the $0^{th}$ frequency domain unit is 0, and an index of the $(N_f-1)^{th}$ frequency domain unit is $N_f-1$.

It should be understood that the foregoing descriptions are all provided for ease of description of technical solutions provided in embodiments of this application, but are not intended to limit the scope of this application.

2. In this application, matrix and vector transformation and function operations are included in a plurality of cases. For ease of understanding, unified descriptions are provided herein. Matrices A, N, and the like described in this part are all examples.

For the matrix A, a superscript T indicates transposition. For example, AT indicates transposition of the matrix (or vector) A. A superscript H indicates conjugate transposition. For example, AH indicates conjugate transposition of the matrix (or vector) A.

A diag( ) function indicates a diagonal matrix.

An N % Q function indicates to take a remainder of N/Q.

A $\lceil\ \rceil$ function indicates rounding up, and may alternatively be expressed as ceil( ). A result of rounding up x may be expressed as a minimum integer not less than x.

A $\lfloor\ \rfloor$ function indicates rounding down, and may alternatively be expressed as floor( ). A result of rounding down x may be expressed as a maximum integer that is not greater than x.

3. In this application, "indicating" may include directly indicating and indirectly indicating. When indication information is described as indicating A, the description may include that the indication information directly indicates A or indirectly indicates A, but does not mean that the indication information necessarily carries A.

Information indicated by indication information is referred to as to-be-indicated information. During implementation, the to-be-indicated information may be indicated in a plurality of manners. For example, the to-be-indicated information may be directly indicated. For example, the to-be-indicated information or an index of the to-be-indicated information is indicated. Alternatively, the to-be-indicated information may be indirectly indicated by indicating other information, where there is an association relationship between the other information and the to-be-indicated information. Alternatively, only a part of the to-be-indicated information may be indicated, and another part of the to-be-indicated information is known or is pre-agreed upon. For example, specific information may alternatively be indicated by an information arrangement sequence that is pre-agreed upon (for example, stipulated in a protocol), to reduce indication overheads to some extent. In addition, a common part of information may alternatively be identified and indicated in a unified manner to reduce indication overheads caused by separately indicating same information. For example, a person skilled in the art should understand that a precoding matrix includes precoding vectors, and the precoding vectors in the precoding matrix may have a same part in terms of composition or another attribute.

In addition, specific indication manners may alternatively be various conventional indication manners, for example, but not being limited to, the foregoing indication manners and various combinations thereof. For details of the various indication manners, refer to the conventional technology. Details are not described in this specification. It can be learned from the foregoing descriptions that, for example, when a plurality of pieces of information of a same type need to be indicated, different information may be indicated in different manners. During implementation, a required indication manner may be selected according to a specific requirement. The selected indication manner is not limited in embodiments of this application. In this way, the indication manner in embodiments of this application should be understood as covering various methods that enable a to-be-indicated entity to learn of the to-be-indicated information.

The to-be-indicated information may be sent as a whole, or may be divided into a plurality of pieces of sub-information for separate sending. In addition, sending periodicities and/or sending occasions of the sub-information may be the same or different. A specific sending method is not limited in this application. The sending periodicities and/or the sending occasions of the sub-information may be predefined, for example, predefined according to a protocol, or may be configured by a transmitting device by sending configuration information to a receiving device. The configuration information may include, for example, but is not limited to, one or a combination of at least two of radio resource control signaling, medium access control (MAC) layer signaling, and physical (PHY) layer signaling. The radio resource control signaling includes, for example, radio resource control (RRC) signaling. The MAC layer signaling includes, for example, a MAC control element (CE). The physical layer signaling includes, for example, downlink control information (DCI).

4. Definitions listed in this application for many features (for example, a precoding matrix indicator (PMI), a channel, a resource block (RB), a resource block group (RBG), a subband, a precoding resource block group (PRG), and a resource element (RE)) are merely examples for explaining functions of the features.

5. First, second, and various numbers in the following embodiments are merely intended for distinguishing for ease of description, but not to limit the scope of embodiments of this application. For example, the terms are intended to distinguish between different indication information.

6. "Predefinition" or "preconfiguration" may be implemented by pre-storing corresponding code or a corresponding table on a device (for example, including a terminal device and a network device) or in another manner that may be used to indicate related information. An implementation of "predefinition" or "preconfiguration" is not limited in this application. "Storage" may be storage in one or more memories. The one or more memories may be separately disposed, or may be integrated in an encoder, a decoder, a processor, or a communication apparatus. Alternatively, some of the one or more memories may be separately disposed, and some of the one or more memories are integrated in a decoder, a processor, or a communication apparatus. A type of the memory may be a storage medium in any form. This is not limited in this application.

7. A "protocol" in embodiments of this application may be a standard protocol in the communication field, for example, may include the LTE protocol, the new radio (NR) protocol, and a related protocol applied to a future communication system. This is not limited in this application.

8. "At least one" means one or more, and "a plurality of" means two or more. "And/or" describes an association relationship between associated objects and indicates that three relationships may exist. For example, A and/or B may indicate the following three cases: Only A exists, both A and B exist, and only B exists, where A and B may be singular or plural. The character "/" usually indicates an "or" relationship between the associated objects. "At least one of the following items" or a similar expression thereof indicates any combination of the items, including one of the items or any combination of a plurality of the items. For example, at least one of a, b, and c may indicate a, b, c, a and b, a and c, b and c, or a, b, and c, where a, b, and c each may be singular or plural.

9. In embodiments of this application, descriptions such as "when", "in a case that", and "if" mean that a device (for example, a terminal device or a network device) performs corresponding processing in an objective case, but are not intended to limit time, do not require that the device (for example, the terminal device or the network device) perform a determining action during implementation, and do not mean any other limitation.

For ease of understanding embodiments of this application, the following briefly describes terms in embodiments of this application.

1. Precoding Technology

The precoding technology enables a sending device and a plurality of receiving devices to perform transmission on a same time-frequency resource. That is, multi-user multiple input multiple output (MU-MIMO) is implemented. It should be understood that related descriptions of the precoding technology in this specification are merely examples for ease of understanding, but are not intended to limit the protection scope of embodiments of this application. During implementation, a network device performs a determination based on downlink channel state information (CSI), fed back by a terminal device to the network device, of the downlink channel. In addition, precoding may alternatively be performed in another manner. For example, when channel state information (for example, but not limited to, a channel matrix) cannot be obtained, precoding is performed by using a preset precoding matrix or in a preset weighting manner. For brevity, specific content thereof is not described in this specification.

2. Quantity of Transport Layers

The quantity of transport layers may also be referred to as a rank or a quantity of spatial layers of a precoding matrix, to be specific, a maximum quantity of data streams that can be transmitted in parallel in a MIMO system. Assuming that v indicates the quantity of spatial layers, a value of v may be 1, 2, 3, or 4. To be specific, a quantity of data streams that can be transmitted in parallel in the MIMO system is 1, 2, 3, or 4. In addition, in this specification, the quantity of spatial layers may also be referred to as the number of spatial layers.

3. Frequency Domain Unit

The frequency domain unit may also be referred to as a frequency unit. The frequency domain unit represents a unit of frequency domain resources, and may represent different frequency domain resource granularities. The frequency domain unit may include, for example, but not limited to, one or more subbands (SB), one or more resource blocks (RB), one or more resource block groups (RBG), and one or more precoding resource block groups (PRG). A specific definition of the frequency domain unit is not limited in this application.

For example, a frequency length occupied by each frequency domain unit may be bandwidth of a frequency domain subband, or may be a specific multiple of bandwidth of a frequency domain subband, where the multiple may be ½ or ¼. Alternatively a frequency domain length occupied by each frequency domain unit may be 1, 2, or 4 RBs.

4. Space-Frequency Compressed Codebook

The space-frequency compressed codebook is obtained by performing linear combination on a plurality of selected spatial domain vectors and a plurality of selected frequency domain vectors based on a correlation of a frequency domain channel. The spatial domain vector may be referred to as a space domain beam base vector, a space domain beam vector, or a space domain base vector. The frequency domain vector may be referred to as a frequency domain base vector. A coefficient corresponding to the linear combination of the spatial domain vector and the frequency domain vector may be referred to as a space-frequency combination coefficient, a space-frequency weighting coefficient, a combination coefficient, a linear combination coefficient, a complex coefficient, a weighting coefficient, or the like. For ease of description, the weighting coefficient is used as an example for description in this specification.

For example, a quantity of spatial layers is 1, and there are two polarization directions. Precoding matrices corresponding to $N_f$ frequency domain units may be combined into a $2N_1N_2 \times N_f$-dimensional precoding matrix V:

$$V = \begin{bmatrix} V_1 & V_2 & \cdots & V_{N_f} \end{bmatrix} \tag{1}$$

$N_1$ and $N_2$ are quantities of antenna ports in a horizontal direction and a vertical direction respectively. $V_1$ to $V_{Nf}$ indicate $N_f$ precoding vectors respectively corresponding to the $N_f$ frequency domain units. In this specification, the $N_f$ frequency domain units may be a transmission bandwidth of a reference signal at each port. The $N_f$ frequency domain units may be frequency domain units with consecutive or inconsecutive frequencies. Correspondingly, in this application, an index of each of the $N_f$ frequency domain units is described based on an order in which the $N_f$ frequency domain units are sorted based on values of frequencies or the like, but not based on an index in system bandwidth. Optionally, in embodiments of this application, indexes of the $N_f$ frequency domain units in the system bandwidth may alternatively be used for description, with the same essence. For ease of understanding and description, details are not described in this application again.

Optionally, the precoding matrix V shown in the formula (1) may be converted into the following formula:

$$V = W_1 \tilde{W} W_3^H$$

$W_1$ is a matrix including selected spatial domain vectors. For example, $W_1$ may be a $2N_1N_2 \times 2L$-dimensional matrix including a total of 2L spatial domain vectors selected in a dual-polarization direction; where L is a quantity, configured by a network device, of spatial domain vectors selected at each spatial layer. $W_3$ is a matrix including selected frequency domain vectors. For example, $W_3$ is a matrix including one or more frequency domain vectors selected from a predefined discrete Fourier transform (DFT) base matrix. It is assumed that all spatial domain vectors at a spatial layer corresponds to same $M_v$ frequency domain vectors; where $M_v$ is a quantity, configured by the network device, of frequency domain vectors correspondingly selected at each spatial layer, and v indicates a quantity of spatial layers. In this case, dimensions of $$W_3^H$$

are $M_v \times N_f$. To be specific, each column vector in $W_3$ corresponds to one frequency domain vector, and frequency domain vectors corresponding to each spatial domain vector in $W_1$ are the $M_v$ frequency domain vectors in $W_3$. $\tilde{W}$ is a $2L \times M_v$-dimensional weighting coefficient matrix. An $i^{th}$ row of $\tilde{W}$ corresponds to an $i^{th}$ spatial domain vector of the 2L spatial domain vectors in $W_1$, and a $j^{th}$ column corresponds to a $j^{th}$ frequency domain vector of the $M_v$ frequency domain vectors in $W_3$. A weighting coefficient corresponding to the $j^{th}$ spatial domain vector is an $i^{th}$ row vector in $\tilde{W}$, to be specific, elements included in the $i^{th}$ row vector.

Optionally, same spatial domain vectors are selected for each spatial layer in the dual-polarization direction (which may also be referred to as two polarization directions, and are referred to as a polarization direction 1 and a polarization direction 2 in this specification). In this case, $W_1$ may be expressed as follows:

$$W_1 = \begin{bmatrix} b_{I_{S(0)}} & b_{I_{S(1)}} & \cdots & b_{I_{S(L-1)}} & 0 & 0 & \cdots & 0 \\ 0 & 0 & \cdots & 0 & b_{I_{S(0)}} & b_{I_{S(1)}} & \cdots & b_{I_{S(L-1)}} \end{bmatrix} \tag{3}$$

The spatial domain vector is a base vector selected from a rotated DFT base matrix. $b_{I_{S(i)}}$ indicates an $i^{th}$ base vector selected from the rotated DFT base matrix. The subscript $I_{S(i)}$ indicates an index of the $i^{th}$ base vector. As shown in the formula (3), L base vectors may be selected in each polarization direction as spatial domain vectors included in the $W_1$.

A rotated DFT base matrix of the two polarization directions may be expressed as follows:

$$B_{N_1N_2}(q_1, q_2) = \left(R_{N_1}(q_1)D_{N_1}\right) \otimes \left(R_{N_2}(q_2)D_{N_2}\right) = \begin{bmatrix} b_0 & b_1 & \cdots & b_{N_1N_2-1} \end{bmatrix} \tag{4}$$

$D_N$ is an N×N orthogonal DFT matrix, an element $[D_N]_{m,n}$ in an $m^{th}$ row and an $n^{th}$ column of $D_N$ is $$\frac{1}{\sqrt{N}} e^{\frac{j2\pi mn}{N}},$$

and N may be equal to $N_1$ or $N_2$. $R_N(q)$ is an N×N rotation matrix, and $R_N(q)$ may be expressed as follows:

$$R_N(q) = \mathrm{diag}\left(\left[\begin{matrix} e^{j2\pi\cdot 0\cdot\frac{q}{ON}} & e^{j2\pi\cdot 1\cdot\frac{q}{ON}} & \ldots & e^{j2\pi\cdot(N-1)\cdot\frac{q}{ON}}\end{matrix}\right]\right) \quad (5)$$

q is an oversampling factor. N is equal to $N_1$, and q is equal to $q_1$; or N is equal to $N_2$, and q is equal to $q_2$. $q_1=0,1, \ldots O_1-1$, and $q_2=0,1, \ldots O_2-1$.

If N is equal to $N_1$ and q is equal to $q_1$, $R_{N_1}(q_1)$ may be expressed as follows:

$$R_{N_1}(q_1) = \mathrm{diag}\left(\left[\begin{matrix} 1 & e^{j2\pi\cdot 1\cdot\frac{q_1}{O_1N_1}} & \ldots & e^{j2\pi\cdot(N_1-1)\cdot\frac{q_1}{O_1N_1}}\end{matrix}\right]\right) \quad (6)$$

If N is equal to $N_2$ and q is equal to $q_2$, $R_{N_2}(q_2)$ may be expressed as follows:

$$R_{N_2}(q_2) = \mathrm{diag}\left(\left[\begin{matrix} 1 & e^{j2\pi\cdot 1\cdot\frac{q_2}{O_2N_2}} & \ldots & e^{j2\pi\cdot(N_2-1)\cdot\frac{q_2}{O_2N_2}}\end{matrix}\right]\right) \quad (7)$$

Correspondingly, in a matrix including products of the rotation matrix $R_N(q)$ and the orthogonal DFT matrix $D_N$, an element in an $m^{th}$ row and an $n^{th}$ column is as follows:

$$[R_N(q)D_N]_{m,n} = \frac{1}{\sqrt{N}}e^{\frac{j2\pi m(On+q)}{ON}} \quad (8)$$

If N is equal to $N_1$ and q is equal to $q_1$, in a matrix including products of the rotation matrix $R_{N_1}(q_1)$ and the orthogonal DFT matrix $D_{N_1}$, an element in an $m^{th}$ row and an $n^{th}$ column is as follows:

$$\left[R_{N_1}(q_1)D_{N_1}\right]_{m,n} = \frac{1}{\sqrt{N_1}}e^{\frac{j2\pi m(O_1n+q_1)}{O_1N_1}} \quad (9)$$

If N is equal to $N_2$ and q is equal to $q_2$, in a matrix including products of the rotation matrix $R_{N_2}(q_2)$ and the orthogonal DFT matrix $D_{N_2}$, an element in an $m^{th}$ row and an $n^{th}$ column is as follows:

$$\left[R_{N_2}(q_2)D_{N_2}\right]_{m,n} = \frac{1}{\sqrt{N_2}}e^{\frac{j2\pi m(O_2n+q_2)}{O_2N_2}} \quad (10)$$

For different quantities v of spatial layers, a value of the quantity $M_v$ of frequency domain base vectors included in $W_3$ may vary. The value of $M_v$ is related to the quantity $N_f$ of frequency domain units. An example is as follows:

$$M_v = \left\lceil p_v \cdot \frac{N_f}{R}\right\rceil \quad (11)$$

$p_v$ is a factor for determining a quantity of frequency domain vectors, and R is a factor of a granularity of a frequency domain unit. A value of $p_v$ may be {½, ¼, ⅛}. A value of R may be 1 or 2.

It can be learned that, to enable the network device to construct a precoding matrix based on the formula (2), a terminal device needs to report the following information:

(1) a rank indication, namely, a rank value;

(2) indexes corresponding to the L space domain base vectors included in the $W_1$ matrix;

(3) indexes corresponding to $M_v$ frequency domain base vectors included in a $W_3$ matrix corresponding to each spatial layer; and (4) a weighting coefficient in a $\tilde{W}$ matrix corresponding to each spatial layer.

To control reporting overheads, after space-frequency compression is performed, the network device configures the terminal device to report a maximum of $K_0$ weighting coefficients in $\tilde{W}$ corresponding to each spatial layer, and report a maximum of $2K_0$ weighting coefficients in $\tilde{W}$ corresponding to all spatial layers, where $K_0 \le 2LM_v$. It is assumed that a quantity of weighting coefficients actually correspondingly reported at an $l^{th}$ spatial layer is $$K_l^{NZ},$$

where $1 \le l \le v$. In this case, a quantity of weighting coefficients actually correspondingly reported at all the spatial layers is $K^{NZ}$ that is, $$K^{NZ} = \sum_{l=1}^{v} K_l^{NZ},$$

where $$K_l^{NZ} \le K_0,$$

and $K^{NZ} \le 2K_0$.

A value of $K_0$ is related to a quantity L of spatial domain vectors correspondingly selected in each polarization direction of each spatial layer and a quantity $M_v$ of frequency domain vectors corresponding to each spatial domain vector. Optionally, the value of $K_0$ may be obtained by using the following formula:

$$K_0 = \lceil \beta \cdot 2LM_1 \rceil \quad (12)$$

A value of β may be {¾, ½, ¼}, and $M_v$ may be calculated by using the formula (11). In addition, in the formula (12), a value of $M_1$ is required for calculating $K_0$. Therefore, regardless of a value of the quantity v of spatial layers, $M_1$ needs to be calculated based on the formula (11) by using $p_1$ that is obtained when v is equal to 1, and then $K_0$ is calculated based on $M_1$ and the formula (12).

To report the $K^{NZ}$ weighting coefficients, the terminal device needs to report location indication information, amplitude indication information, and phase indication information of the $K^{NZ}$ weighting coefficients. The location indication information notifies the network device of locations (which may be referred to as indexes) of the $K^{NZ}$ weighting coefficients in $\tilde{W}$. The amplitude indication information and the phase indication information notify the network device of weighting coefficients at corresponding locations. Location indication information of the $$K_l^{NZ}$$

weighting coefficients at the $l^{th}$ spatial layer may be indicated by a bitmap (to be specific, $2LM_v$ bits) corresponding to the $l^{th}$ spatial layer. Location indication information of the $K^{NZ}$ weighting coefficients actually reported at all the spatial layers may be indicated by a bitmap corresponding to all the spatial layers.

Optionally, the terminal device may normalize amplitude values of weighting coefficients for each spatial layer, and then perform differential processing by using a reference amplitude as a reference, and then perform reporting. The $$K_l^{NZ}$$

weighting coefficients weighting correspondingly reported at the $l^{th}$ spatial layer are used as an example. The $$K_l^{NZ}$$

weighting coefficients are normalized by using an amplitude value of a weighting coefficient with a largest amplitude value among the $$K_l^{NZ}$$

weighting coefficients as a reference, and an amplitude value of a normalized weighting coefficient with a largest amplitude value is 1. In this way, in a polarization direction in which the weighting coefficient with the largest amplitude value among the $$K_l^{NZ}$$

weighting coefficients is located, a reference amplitude is 1. An amplitude value of a weighting coefficient with a largest amplitude value in another polarization direction is used as a reference amplitude in the polarization direction. Optionally, the reference amplitude is quantized by using four bits and is reported. Candidate quantized amplitude values that are obtained through four-bit quantization include $$\left\{1, \left(\frac{1}{2}\right)^{\frac{1}{4}}, \left(\frac{1}{4}\right)^{\frac{1}{4}}, \ldots, \left(\frac{1}{2^{14}}\right)^{\frac{1}{4}}, 0\right\}.$$

In each polarization direction, the terminal device determines, by using a reference amplitude (or a reference amplitude obtained through quantization, namely, a quantized reference amplitude) corresponding to the polarization direction as a reference, a differential amplitude of each weighting coefficient corresponding to the polarization direction. The terminal device may then perform three-bit quantization to obtain a quantized differential amplitude (or referred to as a quantized value of the differential amplitude), and uses the quantized differential amplitude as a differential amplitude to be indicated by differential amplitude indication information corresponding to each weighting coefficient. Candidate quantized amplitude values that are obtained through three-bit quantization may include $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Optionally, the terminal device may quantize a phase of a weighting coefficient at each spatial layer by using three bits (for example, 8 phase shift keying (8PSK), where one symbol represents three bits) or four bits (for example, 16 phase shift keying (16PSK), where one symbol represents four bits), and use a quantized phase as a phase to be indicated by phase indication information corresponding to the weighting coefficient.

Therefore, for the $K^{NZ}$ weighting coefficients that need to be reported, the terminal device may report the following information:

(4.1) location indication information of a weighting coefficient corresponding to each spatial layer, that is, a bitmap of $2LM_v$ bits;

(4.2) location indication information of a strongest weighting coefficient corresponding to each spatial layer, where the strongest weighting coefficient is a weighting coefficient with a largest amplitude value, and may also be referred to as a maximum weighting coefficient;

(4.3) a reference amplitude corresponding to a polarization direction of each spatial layer, where the polarization direction is a polarization direction other than a polarization direction in which a strongest weighting coefficient at the spatial layer is located;

(4.4) differential amplitude indication information of $$K_l^{NZ}$$

weighting coefficients correspondingly reported at each spatial layer; and (4.5) phase indication information of $$K_l^{NZ}$$

weighting coefficients correspondingly reported at each spatial layer.

In this way, the network device can construct a space-frequency compressed codebook based on the formula (2) by using the information reported by the terminal device. For example, a joint precoding matrix corresponding to a frequency domain unit with an index t at the $l^{th}$ spatial layer may be expressed as follows:

$$V_{l,t} = \frac{1}{\sqrt{N_1 N_2 \gamma_{t,l}}} \begin{bmatrix} \sum_{i=0}^{L-1} v_{m_1^{(i)},m_2^{(i)}} P_{l,0}^{(1)} \sum_{f=0}^{M_v-1} y_{t,l}^{(f)} P_{l,i,f}^{(2)} \varphi_{l,i,f} \\ \sum_{i=0}^{L-1} v_{m_1^{(i)},m_2^{(i)}} P_{l,1}^{(1)} \sum_{f=0}^{M_v-1} y_{t,l}^{(f)} P_{l,i+L,f}^{(2)} \varphi_{l,i+L,f} \end{bmatrix} \quad (13)$$

$\gamma_{t,l}$ indicates a power normalization factor, and $$v_{m_1^{(i)},m_2^{(i)}}$$

indicates space domain base vectors selected in two polarization directions, where $$m_1^{(i)} = O_1 n_1^{(i)} + q_1,\ m_2^{(i)} = O_2 n_2^{(i)} + q_2, \text{ and } i = 0, 1, \ldots, L-1.\ n_1^{(i)} \in \{0, 1, \ldots, N_1 - 1\}$$

indicates an index of an $i^{th}$ space domain base vector correspondingly selected for an antenna port in a horizontal direction, and $$n_1^{(i)} \in \{0, 1, \ldots, N_1 - 1\}$$

indicates an index of an $i^{th}$ space domain base vector correspondingly selected for the antenna port in a vertical direction. $q_1=0, 1, \ldots, O_1-1$, and indicates an oversampling factor selected in the horizontal direction. $q_2=0, 1, \ldots, O_2-1$, and indicates an oversampling factor selected in the vertical direction.

$$y_{t,l}^{(f)}$$

indicates a frequency domain base vector correspondingly selected at the $l^{th}$ spatial layer, and $$y_{t,l}^{(f)} = e^{j\frac{2\pi t n_{3,l}^{(f)}}{N_f}},$$

where $$n_{3,l}^{(f)}$$

indicates an index of a frequency domain base vector correspondingly selected at the $l^{th}$ spatial layer, and $$f = 0, 1, \ldots, M_v - 1.\ p_{l,0}^{(1)} \text{ and } p_{l,1}^{(1)}$$

indicate reference amplitudes, respectively corresponding to a polarization direction 1 and a polarization direction 2 of the $l^{th}$ spatial layer, of weighting coefficients.

$$p_{l,i,f}^{(2)}$$

indicates a differential amplitude of a weighting coefficient corresponding to an $i^{th}$ spatial domain vector and an $f^{th}$ frequency domain vector that are correspondingly selected at the $l^{th}$ spatial layer. $\varphi_{l,i,f}$ indicates a phase of the weighting coefficient corresponding to the $i^{th}$ spatial domain vector and the $f^{th}$ frequency domain vector that are correspondingly selected at the $l^{th}$ spatial layer. For example, $$\varphi_{l,i,f} = e^{j\frac{2\pi c_{l,i,f}}{16}},$$

and $c_{l,i,f} \in \{0, \ldots, 15\}$.

5. Information Related to a Weighting Coefficient

A weighting coefficient is determined based on amplitude information and phase information corresponding to the weighting coefficient. Therefore, the following describes related content of amplitude indication information, differential amplitude indication information, and phase indication information in this specification with reference to the foregoing manners of reporting amplitude information and phase information of a weighting coefficient.

In this application, amplitude indication information reported by a terminal device when the terminal device reports an amplitude value of the weighting coefficient may indicate one or more of the following three types of amplitude information. In a manner, the amplitude indication information indicates a quantized amplitude value obtained by normalizing and quantizing an amplitude of the weighting coefficient. In another manner, the amplitude indication information indicates an index, in candidate quantized amplitude values, of a quantized differential amplitude value obtained by normalizing and quantizing an amplitude of the weighting coefficient. In the latter manner, the amplitude indication information may also be referred to as differential amplitude indication information. In addition, if the amplitude indication information indicates a reference amplitude, a quantized reference amplitude value, or an index of a quantized reference amplitude value in candidate quantized amplitude values, the amplitude indication information may be referred to as reference amplitude indication information.

In this application, phase indication information reported by the terminal device, when the terminal device reports a phase of the weighting coefficient, may indicate one or more of the following two types of phase information. In a manner, the phase indication information indicates a quantized phase value. In another manner, the phase indication information indicates an index of a quantized phase value in candidate quantized amplitude values.

In addition, the amplitude information of the weighting coefficient in this specification may be an amplitude, an amplitude value, a differential amplitude, a quantized amplitude value, an index of a quantized differential amplitude value, or the like of the weighting coefficient. Correspondingly, the phase information of the weighting coefficient in this specification may be a phase, a phase value, a quantized phase, a quantized phase value, or an index of a quantized phase or a quantized phase value of the weighting coefficient. The quantized amplitude value is equal to a product of the quantized differential amplitude value and the quantized reference amplitude value, and the amplitude value is equal to a product of the differential amplitude and the reference amplitude.

A strongest weighting coefficient corresponding to each spatial layer may be a weighting coefficient with a largest amplitude value in one or more weighting coefficients corresponding to the spatial layer.

Based on the foregoing descriptions of the space-frequency compressed codebook, it can be learned that the terminal device has a high flexibility. To be specific, for all spatial layers, the terminal device may autonomously determine a quantity of weighting coefficients that are actually to be reported, that is, $K^{NZ}$. Therefore, for the information (1) to the information (3) and the information (4.1) to the information (4.5) (as disclosed herein), overheads of channel state information reported by the terminal device have a quite large dynamic range. Therefore, the terminal device uses a two-level channel state information reporting structure: a channel state information part 1 (CSI Part 1) and a CSI part 2. The CSI part 1 is sent before the CSI part 2. The CSI part 1 has a fixed payload size, and may be used to determine a length of information bits included in the CSI part 2.

The CSI part 1 includes the following indication information: a rank indication (RI), a channel quality indication (CQI), and a total quantity of weighting coefficients correspondingly reported at all the spatial layers. Each piece of indication information included in the CSI part 1 is independently encoded. Optionally, each piece of indication information may correspond to one field or subfield. For example, a subfield corresponding to the RI in the CSI part 1 indicates the foregoing quantity v of spatial layers, and a subfield corresponding to the total quantity in the CSI part 1 indicates $K^{NZ}$.

The CSI part 2 includes the following indication information:

index indication information of spatial domain vectors respectively reported in two polarization directions, where an index of a spatial domain vector indicated by index indication information of a spatial domain vector correspondingly reported in a polarization direction 1 is denoted as $$n_1^{(i)},$$

an oversampling factor is denoted as $q_1$, $$n_1^{(i)} \in \{0, 1, \ldots, N_1 - 1\},$$

and $q_1$=0, 1, . . . , $O_1$−1; and an index of a spatial domain vector indicated by index indication information of a spatial domain vector correspondingly reported in a polarization direction 2 is denoted as $$n_2^{(i)},$$

an oversampling factor is denoted as $q_2$, $$n_2^{(i)} \in \{0, 1, \ldots, N_2 - 1\},$$

and $q_2$=0, 1, . . . , $O_2$−1;

index indication information of a frequency domain vector are correspondingly reported at each spatial layer, where an index of a frequency domain vector indicated by the index indication information of the frequency domain vector is denoted as $$n_3^{(f)};$$

location indication information of a strongest weighting coefficient are corresponding to each spatial layer;

reference amplitude indication information are corresponding to each spatial layer, where the reference amplitude indication information indicates a reference amplitude in a polarization direction other than a polarization direction in which the strongest weighting coefficient is located, a reference amplitude corresponding to a polarization direction 0 is denoted as $$p_{l,0}^{(1)},$$

a reference amplitude corresponding to the polarization direction 1 is denoted as $$p_{l,1}^{(1)},$$

and therefore the reference amplitude indication information indicates $$p_{l,0}^{(1)} \text{ or } p_{l,1}^{(1)};$$

location indication information of a weighting coefficient are correspondingly reported at each spatial layer, where the location indication information indicates a bitmap including $2vLM_v$ bits, a bit of a weighting coefficient are corresponding to an $i^{th}$ spatial domain vector and an $f^{th}$ frequency domain vector at an $l^{th}$ spatial layer are denoted as $$k_{l,i,f}^{(3)},\ k_{l,i,f}^{(3)} \in \{0, 1\},\ k_{l,i,f}^{(3)}$$

being 0 indicates that the weighting coefficient corresponding to the $i^{th}$ spatial domain vector and the $f^{th}$ frequency domain vectors at the $l^{th}$ spatial layer is to not be reported, and $$k_{l,i,f}^{(3)}$$

being 1 indicates that the weighting coefficient corresponding to the $i^{th}$ spatial domain vector and the $f^{th}$ frequency domain vectors at the $l^{th}$ spatial layer is to be reported;

differential amplitude indication information of a weighting coefficient are correspondingly reported at each spatial layer, where the differential amplitude indication information indicates a differential amplitude of the correspondingly reported weighting coefficient, and the differential amplitude is denoted as $$p_{l,i,f}^{(2)};$$

and phase indication information of a weighting coefficient are correspondingly reported at each spatial layer, where the phase indication information indicates a phase of the correspondingly reported weighting coefficient, and the phase is denoted as $\varphi_{l,i,f}$.

As described above, overheads of channel state information reported by the terminal device are quite flexibly implemented. To control channel state information reporting overheads, when the overheads of the channel state information exceed a specific limit, some information in the CSI part 2 may be deleted based on a priority. For location indication information, differential amplitude indication information, and phase indication information of each weighting coefficient that are correspondingly reported in a CSI report 2, corresponding priorities may be set based on the following formula. For example, a priority Pri(l,i,f) of the weighting coefficient of the $i^{th}$ spatial domain vector and the $f^{th}$ frequency domain vector that correspond to the $l^{th}$ spatial layer is as follows:

$$Pri(l,i,f)=2\cdot L\cdot v\cdot\pi(f)+v\cdot i+l \tag{14}$$

$$\pi(f)=\min\left(2\cdot n_{3,l}^{(f)},\,2\cdot\left(N_3-n_{3,l}^{(f)}\right)-1\right) \tag{15}$$

L is a quantity, configured by a network device, of spatial domain vectors selected at each spatial layer, v indicates a quantity of spatial layers, $$n_{3,l}^{(f)}$$

indicates an index of the f frequency domain base vector correspondingly selected at the $l^{th}$ spatial layer, and $N_3$ is a quantity of frequency domain units.

A smaller Pri(l,i,f) indicates higher priorities of location information, differential amplitude information (or amplitude information), and phase information of a corresponding weighting coefficient. That is, a smaller Pri(l,i,f) indicates higher priorities of location indication information, differential amplitude indication information (or amplitude indication information), and phase indication information of the weighting coefficient. Optionally, the priority may also be referred to as a priority of a corresponding weighting coefficient. For example, a smaller Pri(l,i,f) indicates a higher priority of a corresponding weighting coefficient.

Based on priorities of location indication information, differential amplitude indication information (or amplitude indication information), and phase indication information of different weighting coefficients, and an importance of other information in the CSI part 2, indication information in the CSI part 2 is divided into the following three groups.

A group 0 in the CSI part 2 includes the following indication information: index indication information of spatial domain vectors respectively reported in two polarization directions, where the index indication information includes $i_{1,1}$ and $i_{1,2}$, $i_{1,1}$ indicates $[q_1, q_2]$, and $i_{1,2}$ indicates and $$n_1^{(i)} \text{ and } n_2^{(i)}.$$

Location indication information, denoted as $i_{1,8,l}$, of a strongest weighting coefficient that correspond to each spatial layer, where $l=(1, \ldots, v)$, and if a rank is 1, a location indicated by $i_{1,8,l}$ is one of locations of $2LM_1$ optional weighting coefficients, or if a rank is greater than 1, $i_{1,8,l}$ indicates an index of a spatial domain vector corresponding to the strongest weighting coefficient. Then a location of the strongest weighting coefficient may be determined based on the index of the spatial domain vector.

A group 1 in the CSI part 2 includes the following indication information: index indication information of a frequency domain vector correspondingly reported at each spatial layer, where the index indication information includes $i_{1,5}$ and/or $i_{1,6,l}$, and indicates $$n_{3,l}^{(f)},$$

$l=(1, \ldots, v)$, and $f=0, 1, \ldots, M_v-1$. When the quantity $N_f$ of frequency domain units is greater than 19, $i_{1,5}$ indicates a start location of a window with a length of $2M_v$, the window represents a vector index set including $2M_v$ frequency domain vectors whose indexes are cyclically consecutive, the start location of the window may be an index value corresponding to a start frequency domain vector in the vector index set including the $2M_v$ frequency domain vectors whose indexes are cyclically consecutive, $i_{1,6,l}$ indicates $M_v-1$ frequency domain vectors, included in the window with a length of $2M_v$ of remaining reported frequency domain vectors obtained by removing a frequency domain vector with an index of 0 from correspondingly reported frequency domain vectors, $i_{1,5}\in\{0, 1, \ldots, 2M_v-1\}$, and $$i_{1,6,l}=\left\{0,1,\ldots,\binom{2M_v-1}{M_v-1}-1\right\}.$$

When the quantity $N_f$ of frequency domain units is less than 19, the index indication information does not include $i_{1,5}$, $i_{1,6,l}$ indicates $M_v-1$ frequency domain vectors, included in all $N_f-1$ optional frequency domain vectors, of remaining selected frequency domain vectors obtained by removing a frequency domain vector with an index of 0 from selected frequency domain vectors, and $$i_{1,6,l}=\left\{0,1,\ldots,\binom{N_f-1}{M_v-1}-1\right\}\cdot\binom{2M_v-1}{M_v-1}$$

indicates a quantity of combinations, or in other words, a quantity of possible combinations of $M_v-1$ frequency domain vectors selected from $2M_v-1$ frequency domain vectors, and correspondingly, $$\binom{N_f-1}{M_v-1}$$

indicates a quantity of possible combinations of $M_v-1$ frequency domain vectors selected from $N_3-1$ frequency domain vectors. Reference amplitude indication information (denoted as $i_{1,6,l}$) corresponding to each spatial layer is used to indicate $$p_{l,0}^{(1)} \text{ or } p_{l,1}^{(1)},$$

where optionally, $i_{1,6,l}$ may indicate an index corresponding to a quantized value of $$p_{l,0}^{(1)} \text{ or } p_{l,1}^{(1)}.$$

$v2LM_v-\lfloor K^{NZ}/2\rfloor$ elements with higher priorities in location indication information of a weighting coefficient correspondingly are reported at each spatial layer, where a set of the location indication information of the weighting coefficient correspondingly reported at each spatial layer is denoted as $i_{1,7,l}$ that is, $v2LM_v-\lfloor K^{NZ}/2\rfloor$ elements with higher priorities in $i_{1,7,l}$ (to be specific, $v2LM_v-\lfloor K^{NZ}/2\rfloor$ pieces of location information with higher priorities and corresponding to $$k_{l,i,f}^{(3)} \in \{0, 1\}$$

in a bitmap including $v2LM_v$ bits) are included. $\lceil K^{NZ}/2\rceil-v$ elements with higher priorities in differential amplitude indication information of $K^{NZ}-v$ weighting coefficients, where a set of the differential amplitude indication information of the $K^{NZ}-v$ weighting coefficients is denoted as $i_{2,4,l}$, that is, $\lceil K^{NZ}/2\rceil-v$ elements with higher priorities in $i_{2,4,l}$ are included, the $\lceil K^{NZ}/2\rceil-v$ elements correspondingly indicate $\lceil K^{NZ}/2\rceil-v$ pieces of differential amplitude information with higher priorities, for example, $$p_{l,i,f}^{(2)},$$

and optionally, $i_{2,4,l}$ may indicate an index corresponding to a quantized value of a differential amplitude. $\lceil K^{NZ}/2\rceil-v$ elements with higher priorities in phase indication information of $K^{NZ}-v$ weighting coefficients, where a set of the phase indication information of the $K^{NZ}-v$ weighting coefficients is denoted as $i_{2,5,l}$, that is, $\lceil K^{NZ}/2\rceil-v$ elements with higher priorities in $i_{2,5,l}$ are included, the $\lceil K^{NZ}/2\rceil-v$ elements correspondingly indicate $\lceil K^{NZ}/2\rceil-v$ pieces of phase information with higher priorities. For example, $\varphi_{l,i,f}$, and optionally, $i_{2,5,l}$ may indicate an index corresponding to a quantized value of a phase.

A group 2 in the CSI part 2 includes the following indication information:

- $\lfloor K^{NZ}/2\rfloor$ elements with lower priorities in location indication information of a weighting coefficient are correspondingly reported at each spatial layer, that is, $\lfloor K^{NZ}/2\rfloor$ elements with lower priorities in $i_{1,7,l}$ where the $\lfloor K^{NZ}/2\rfloor$ elements correspondingly indicate location information of $\lfloor K^{NZ}/2\rfloor$ weighting coefficients with lower priorities;
- $\lfloor K^{NZ}/2\rfloor$ elements with lower priorities in differential amplitude indication information of $K^{NZ}-v$ weighting coefficients, that is, $\lfloor K^{NZ}/2\rfloor$ elements with lower priorities in $i_{2,4,l}$, where the $\lfloor K^{NZ}/2\rfloor$ elements correspondingly indicate $\lfloor K^{NZ}/2\rfloor$ pieces of differential amplitude information with lower priorities, for example, $$p_{l,i,f}^{(2)};$$

and
- $\lfloor K^{NZ}/2\rfloor$ elements with lower priorities in phase indication information of $K^{NZ}-v$ weighting coefficients, that is, $\lfloor K^{NZ}/2\rfloor$ elements with lower priorities in $i_{2,5,l}$, where the $\lfloor K^{NZ}/2\rfloor$ elements correspondingly indicate $\lfloor K^{NZ}/2\rfloor$ pieces of phase information with lower priorities, for example, $\varphi_{l,i,f}$.

It should be noted that, in this specification, the group 1 includes the $\lceil K^{NZ}/2\rceil-v$ elements with higher priorities in $i_{2,4,l}$, and the group 1 includes the $\lceil K^{NZ}/2\rceil-v$ elements with higher priorities in $i_{2,5,l}$. This may be referred to as that the group 1 includes differential amplitude indication information and phase indication information of $\lceil K^{NZ}/2\rceil-v$ weighting coefficients, or quantities of differential amplitude indication information and phase indication information, included in the group 1, of weighting coefficients are both $\lceil K^{NZ}/2\rceil-v$ Correspondingly, the group 2 includes the $\lfloor K^{NZ}/2\rfloor$ elements with lower priorities in $i_{2,4,l}$, and the group 2 includes the $\lfloor K^{NZ}/2\rfloor$ elements with lower priorities in $i_{2,5,l}$. This may be referred to as that the group 2 includes differential amplitude indication information and phase indication information of $\lfloor K^{NZ}/2\rfloor$ weighting coefficients, or quantities of differential amplitude indication information and phase indication information, included in the group 2, of weighting coefficients are both $\lfloor K^{NZ}/2\rfloor$. Priorities of differential amplitude indication information and phase indication information in the group 2 are higher than priorities of differential amplitude indication information and phase indication information in the group 1. In addition, each element indicates differential amplitude information or phase information of each weighting coefficient. Therefore, the differential amplitude indication information included in the group 1 or the group 2 may also be generally referred to as differential amplitude information, and the phase indication information included in the group 1 or the group 2 may also be generally referred to as phase information.

It can be learned that amplitude information and phase information of a strongest weighting coefficient corresponding to each spatial layer do not need to be reported. It can also be learned that location indication information of the strongest weighting coefficient is included in the group 0, and location indication information, differential amplitude indication information, and phase indication information of other $K^{NZ}-v$ weighting coefficients are separately allocated to the group 1 and the group 2 based on priorities. As described above, the group 1 includes location indication information, differential amplitude indication information, and phase indication information of the $\lceil K^{NZ}/2\rceil-v$ weighting coefficients with higher priorities, and the group 2 includes location indication information, differential amplitude indication information, and phase indication information of the remaining $\lfloor K^{NZ}/2\rfloor$ weighting coefficients with lower priorities. In addition, priorities of indication information included in the group 0 to the group 2 in the CSI part 2 sequentially decrease, and indication information in a group with a lower priority may be sequentially deleted according to an overhead requirement, until a requirement for reporting overheads is met.

However, it is found through research that $\lceil K^{NZ}/2\rceil-v$ may be less than 0. To be specific, when some configuration parameters are used, a quantity of differential amplitude indication information or phase indication information in the group 1 in the CSI part 2 is a negative value, and a quantity of differential amplitude indication information or phase indication information in the group 2 exceeds a total quantity indicated in the CSI part 1. In this way, the terminal device cannot determine a quantity of differential amplitude indication information or phase indication information that needs to be added to the group 1 and the group 2. Further, when receiving channel state information reported by the terminal device, the network device cannot correctly interpret the reported channel state information. Consequently, the space-frequency compressed codebook is unavailable.

For example, a combination of optional values, that are determined based on the formula (11) and the formula (12), of the parameters L, $p_v$, and β of $K_0$ is shown in Table 1. Numbering of indexes of configuration information shown in Table 1 starts from 1. Optionally, the numbering may alternatively start from 0. This is not limited in this application.

TABLE 1

| Index of configuration information | L | $p_v$: $v \in \{1, 2\}$ | $p_v$: $v \in \{3, 4\}$ | β |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |

It is assumed that the network device configures, for the terminal device, configuration information corresponding to the configuration index 1 in Table 1. To be specific, when L=2, β=¼, and v<3, $p_v$=¼ or when v>2, $p_v$=⅛. For different quantities $N_f$ of frequency domain units and different R configured by the network device, a corresponding value of the maximum quantity $K_0$ of reported weighting coefficients may be calculated by using the formula (11) and the formula (12). Assuming that $K^{NZ}$ is equal to $K_0$, values of the quantity $\lceil K^{NZ}/2 \rceil - v$ of differential amplitude indication information and phase indication information included in the group 1 in the CSI part 2, the quantity $\lfloor K^{NZ}/2 \rfloor$ of differential amplitude indication information and phase indication information included in the group 2, and the total quantity $K^{NZ}-v$ of weighting coefficients included in the group 1 and the group 2 may be shown in Table 2.

TABLE 2

| | $N_f$ | | 3 | 4 | 5 | 6 | 7 | 8 | 9 | 10 | 11 | 12 |
|---|---|---|---|---|---|---|---|---|---|---|---|---|
| Quantity of differential amplitude indication information or phase indication information of weighting coefficients included in the group 1 | $\lceil K^{NZ}/2 \rceil - v$ | Rank 1 | 0 | 0 | 0 | 0 | 0 | 0 | 1 | 1 | 1 | 1 |
| | | Rank 2 | −1 | −1 | 0 | 0 | 0 | 0 | 1 | 1 | 1 | 1 |
| | | Rank 3 | | | −1 | −1 | −1 | −1 | 0 | 0 | 0 | 0 |
| | | Rank 4 | | | −2 | −2 | −2 | −2 | −1 | −1 | −1 | −1 |
| Quantity of differential amplitude indication information or phase indication information of weighting coefficients included in the group 2 | $\lfloor K^{NZ}/2 \rfloor$ | Rank 1 | 0 | 0 | 1 | 1 | 1 | 1 | 1 | 1 | 1 | 1 |
| | | Rank 2 | 1 | 1 | 2 | 2 | 2 | 2 | 3 | 3 | 3 | 3 |
| | | Rank 3 | | | 2 | 2 | 2 | 2 | 3 | 3 | 3 | 3 |
| | | Rank 4 | | | 2 | 2 | 2 | 2 | 3 | 3 | 3 | 3 |
| Total quantity of differential amplitude indication information or phase indication information of weighting coefficients included in the group 1 and the group 2 | $K^{NZ} - v$ | Rank 1 | 0 | 0 | 1 | 1 | 1 | 1 | 2 | 2 | 2 | 2 |
| | | Rank 2 | 0 | 0 | 2 | 2 | 2 | 2 | 4 | 4 | 4 | 4 |
| | | Rank 3 | | | 1 | 1 | 1 | 1 | 3 | 3 | 3 | 3 |
| | | Rank 4 | | | 0 | 0 | 0 | 0 | 2 | 2 | 2 | 2 |

It can be learned that, as shown in Table 2, when some configuration parameters are used, the quantity of differential amplitude indication information or phase indication information included in the group 1 is a negative number, and the quantity of differential amplitude indication information or phase indication information included in the group 2 is greater than the total quantity of weighting coefficients included in the group 1 and the group 2. For example, in Table 2, $N_f$=3, v=2, R=1, L=2, β=¼, and $p_1$=¼. The following calculation may be performed by using the formula (11):

$$M_1 = \left\lceil p_1 \cdot \frac{N_f}{R} \right\rceil = 1.$$

The following calculation may be performed by using the formula (12): $K_0 + \lceil \beta \cdot 2LM_1 \rceil$, to obtain a value 1. Assuming that $K^{NZ}=2K_0=2$, quantities $\lceil K^{NZ}/2 \rceil - v$ of differential amplitude indication information and phase indication information included in the group 1 are both −1, quantities $\lfloor K^{NZ}/2 \rfloor$ of differential amplitude indication information and phase indication information included in the group 2 are both 1, and total quantities $K^{NZ}-v$ of differential amplitude indication information and phase indication information included in the group 1 and the group 2 are both 0. It can be learned that, in this example, the quantity (namely, −1) of differential amplitude indication information or phase indication information included in the group 1 is a negative number, and the quantity (namely, 1) of differential amplitude indication information or phase indication information included in the group 2 is greater than the total quantity (namely, 0) of weighting coefficients included in the group 1 and the group 2. Consequentially, the terminal device incorrectly groups to-be-reported differential amplitude indication information and phase indication information, and the network device cannot correctly interpret differential amplitude indication information or phase indication information of a reported weighting coefficient after receiving CSI.

This application provides a channel state information reporting method 100. In the channel state information reporting method 100, a terminal device generates and sends indication information. The indication information may include a first group of indication information and a second group of indication information. The first group of indication information includes differential amplitude indication information and phase indication information of X weighting coefficients, and reference amplitude indication information corresponding to each spatial layer. The second group of indication information includes differential amplitude indication information and phase indication information of Y weighting coefficients. Values of X and Y are related to a first parameter, and a sum of X and Y is equal to $K^{NZ}-v$. It can be learned that, in the channel state information reporting method 100, a manner of allocating the differential amplitude indication information and the phase indication information of the $K^{NZ}-v$ weighting coefficients to the first group of indication information and the second group of indication information is determined based on the first parameter. This helps avoid a situation where the terminal device incorrectly groups to-be-reported differential amplitude indication information and phase indication information, and a network device cannot correctly interpret the differential amplitude indication information or the phase indication information of a reported weighting coefficient after receiving the CSI.

This application further provides a channel state information reporting method 200. In the channel state information reporting method 200, a terminal device generates and sends indication information. The indication information may include a first group of indication information and a second group of indication information. The first group of indication information includes differential amplitude indication information and phase indication information of X weighting coefficients. The second group of indication information includes differential amplitude indication information and phase indication information of Y weighting coefficients. A difference between X and Y is less than or equal to 1, and a sum of X and Y is equal to $K^{NZ}-v$. It can be learned that, in the channel state information reporting method 200, the differential amplitude indication information and the phase indication information of the $K^{NZ}-v$ weighting coefficients are allocated to the first group of indication information and the second group of indication information as evenly as possible. This helps avoid a situation where the terminal device incorrectly groups to-be-reported differential amplitude indication information and phase indication information, and a network device cannot correctly interpret the differential amplitude indication information or the phase indication information of a reported weighting coefficient after receiving the CSI. The first group of indication information may be denoted as the foregoing group 1, and the second group of indication information may be denoted as the foregoing group 2.

This application further provides a channel state information reporting method 300. In the channel state information reporting method 300, a terminal device generates and sends indication information. The indication information may indicate $K^{NZ}$ weighting coefficients. When $v>1$ and $K_0<v$, or when $v=1$ and $K_0<2v$, $K^{NZ}$ is equal to $2v$. $K^{NZ}$ is a total quantity of weighting coefficients correspondingly reported at all spatial layers. v is a quantity of spatial layers. $K_0$ is configured by a network device and is used to determine a maximum value within a value range of $K^{NZ}$. $K_0$ and $K^{NZ}$ are integers, and v is a positive integer. It can be learned that, in the channel state information reporting method 300, 2v weighting coefficients can be reported when an upper limit, configured by the network device, of a quantity of to-be-reported weighting coefficients is excessively small. For example, when $v>1$ and $K_0<v$, or when $v=1$ and $K_0<2v$. This helps avoid an unavailability of some polarization directions of some spatial layers due to reporting of an excessively small quantity of weighting coefficients.

This application further provides a channel state information reporting method 400. In the channel state information reporting method 400, a difference between the channel state information reporting method 400 and the channel state information reporting method 100 lies in that a sum of X and Y is equal to $\max(K^{NZ}-v, 0)$. It can be learned that, in the channel state information reporting method 400, differential amplitude indication information and phase indication information of $K^{NZ}-v$ weighting coefficients are allocated to a first group of indication information and a second group of indication information as evenly as possible. This helps avoid a situation where a terminal device incorrectly groups to-be-reported differential amplitude indication information and phase indication information, and a network device cannot correctly interpret the differential amplitude indication information or the phase indication information of a reported weighting coefficient after receiving the CSI. The first group of indication information may be denoted as the foregoing group 1, and the second group of indication information may be denoted as the foregoing group 2. In addition, in the channel state information reporting method 400, when $K^{NZ}-v$ is less than 0, the terminal device may not add differential amplitude indication information or phase indication information of the weighting coefficients to the first group of indication information or the second group of indication information. This also avoids a situation where the network device cannot parse out a correct weighting coefficient because the terminal device has performed incorrect grouping.

The following describes embodiments of this application with reference to accompanying drawings.

Figure 2:
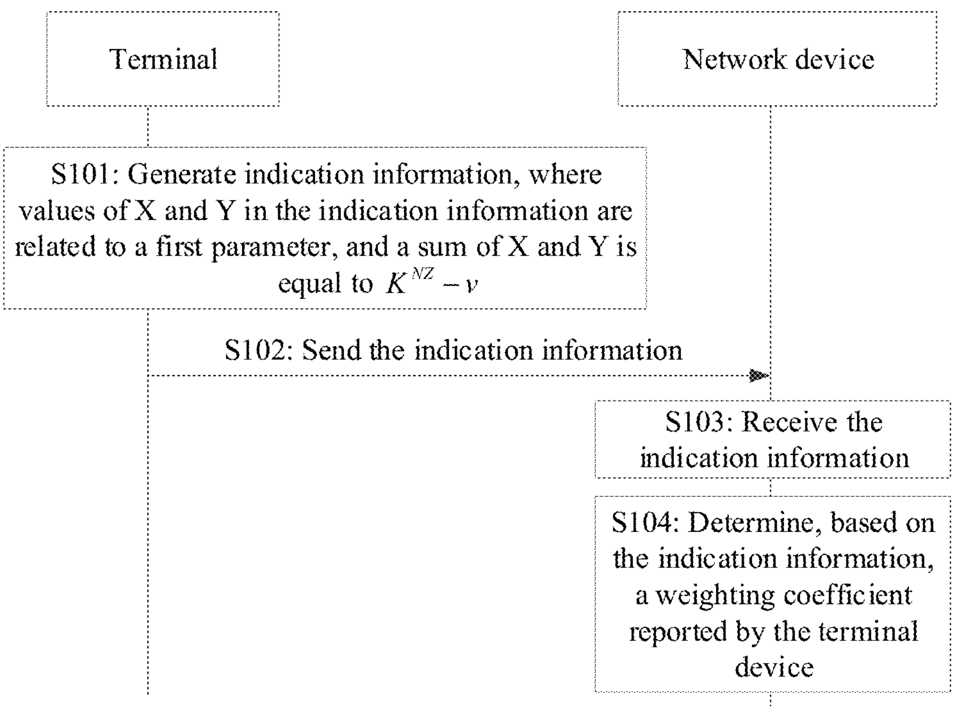
FIG. 2 is a schematic flowchart of a channel state information reporting method 100 according to an embodiment of this application.

FIG. 2 is a schematic flowchart of a channel state information reporting method 100 according to an embodiment of this application. As shown in FIG. 2, the channel state information reporting method 100 may include but is not limited to the following steps.

S101: A terminal device generates indication information.

The indication information includes a first group of indication information and a second group of indication information. The first group of indication information includes reference amplitude indication information corresponding to each spatial layer, and differential amplitude indication information and phase indication information of X weighting coefficients, where X is an integer. The second group of indication information includes differential amplitude indication information and phase indication information of Y weighting coefficients, where Y is an integer. Values of X and Y are related to a first parameter, and a sum of X and Y is equal to $K^{NZ}-v$. $K^{NZ}$ is a total quantity of weighting coefficients correspondingly reported at all spatial layers, v is a quantity of spatial layers, $K^{NZ}$ is an integer, and v is a positive integer. That is, as shown in FIG. 2, the values of X and Y in the indication information are related to the first parameter, and the sum of X and Y is equal to $K^{NZ}-v$.

Priorities of the differential amplitude indication information and the phase indication information in the first group of indication information are higher than priorities of the differential amplitude indication information and the phase indication information in the second group of indication information. The priorities of the differential amplitude indication information and the phase indication information may be determined based on a spatial layer l, a spatial domain vector i, and a frequency domain vector f of corresponding weighting coefficients, and based on the formula (14) and the formula (15). Details are not described herein again.

Optionally, the indication information further includes another group of indication information that may be denoted as the foregoing group 0. Correspondingly, the first group of indication information may be denoted as the foregoing group 1, and the second group of indication information may be denoted as the foregoing group 2. Indication information included in the group 0 is described above. The group 1 includes the differential amplitude indication information and the phase indication information of the X weighting coefficients, and the reference amplitude indication information corresponding to each spatial layer. The group 2 includes the differential amplitude indication information and the phase indication information of the Y weighting coefficients. That is, a difference from the indication information respectively included in the foregoing group 0 and group 1 lies in that the quantities X and Y of the differential amplitude indication information and the phase indication information included in the group 1 and the group 2 respectively in some embodiments are related to the first parameter. Both X and Y are integers.

In addition, that the group 1 includes the differential amplitude indication information and the phase indication information of the X weighting coefficients may alternatively be expressed as follows: the group 1 includes X elements with higher priorities (corresponding to X pieces of differential amplitude information with higher priorities) in a set (for example, $i_{2,4,l}$) of differential amplitude indication information of reported $K^{NZ}-v$ weighting coefficients, and further includes X elements with higher priorities (corresponding to X pieces of phase information with higher priorities) in a set (for example, $i_{2,5,l}$) of phase indication information of the reported $K^{NZ}-v$ weighting coefficients. Correspondingly, that the group 2 includes the differential amplitude indication information and the phase indication information of the Y weighting coefficients may alternatively be expressed as follows: the group 2 includes Y elements with lower priorities (corresponding to Y pieces of differential amplitude information with lower priorities) in a set (for example, $i_{2,4,l}$) of differential amplitude indication information of the reported $K^{NZ}-v$ weighting coefficients, and further includes Y elements with lower priorities (corresponding to Y pieces of phase information with lower priorities) in a set (for example, $i_{2,5,l}$) of phase indication information of the reported $K^{NZ}-v$ weighting coefficients.

Optionally, assuming that the set $i_{2,4,l}$ of the differential amplitude indication information is one field, the field may be divided into two parts: X elements with higher priorities and Y elements with lower priorities. Similarly, if the set $i_{2,5,l}$ of the phase indication information is one field, the field may be divided into two parts: X elements with higher priorities and Y elements with lower priorities.

The values of X and Y are related to the first parameter, and the sum of X and Y is equal to $K^{NZ}-v$. As described above, the total quantity of weighting coefficients correspondingly reported at all the spatial layers is $K^{NZ}$, and the quantity of spatial layers is v. Other than a strongest weighting coefficient corresponding to each spatial layer (the strongest weighting coefficient corresponding to each spatial layer is 1, and therefore differential amplitude indication information and phase indication information of v strongest weighting coefficients do not need to be reported), differential amplitude indication information and phase indication information of $K^{NZ}-v$ weighting coefficients need to be reported. Amplitude information of a weighting coefficient correspondingly reported at each spatial layer may be determined based on the differential amplitude indication information in combination with the reference amplitude indication information corresponding to each spatial layer.

The reference amplitude indication information corresponding to each spatial layer indicates a reference amplitude in a polarization direction other than a polarization direction in which a strongest weighting coefficient at the spatial layer is located. To be specific, a reference amplitude in a polarization direction of each spatial layer is 1, the polarization direction may be a polarization direction in which a strongest weighting coefficient corresponding to the spatial layer is located, and a reference amplitude in another polarization direction is a reference amplitude indicated by reference amplitude indication information corresponding to the spatial layer. In this way, a network device can determine an amplitude value of a weighting coefficient in each polarization direction of each spatial layer based on differential amplitude indication information of the weighting coefficient and a corresponding reference amplitude in each polarization direction of each spatial layer.

Figure 3:
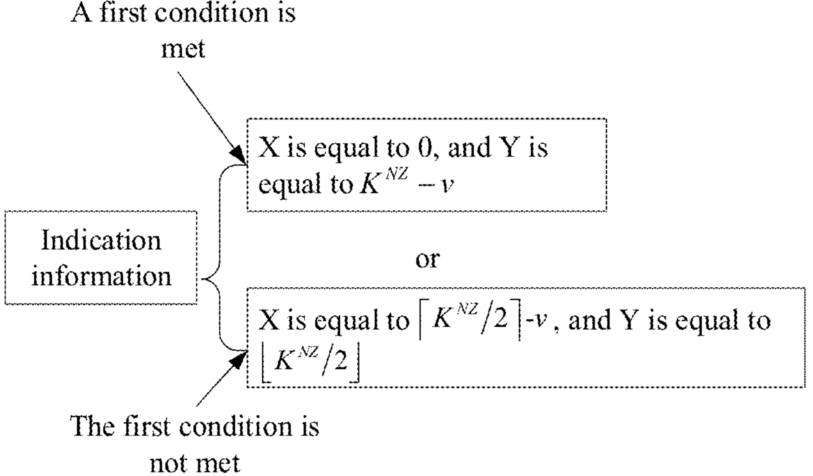
FIG. 3 is a schematic diagram of values of X and Y in indication information according to an embodiment of this application.

In an optional implementation (denoted as an implementation 1.1), that the values of X and Y are related to the first parameter may be as follows: the values of X and Y are related to a first condition, and the first condition is related to the first parameter. For example, FIG. 3 is a schematic diagram of values of X and Y in indication information according to an embodiment of this application. As shown in FIG. 3, there are two cases of the values of X and Y in the indication information. When the first condition is met, X is equal to 0, and Y is equal to $K^{NZ}-v$. To be specific, in this case, the group 1 does not include differential amplitude indication information or phase indication information of a weighting coefficient, and the differential amplitude indication information and the phase indication information of the $K^{NZ}-v$ weighting coefficients are all included in the group 2. As shown in FIG. 3, when the first condition is not met, X is equal to $\lceil K^{NZ}/2 \rceil - v$ and Y is equal to $\lfloor K^{NZ}/2 \rfloor$. To be specific, the group 1 includes differential amplitude indication information and phase indication information of $\lceil K^{NZ}/2 \rceil - v$ weighting coefficients, and the group 2 includes differential amplitude indication information and phase indication information of $\lfloor K^{NZ}/2 \rfloor$ weighting coefficients. The first condition is related to the first parameter.

The following describes optional implementations in which the values of X and Y are related to the first condition, and the first condition is related to the first parameter.

Implementation 1.1.1: The first parameter is $\lceil K^{NZ}/2\rceil - v$ and the first condition is $\lceil K^{NZ}/2\rceil - v \le 0$ or $\lceil K^{NZ}/2\rceil - v < 0$.

In the implementation 1.1.1, when the first condition is met, to be specific, when $\lceil K^{NZ}/2\rceil - v \le 0$ or $\lceil K^{NZ}/2\rceil - v < 0$, X is equal to 0, and Y is equal to $K^{NZ}-v$. To be specific, in this case, the group 1 does not include differential amplitude indication information or phase indication information of a weighting coefficient, and the differential amplitude indication information and the phase indication information of the $K^{NZ}-v$ weighting coefficients are all included in the group 2. When the first condition is not met, to be specific, when $\lceil K^{NZ}/2\rceil - v \ge 0$ or $\lceil K^{NZ}/2\rceil - v > 0$, X is equal to $\lceil K^{NZ}/2\rceil - v$, and Y is equal to $\lfloor K^{NZ}/2\rfloor$. To be specific, the group 1 includes differential amplitude indication information and phase indication information of $\lceil K^{NZ}/2\rceil - v$ weighting coefficients, and the group 2 includes differential amplitude indication information and phase indication information of $\lfloor K^{NZ}/2\rfloor$ weighting coefficients.

Implementation 1.1.2: The first parameter is $\lceil K^{NZ}/2\rceil$, and the first condition is $\lceil K^{NZ}/2\rceil \le v$ or $\lceil K^{NZ}/2\rceil < v$.

In the implementation 1.1.2, when the first condition is met, to be specific, when $\lceil K^{NZ}/2\rceil \le v$ or $\lceil K^{NZ}/2\rceil < v$, X is equal to 0, and Y is equal to $K^{NZ}-v$. To be specific, in this case, the group 1 does not include differential amplitude indication information or phase indication information of a weighting coefficient, and the differential amplitude indication information and the phase indication information of the $K^{NZ}-v$ weighting coefficients are all included in the group 2. When the first condition is not met, to be specific, when $\lceil K^{NZ}/2\rceil \ge v$ or $\lceil K^{NZ}/2\rceil > v$, X is equal to $\lceil K^{NZ}/2\rceil - v$, and Y is equal to $\lfloor K^{NZ}/2\rfloor$. To be specific, the group 1 includes differential amplitude indication information and phase indication information of $\lceil K^{NZ}/2\rceil - v$ weighting coefficients, and the group 2 includes differential amplitude indication information and phase indication information of $\lfloor K^{NZ}/2\rfloor$ weighting coefficients.

Implementation 1.1.3: The first parameter is $K^{NZ}$, and the first condition is $K^{NZ} \le 2v$ or $K^{NZ} < 2v$.

In the implementation 1.1.3, when the first condition is met, to be specific, when $K^{NZ} \le 2v$ or $K^{NZ} < 2v$, X is equal to 0, and Y is equal to $K^{NZ}-v$. To be specific, in this case, the group 1 does not include differential amplitude indication information or phase indication information of a weighting coefficient, and the differential amplitude indication information and the phase indication information of the $K^{NZ}-v$ weighting coefficients are all included in the group 2. When the first condition is not met, to be specific, when $K^{NZ} \ge 2v$ or $K^{NZ} > 2v$ X is equal to $\lceil K^{NZ}/2\rceil - v$, and Y is equal to $\lfloor K^{NZ}/2\rfloor$. To be specific, the group 1 includes differential amplitude indication information and phase indication information of $\lceil K^{NZ}/2\rceil - v$ weighting coefficients, and the group 2 includes differential amplitude indication information and phase indication information of $\lfloor K^{NZ}/2\rfloor$ weighting coefficients.

In an optional implementation (denoted as an implementation 1.2), that the values of X and Y are related to the first parameter may be as follows: X is equal to $\max(\lceil K^{NZ}/2\rceil - v, 0)$, and Y is equal to $K^{NZ}-v-\max(\lceil K^{NZ}/2\rceil - v, 0)$. That is, the first parameter is $\lceil K^{NZ}/2\rceil - v$. To be specific, in a case, the group 1 includes differential amplitude indication information and phase indication information of $\lceil K^{NZ}/2\rceil - v$ weighting coefficients, and the group 2 includes differential amplitude indication information and phase indication information of $K^{NZ}-v$ weighting coefficients. In another case, the group 1 does not include differential amplitude indication information or phase indication information of a weighting coefficient, and the group 2 includes differential amplitude indication information and phase indication information of $K^{NZ}-v$ weighting coefficients.

Alternatively, the implementation 1.2 may be expressed as follows: the group 1 includes $\max(\lceil K^{NZ}/2\rceil - v, 0)$ elements with higher priorities (corresponding to $\max(\lceil K^{NZ}/2\rceil - v, 0)$ pieces of differential amplitude information with higher priorities) in a set (for example, $i_{2,4,l}$) of differential amplitude indication information of the reported $K^{NZ}-v$ weighting coefficients, and further includes $\max(\lceil K^{NZ}/2\rceil - v, 0)$ elements with higher priorities (corresponding to $\max(\lceil K^{NZ}/2\rceil - v, 0)$ pieces of phase information with higher priorities) in a set (for example, $i_{2,5,l}$) of phase indication information of the reported $K^{NZ}-v$ weighting coefficients. Correspondingly, the group 2 includes $K^{NZ}-v-\max(\lceil K^{NZ}/2\rceil - v, 0)$ elements with lower priorities (corresponding to $K^{NZ}-v-\max(\lceil K^{NZ}/2\rceil - v, 0)$ pieces of differential amplitude information with lower priorities) in a set (for example, $i_{2,4,l}$) of differential amplitude indication information of the reported $K^{NZ}-v$ weighting coefficients, and further includes $K^{NZ}-v-\max(\lceil K^{NZ}/2\rceil - v, 0)$ elements with lower priorities (corresponding to $K^{NZ}-v-\max(\lceil K^{NZ}/2\rceil - v, 0)$ pieces of phase information with lower priorities) in a set (for example, $i_{2,5,l}$) of phase indication information of the reported $K^{NZ}-v$ weighting coefficients.

In an optional implementation (denoted as an implementation 1.3), that the values of X and Y are related to the first parameter may be as follows: X is equal to $\lceil K^{NZ}/2\rceil - \min(v, \lceil K^{NZ}/2\rceil)$, and Y is equal to $\lfloor K^{NZ}/2\rfloor - v + \min(v, \lceil K^{NZ}/2\rceil)$. That is, the first parameter is $\lceil K^{NZ}/2\rceil$. To be specific, in a case, the group 1 includes differential amplitude indication information and phase indication information of $\lceil K^{NZ}/2\rceil - v$ weighting coefficients, and the group 2 includes differential amplitude indication information and phase indication information of $K^{NZ}-v$ weighting coefficients. In another case, the group 1 does not include differential amplitude indication information or phase indication information of a weighting coefficient, and the group 2 includes differential amplitude indication information and phase indication information of $K^{NZ}-v$ weighting coefficients.

Alternatively, the implementation 1.3 may be expressed as follows: the group 1 includes $\lceil K^{NZ}/2\rceil - \min(v, \lceil K^{NZ}/2\rceil)$ elements with higher priorities (corresponding to $\lceil K^{NZ}/2\rceil - \min(v, \lceil K^{NZ}/2\rceil)$ pieces of differential amplitude information with higher priorities) in a set (for example, $i_{2,4,l}$) of differential amplitude indication information of the reported $K^{NZ}-v$ weighting coefficients, and further includes $\lceil K^{NZ}/2\rceil - \min(v, \lceil K^{NZ}/2\rceil)$ elements with higher priorities (corresponding to $\lceil K^{NZ}/2\rceil - \min(v, \lceil K^{NZ}/2\rceil)$ pieces of phase information with lower priorities) in a set (for example, $i_{2,5,l}$) of phase indication information of the reported $K^{NZ}-v$ weighting coefficients. Correspondingly, the group 2 includes $\lceil K^{NZ}/2\rceil - v + \min(v, \lceil K^{NZ}/2\rceil)$ elements with lower priorities (corresponding to $\lceil K^{NZ}/2\rceil - v + \min(v, \lceil K^{NZ}/2\rceil)$ pieces of differential amplitude information with lower priorities) in a set (for example, $i_{2,4,l}$) of differential amplitude indication information of the reported $K^{NZ}-v$ weighting coefficients, and further includes $\lceil K^{NZ}/2\rceil - v + \min(v, \lceil K^{NZ}/2\rceil)$ elements with lower priorities (corresponding to $\lceil K^{NZ}/2\rceil - v + \min(v, \lceil K^{NZ}/2\rceil)$ pieces of phase information with lower priorities) in a set (for example, $i_{2,5,l}$) of phase indication information of the reported $K^{NZ}-v$ weighting coefficients.

Figures 4, 5, 6:
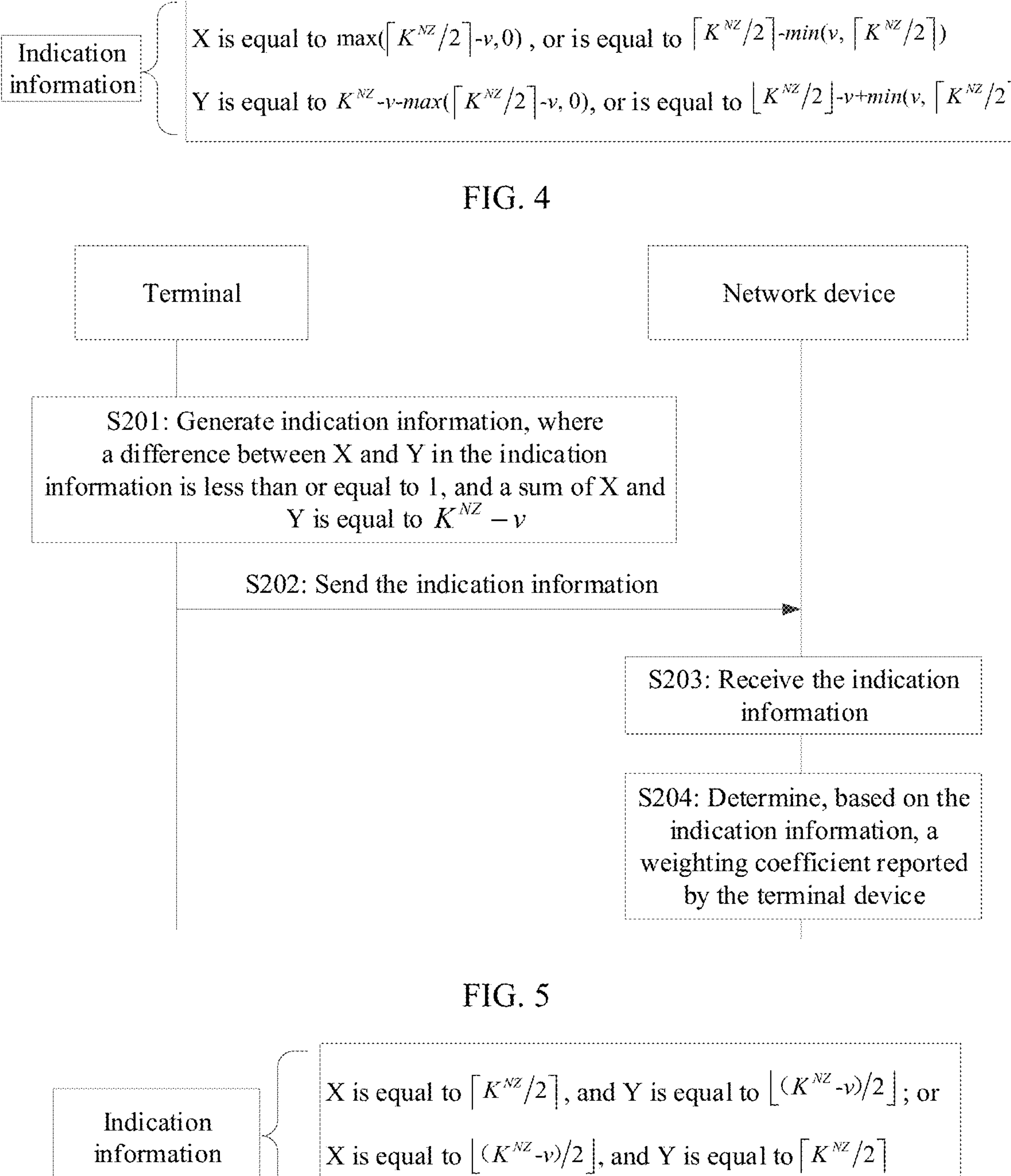
FIG. 4 is another schematic diagram of values of X and Y in indication information according to an embodiment of this application.
FIG. 5 is a schematic flowchart of a channel state information reporting method 200 according to an embodiment of this application.
FIG. 6 is still another schematic diagram of values of X and Y in indication information according to an embodiment of this application.

Optionally, the content in the implementation 1.2 or the implementation 1.3 may be expressed as a schematic diagram of indication information shown in FIG. 4. As shown in FIG. 4, in the indication information, X is equal to $\max(\lceil K^{NZ}/2\rceil - v, 0)$ or $\lceil K^{NZ}/2\rceil - \min(v, \lceil K^{NZ}/2\rceil)$, and Y is equal to $K^{NZ} - v - \max(\lceil K^{NZ}/2\rceil - v, 0)$ or $\lfloor K^{NZ}/2\rfloor - v + \min(v, \lceil K^{NZ}/2\rceil)$.

For example, the configuration index 1 in the configuration options shown in Table 1 is used as an example. Correspondingly, when L=2, $\beta=1/4$, and v<3, $p_v=1/4$ or when v>2, $p_v=1/8$. For different quantities $N_f$ of frequency domain units, Table 3 lists quantities of differential amplitude indication information and phase indication information of weighting coefficients included in the group 1 and the group 2 in the implementation 1.2 or the implementation 1.3 in the case of different quantities $N_f$ of frequency domain units. A maximum value of $K^{NZ}$ is used. To be specific, when rank=1, $K^{NZ}=K_0$ or when rank>1, $K^{NZ}=2K_0$. For different quantities $N_f$ of frequency domain units and different R configured by the network device, a value of $K_0$ may be calculated by using the formula (11) and the formula (12).

$2K_0=4$. A strongest weighting coefficient at each spatial layer is 1. Therefore, an upper limit of a total quantity of differential amplitude indication information or phase indication information, reported in the group 1 and the group 2 in the CSI part 2, of remaining weighting coefficients is $2K_0-v=1$. That is, in this example, it is assumed that $K^{NZ}$=4 and v=3.

For another example, the configuration index 2 in the configuration options shown in Table 1 is used as an example. Correspondingly, when L=2, $\beta=1/2$, and v<3, $p_v=1/4$ or when v>2, $p_v=1/8$. For different quantities $N_f$ of frequency domain units, Table 4 lists quantities of differential amplitude indication information and phase indication information of weighting coefficients included in the group 1 and the group 2 in the implementation 1.2 or the implementation 1.3 in the case of different quantities $N_f$ of frequency domain units. A maximum value of $K^{NZ}$ is used. To be specific, when rank=1, $K^{NZ}=K_0$ or when rank>1, $K^{NZ}=2K_0$. For different quantities $N_f$ of frequency domain units and different R configured by the network device, a value of $K_0$ may be calculated by using the formula (11) and the formula (12).

TABLE 3

| | $N_f$ | | 3 | 4 | 5 | 6 | 7 | 8 | 9 | 10 | 11 | 12 |
|---|---|---|---|---|---|---|---|---|---|---|---|---|
| Quantity of differential amplitude indication information or phase indication information of weighting coefficients included in the group 1 | $\max(\lceil K^{NZ}/2\rceil - \nu, 0)$ or $\lceil K^{NZ}/2\rceil - \min(\nu, \lceil K^{NZ}/2\rceil)$ | Rank 1 | 0 | 0 | 0 | 0 | 0 | 0 | 1 | 1 | 1 | 1 |
| | | Rank 2 | 0 | 0 | 0 | 0 | 0 | 0 | 1 | 1 | 1 | 1 |
| | | Rank 3 | | | 0 | 0 | 0 | 0 | 0 | 0 | 0 | 0 |
| | | Rank 4 | | | 0 | 0 | 0 | 0 | 0 | 0 | 0 | 0 |
| Quantity of differential amplitude indication information or phase indication information of weighting coefficients included in the group 2 | $K^{NZ} - \nu - \max(\lceil K^{NZ}/2\rceil - \nu, 0)$ or $\lfloor K^{NZ}/2\rfloor - \nu + \max(\nu, \lceil K^{NZ}/2\rceil)$ | Rank 1 | 0 | 0 | 1 | 1 | 1 | 1 | 1 | 1 | 1 | 1 |
| | | Rank 2 | 0 | 0 | 2 | 2 | 2 | 2 | 3 | 3 | 3 | 3 |
| | | Rank 3 | | | 1 | 1 | 1 | 1 | 3 | 3 | 3 | 3 |
| | | Rank 4 | | | 0 | 0 | 0 | 0 | 2 | 2 | 2 | 2 |
| Total quantity of differential amplitude indication information or phase indication information of weighting coefficients included in the group 1 and the group 2 | $K^{NZ} - \nu$ | Rank 1 | 0 | 0 | 1 | 1 | 1 | 1 | 2 | 2 | 2 | 2 |
| | | Rank 2 | 0 | 0 | 2 | 2 | 2 | 2 | 4 | 4 | 4 | 4 |
| | | Rank 3 | | | 1 | 1 | 1 | 1 | 3 | 3 | 3 | 3 |
| | | Rank 4 | | | 0 | 0 | 0 | 0 | 2 | 2 | 2 | 2 |

For example, in Table 3, $N_f=8$, v=3, R=1, L=2, $\beta=1/4$, and $p_1=1/4$. The following may be obtained by using the formula (11):

$$M_1 = \left\lceil p_1 \cdot \frac{N_f}{R} \right\rceil = 2.$$

The following may be obtained by using the formula (12): $K_0=\lceil \beta \cdot 2LM_1 \rceil=2$. A maximum value of a maximum quantity $K^{NZ}$ of reported weighting coefficients is as follows:

TABLE 4

| | $N_f$ | | 3 | 4 |
|---|---|---|---|---|
| Quantity of differential amplitude indication | $\max(\lceil K^{NZ}/2\rceil - \nu, 0)$ or $\lceil K^{NZ}/2\rceil - \min(\nu, \lceil K^{NZ}/2\rceil)$ | Rank 1 | 0 | 0 |
| | | Rank 2 | 0 | 0 |
| | | Rank 3 | 0 | 0 |
| | | Rank 4 | 0 | 0 |

TABLE 4-continued

| | $N_f$ | | 3 | 4 |
|---|---|---|---|---|
| information or phase indication information of weighting coefficients included in the group 1 | | | | |
| Quantity of differential amplitude indication information or phase indication information of weighting coefficients included in the group 2 | $K^{NZ} - v - \max(\lceil K^{NZ}/2 \rceil - v, 0)$ or $\lfloor K^{NZ}/2 \rfloor - v + \min(v, \lceil K^{NZ}/2 \rceil)$ | Rank 1 | 1 | 1 |
| | | Rank 2 | 2 | 2 |
| | | Rank 3 | 1 | 1 |
| | | Rank 4 | 0 | 0 |
| Total quantity of differential amplitude indication information or phase indication information of weighting coefficients included in the group 1 and the group 2 | $K^{NZ} - v$ | Rank 1 | 1 | 1 |
| | | Rank 2 | 2 | 2 |
| | | Rank 3 | 1 | 1 |
| | | Rank 4 | 0 | 0 |

For still another example, the configuration index 3 in the configuration options shown in Table 1 is used as an example. Correspondingly, when L=4, $\beta=1/4$, and v<3, $p_v=1/4$ or when v>2, $p_v=1/8$. For different quantities $N_f$ of frequency domain units, Table 5 lists calculated quantities of differential amplitude indication information and phase indication information of weighting coefficients included in the group 1 and the group 2 in the implementation 1.2 or the implementation 1.3 in the case of different quantities $N_f$ of frequency domain units. A maximum value of $K^{NZ}$ is used. To be specific, when rank=1, $K^{NZ}=K_0$ or when rank>1, $K^{NZ}=2K_0$. For different quantities $N_f$ of frequency domain units and different R configured by the network device, a value of $K_0$ may be calculated by using the formula (11) and the formula (12).

TABLE 5

| | $N_f$ | | 3 | 4 |
|---|---|---|---|---|
| Quantity of differential amplitude indication information or phase indication information of weighting coefficients included in the group 1 | $\max(\lceil K^{NZ}/2 \rceil - v, 0)$ or $\lceil K^{NZ}/2 \rceil - \min(v, \lceil K^{NZ}/2 \rceil)$ | Rank 1 | 0 | 0 |
| | | Rank 2 | 0 | 0 |
| | | Rank 3 | 0 | 0 |
| | | Rank 4 | 0 | 0 |
| Quantity of differential amplitude indication information or phase indication information of weighting coefficients included in the group 2 | $K^{NZ} - v - \max(\lceil K^{NZ}/2 \rceil - v, 0)$ or $\lfloor K^{NZ}/2 \rfloor - v + \min(v, \lceil K^{NZ}/2 \rceil)$ | Rank 1 | 1 | 1 |
| | | Rank 2 | 2 | 2 |
| | | Rank 3 | 1 | 1 |
| | | Rank 4 | 0 | 0 |
| Total quantity of differential amplitude indication information or phase indication information of weighting coefficients included in the group 1 and the group 2 | $K^{NZ} - v$ | Rank 1 | 1 | 1 |
| | | Rank 2 | 2 | 2 |
| | | Rank 3 | 1 | 1 |
| | | Rank 4 | 0 | 0 |

As described in the implementation 1.2, the group 1 includes the $\max(\lceil K^{NZ}/2 \rceil - v, 0)$ elements with higher priorities in the set $i_{2,4,l}$ of the differential amplitude indication information and the set $i_{2,5,l}$ of the phase indication information of the reported $K^{NZ}-v$ weighting coefficients, where $\max(\lceil K^{NZ}/2 \rceil - v, 0)=0$. To be specific, the group 1 does not include differential amplitude indication information or phase indication information of a weighting coefficient. The group 2 includes the $K^{NZ}-v-\max(\lceil K^{NZ}/2 \rceil - v, 0)$ elements with lower priorities in the set $i_{2,4,l}$ of the differential amplitude indication information and the set $i_{2,5,l}$ of the phase indication information of the reported $K^{NZ}-v$ weighting coefficients, where $K^{NZ}-v-\max(\lceil K^{NZ}/2 \rceil - v, 0)=1$. To be specific, the group 2 includes one piece of differential amplitude information and one piece of phase information with lower priorities. It can be learned that, in a combination of these parameters, the following cases are avoided: quantities of differential amplitude indication information and phase indication information, reported in the group 1, of weighting coefficients are negative values; and quantities of differential amplitude indication information and phase indication information, reported in the group 2, of weighting coefficients exceed $K^{NZ}-v$.

In an optional implementation (denoted as an implementation 1.4), the first parameter is related to an index of the configuration information, a quantity $N_f$ of frequency domain units, and a quantity v of spatial layers, that is, the values of X and Y are related to the index of the configuration information, $N_f$, and v. The configuration information, $N_f$, and v are used to determine a maximum value, namely, $2K_0$, of $K^{NZ}$. The index of the configuration information and the quantity $N_f$ of frequency domain units are indicated by the network device to the terminal device, so that the terminal device can determine a maximum quantity of weighting coefficients that can be reported. In addition, the terminal device may clearly determine, based on one or more of the following information, a quantity of weighting coefficients corresponding to the differential amplitude indication information and the phase indication information that are included in the group 1 and the group 2. Optionally, the network device and the terminal device may predefine one or more of the following information by using a protocol:

when the index of the configuration information is 1, $2<N_f\leq5$, and v=2, X is equal to 0, and Y is equal to 0;

when the index of the configuration information is 1, $4<N_f\leq9$, and v=3, X is equal to 0, and Y is equal to 1;

when the index of the configuration information is 1, $4<N_f<9$, and v=4, X is equal to 0, and Y is equal to 0;
when the index of the configuration information is 1, $8<N_f<13$, and v=4, X is equal to 0, and Y is equal to 2;
when the index of the configuration information is 2, $N_f=3$ or 4, and v=3, X is equal to 0, and Y is equal to 1;
when the index of the configuration information is 2, $N_f=3$ or 4, and v=4, X is equal to 0, and Y is equal to 0;
when the index of the configuration information is 3, $N_f=3$ or 4, and v=3, X is equal to 0, and Y is equal to 1; or
when the index of the configuration information is 3, $N_f=3$ or 4, and v=4, X is equal to 0, and Y is equal to 0.

It can be learned that, in the foregoing optional implementations 1.1 to 1.4, a quantity of weighting coefficients corresponding to the differential amplitude indication information and the phase indication information included in the group 1 is not a negative value, and a quantity of weighting coefficients corresponding to the differential amplitude indication information and the phase indication information included in the group 2 does not exceed $K^{NZ}-v$. This prevents the terminal device from incorrectly grouping to-be-reported amplitude indication information and phase indication information.

S102: The terminal device sends the indication information.

S103: The network device receives the indication information.

S104: The network device determines, based on the indication information, a weighting coefficient reported by the terminal device.

Optionally, after step S104, the network device may construct a precoding matrix based on each weighting coefficient reported by the terminal device. For details about a construction of a precoding matrix, refer to the content described with reference to the formula (2) to the formula (9).

In an optional implementation, in the manner described in the implementation 1.1, that the network device determines, based on the indication information, a weighting coefficient reported by the terminal device in step S104 may include that the network device interprets the group 0 to obtain the quantity v of spatial layers that is indicated by an RI and the total quantity $K^{NZ}$ of weighting coefficients correspondingly reported at all the spatial layers. When determining, based on the quantity v of spatial layers and the total quantity $K^{NZ}$, that the first condition is met, the network device learns that X is equal to 0 and Y is equal to $K^{NZ}-v$. To be specific, the group 1 does not include differential amplitude indication information or phase indication information of a weighting coefficient, and the differential amplitude indication information and the phase indication information of the $K^{NZ}-v$ weighting coefficients are all included in the group 2. Then the network device may read the differential amplitude indication information and the phase indication information of the $K^{NZ}-v$ weighting coefficients from the group 2, and then obtain, based on the reference amplitude indication information that corresponds to each spatial layer and that is included in the group 1, the $K^{NZ}-v$ weighting coefficients reported by the terminal device.

In another optional implementation, in the manner described in the implementation 1.2, that the network device determines, based on the indication information, a weighting coefficient reported by the terminal device in step S104 may include that the network device interprets the group 0 to obtain the quantity v of spatial layers that is indicated by an RI and the total quantity $K^{NZ}$ of weighting coefficients correspondingly reported at all the spatial layers. The network device calculates the values of X and Y based on the quantity v of spatial layers, the total quantity $K^{NZ}$, and that X $\max(\lceil K^{NZ}/2\rceil-v, 0)$ and Y is equal to $K^{NZ}-v-\max(\lceil K^{NZ}/2\rceil-v, 0)$, to obtain the quantity of weighting coefficients corresponding to the differential amplitude indication information and the phase indication information included in each of the group 1 and the group 2.

In still another optional implementation, in the manner described in the implementation 1.3, that the network device determines, based on the indication information, a weighting coefficient reported by the terminal device in step S104 may include that the network device interprets the group 0 to obtain the quantity v of spatial layers that is indicated by an RI and the total quantity $K^{NZ}$ of weighting coefficients correspondingly reported at all the spatial layers. The network device calculates the values of X and Y based on the quantity v of spatial layers, the total quantity $K^{NZ}$, and that X is equal to $\lceil K^{NZ}/2\rceil-\min(v, \lceil K^{NZ}/2\rceil)$ and Y is equal to $\lfloor K^{NZ}/2\rfloor-v+\min(v, \lceil K^{NZ}/2\rceil)$, to obtain the quantity of weighting coefficients corresponding to the differential amplitude indication information and the phase indication information included in each of the group 1 and the group 2.

In still another optional implementation, in the manner described in the implementation 1.4, that the network device determines, based on the indication information, a weighting coefficient reported by the terminal device in step S104 may include that the network device determines the values of X and Y based on the index of the configuration information, the quantity $N_f$ of frequency domain units, the quantity v of spatial layers, and one or more of the information described in the implementation 1.4, to obtain the quantity of weighting coefficients corresponding to the differential amplitude indication information and the phase indication information included in each of the group 1 and the group 2.

Optionally, one or more implementations may be determined from the implementation 1.1 to the implementation 1.4 through predefinition in a protocol, through indication by the network device, or through a request by the terminal device. the terminal device may then generate corresponding indication information, and the network device may then correctly interpret the indication information.

It can be learned that, in the indication information in the channel state information reporting method 100, the first group of indication information includes the differential amplitude indication information and the phase indication information of the X weighting coefficients, and the reference amplitude indication information corresponding to each spatial layer. In can also be learned that, in the channel state information reporting method 100, the second group of indication information includes the differential amplitude indication information and the phase indication information of the Y weighting coefficients. The values of X and Y are related to the first parameter, and the sum of X and Y is equal to $K^{NZ}-v$. It can be learned that, in the channel state information reporting method 100, a manner of allocating the differential amplitude indication information and the phase indication information of the $K^{NZ}-v$ weighting coefficients to the first group of indication information and the second group of indication information is determined based on the first parameter. This helps avoid the problem, that may occur in a current protocol, where when some configuration parameters are used, quantities of differential amplitude indication information and phase indication information of weighting coefficients included in the group 1 are negative values, and quantities of differential amplitude indication information and phase indication information of weighting coefficients included in the group 2 exceed a total quantity of weighting coefficients reported by the terminal.

In addition, a weighting coefficient is determined based on amplitude information (for example, the differential amplitude indication information) and phase information (for example, the phase indication information) that correspond to the weighting coefficient. In the implementation 1.1 to the implementation 1.4, it can be ensured that a sum of quantities of weighting coefficients included in the group 0 and the group 1 is approximately close to a quantity of weighting coefficients included in the group 2. For example, the group 0 includes a total of v strongest weighting coefficients of each spatial layer, a total quantity of weighting coefficients included in the group 1 and strongest weighting coefficients included in the group 0 is approximately $K^{NZ}/2$, and a quantity of weighting coefficients included in the group 2 is also approximately $K^{NZ}/2$. In this way, the weighting coefficients are divided into two groups. When CSI does not meet a requirement for reporting overheads, half of the weighting coefficients that have lower priorities may be preferentially discarded, so that overheads can be roughly halved. This helps quickly adjust overheads of precoding matrix indicator information, so that the precoding matrix indicator information meets a reporting requirement.

For example, in Table 3, $N_f=10$, v=4, and R=1, and an index, corresponding to Table 3, of configuration information in Table 1 is 1, that is, L=2, β=¼, and $p_1$=¼. In this case, $$M_1 = \left\lceil p_1 \cdot \frac{N_f}{R} \right\rceil = 3,$$

and $K_0=\lceil \beta \cdot 2LM_1 \rceil=3$. Therefore, the maximum value $2K_0$ of $K^{NZ}$ is 6. In the method in some embodiments, the group 0 includes four of the strongest weighting coefficients corresponding to each spatial layer, the group 1 does not include differential amplitude indication information or phase indication information of a weighting coefficient, and differential amplitude indication information and phase indication information of remaining $2k_0-v$ weighting coefficients (namely, two weighting coefficients) are reported in the group 2. It can be learned that the group 1 does not include differential amplitude indication information or phase indication information of a weighting coefficient, and the differential amplitude indication information and the phase indication information of the remaining $2K_0-v=2$ weighting coefficients left after reporting of the group 0 are all included in the group 2. In this way, all to-be-reported weighting coefficients are divided into two groups. When the CSI does not meet a requirement for reporting overheads, half of the weighting coefficients that have lower priorities may be preferentially discarded, so that overheads can be roughly halved. This helps quickly adjust the overheads of precoding matrix indicator information, so that the precoding matrix indicator information meets a reporting requirement.

As described above, the total quantity of weighting coefficients are correspondingly reported at all the spatial layers is $K^{NZ}$, and the quantity of spatial layers is v. Other than a strongest weighting coefficient corresponding to each spatial layer (the strongest weighting coefficient corresponding to each spatial layer is 1, and therefore differential amplitude indication information and phase indication information of v strongest weighting coefficients do not need to be reported), differential amplitude indication information and phase indication information of $K^{NZ}-v$ weighting coefficients need to be reported. For how to report the differential amplitude indication information and the phase indication information of the $K^{NZ}-v$ weighting coefficients, this application provides a channel state information reporting method 200. FIG. 5 is a schematic flowchart of another channel state information reporting method 200 according to an embodiment of this application. As shown in FIG. 5, the channel state information reporting method 200 may include but is not limited to the following steps.

S201: Generate indication information.

The indication information includes a first group of indication information and a second group of indication information. The first group of indication information includes amplitude indication information and phase indication information of X weighting coefficients, where X is an integer. The second group of indication information includes amplitude indication information and phase indication information of Y weighting coefficients, where Y is an integer. A difference between X and Y is less than or equal to 1, and a sum of X and Y is equal to $K^{NZ}-v$. $K^{NZ}$ is a total quantity of weighting coefficients correspondingly reported at all spatial layers, v is a quantity of spatial layers, $K^{NZ}$ is an integer, and v is a positive integer. To be specific, as shown in FIG. 5, the difference between X and Y in the indication information is less than or equal to 1, and the sum of X and Y is equal to $K^{NZ}-v$.

Priorities of the differential amplitude indication information and the phase indication information in the first group of indication information are higher than priorities of the differential amplitude indication information and the phase indication information in the second group of indication information. The priorities of the differential amplitude indication information and the phase indication information may be determined based on a spatial layer l, a spatial domain vector i, and a frequency domain vector f of corresponding weighting coefficients, and based on the formula (14) and the formula (15). Details are not described herein again.

Optionally, the indication information further includes another group of indication information that may be denoted as the foregoing group 0. Correspondingly, the first group of indication information may be denoted as the foregoing group 1, and the second group of indication information may be denoted as the foregoing group 2. Indication information included in the group 0 is described above. The group 1 includes the differential amplitude indication information and the phase indication information of the X weighting coefficients, and reference amplitude indication information corresponding to each spatial layer. The group 2 includes the differential amplitude indication information and the phase indication information of the Y weighting coefficients. That is, a difference from the indication information respectively included in the foregoing group 0 and group 1 lies in that the quantities X and Y of the differential amplitude indication information and the phase indication information included in the group 1 and the group 2 respectively in some embodiments are X and Y, the difference between X and Y is less than or equal to 1, and the sum of X and Y is equal to $K^{NZ}-v$. Both X and Y are integers.

Optionally, that the first group of indication information includes amplitude indication information and phase indication information of X weighting coefficients may be expressed as follows: the group 1 includes X elements with higher priorities (namely, X differential amplitudes with higher priorities) in the differential amplitude indication information $i_{2,4,l}$ of the reported $K^{NZ}-v$ weighting coefficients, and X elements with higher priorities (namely, X phases with higher priorities) in the phase indication information $i_{2,5,l}$ of the reported $K^{NZ}-v$ weighting coefficients. That the second group of indication information includes amplitude indication information and phase indication information of Y weighting coefficients may be expressed as follows: the group 1 includes Y elements with lower priorities (namely, Y differential amplitudes with lower priorities) in the differential amplitude indication information $i_{2,4,l}$ of the reported $K^{NZ}-v$ weighting coefficients, and Y elements with lower priorities (namely, Y phases with lower priorities) in the phase indication information $i_{2,5,l}$ of the reported $K^{NZ}-v$ weighting coefficients.

The group 1 further includes the reference amplitude indication information corresponding to each spatial layer. The reference amplitude indication information corresponding to each spatial layer indicates a reference amplitude in a polarization direction other than a polarization direction in which a strongest weighting coefficient at the spatial layer is located. To be specific, a reference amplitude in a polarization direction of each spatial layer is 1, and a reference amplitude in another polarization direction is a reference amplitude indicated by reference amplitude indication information corresponding to the spatial layer. In this way, a network device can determine an amplitude value of a weighting coefficient in each polarization direction of each spatial layer based on differential amplitude indication information of the weighting coefficient and a corresponding reference amplitude in each polarization direction of each spatial layer.

In an optional implementation (denoted as an implementation 2.1), that a difference between X and Y is less than or equal to 1 and a sum of X and Y is equal to $K^{NZ}-v$ may be as follows: X is equal to $\lfloor (K^{NZ}-v)/2 \rfloor$, and Y is equal to $\lceil (K^{NZ}-v)/2 \rceil$. It can be learned that, in this implementation, the differential amplitude indication information and the phase indication information of the $K^{NZ}-v$ weighting coefficients are allocated to the group 1 and the group 2 as evenly as feasibly possible.

In an optional implementation (denoted as an implementation 2.2), that a difference between X and Y is less than or equal to 1 and a sum of X and Y is equal to $K^{NZ}-v$ may be as follows: X is equal to $\lceil (K^{NZ}-v)/2 \rceil$, and Y is equal to $\lfloor (K^{NZ}-v)/2 \rfloor$. It can be learned that, in this implementation, the differential amplitude indication information and the phase indication information of the $K^{NZ}-v$ weighting coefficients are allocated to the group 1 and the group 2 as evenly as feasibly possible.

FIG. 6 is still another schematic diagram of values of X and Y in indication information according to an embodiment of this application. As shown in FIG. 6, in the indication information, X is equal to $\lceil (K^{NZ}-v)/2 \rceil$, and Y is equal to $\lfloor (K^{NZ}-v)/2 \rfloor$ or X is equal to $\lfloor (K^{NZ}-v)/2 \rfloor$, and Y is equal to $\lceil (K^{NZ}-v)/2 \rceil$.

In still another optional implementation (denoted as an implementation 2.3), that a difference between X and Y is less than or equal to 1 and a sum of X and Y is equal to $K^{NZ}-v$ may be as follows: values of X and Y are related to an index of configuration information, a quantity $N_f$ of frequency domain units, and the quantity v of spatial layers. The configuration information, the quantity of frequency domain units, and the quantity v of spatial layers are used to determine a maximum value of the total quantity $K^{NZ}$ of reported weighting coefficients. The index of the configuration information and the quantity $N_f$ of frequency domain units are indicated by the network device to a terminal device, so that the terminal device can determine a maximum quantity of weighting coefficients that can be reported.

In addition, the terminal device may clearly determine, based on one or more of the following information, a quantity of weighting coefficients corresponding to the differential amplitude indication information and the phase indication information that are included in the group 1 and the group 2. Optionally, the network device and the terminal device may predefine one or more of the following information by using a protocol:

when the index of the configuration information is 1, $2<N_f\leq 5$, and v=2, X is equal to 0, and Y is equal to 0;

when the index of the configuration information is 1, $4<N_f\leq 9$, and v=3, X is equal to 0, and Y is equal to 1;

when the index of the configuration information is 1, $4<N_f\leq 9$, and v=4, X is equal to 0, and Y is equal to 0;

when the index of the configuration information is 1, $8<N_f\leq 13$, and v=4, X is equal to 1, and Y is equal to 1;

when the index of the configuration information is 2, $N_f=3$ or 4, and v=3, X is equal to 0, and Y is equal to 1;

when the index of the configuration information is 2, $N_f=3$ or 4, and v=4, X is equal to 0, and Y is equal to 0;

when the index of the configuration information is 3, $N_f=3$ or 4, and v=3, X is equal to 0, and Y is equal to 1; or when the index of the configuration information is 3, $N_f=3$ or 4, and v=4, X is equal to 0, and Y is equal to 0.

S202: The terminal device sends the indication information.

S203: The network device receives the indication information.

S204: The network device determines, based on the indication information, a weighting coefficient reported by the terminal device.

Optionally, after step S204, the network device may construct a precoding matrix based on each weighting coefficient reported by the terminal device. For details about a construction of a precoding matrix, refer to the content described with reference to the formula (2) to the formula (9).

In an optional implementation, in the manner described in the implementation 2.1, that the network device determines, based on the indication information, a weighting coefficient reported by the terminal device in step S203 may include that the network device interprets a CSI part 1 to obtain the quantity v of spatial layers that is indicated by an RI and the total quantity $K^{NZ}$ of weighting coefficients correspondingly reported at all the spatial layers. The network device determines, based on the quantity v of spatial layers and the total quantity $K^{NZ}$, that X is equal to $\lfloor (K^{NZ}-v)/2 \rfloor$ and Y is equal to $\lceil (K^{NZ}-v)/2 \rceil$. To be specific, the group 1 includes differential amplitude indication information and phase indication information of $\lfloor (K^{NZ}-v)/2 \rfloor$ weighting coefficients, and the group 2 includes differential amplitude indication information and phase indication information of $\lceil (K^{NZ}-v)/2 \rceil$ weighting coefficients. That is, the network device may obtain $K^{NZ}-v$ weighting coefficients reported by the terminal device.

For example, the configuration index 1 in the configuration options shown in Table 1 is used as an example. To be specific, when L=2, β=¼, and v<3, $p_v$=¼ or when v>2, $p_v$=⅛. For different quantities $N_f$ of frequency domain units, Table 4 lists quantities of differential amplitude indication information and phase indication information of weighting coefficients included in the group 1 and the group 2 in the implementation 2.1 in the case of different quantities of frequency domain units. A maximum value of $K^{NZ}$ is used. To be specific, when rank=1, $K^{NZ}=K_0$ or when rank>1, $K^{NZ}=2K_0$. For different quantities $N_f$ of frequency domain units and different R configured by the network device, a value of $K_0$ may be calculated by using the formula (11) and the formula (12).

TABLE 6

| | $N_f$ | | 3 | 4 | 5 | 6 | 7 | 3 | 9 | 10 | 11 | 12 |
|---|---|---|---|---|---|---|---|---|---|---|---|---|
| Quantity of differential amplitude indication information or phase indication information of weighting coefficients included in the group 1 | $\lfloor (K^{NZ} - \nu)/2 \rfloor$ | Rank 1 | 0 | 0 | 0 | 0 | 0 | 0 | 1 | 1 | 1 | 1 |
| | | Rank 2 | 0 | 0 | 1 | 1 | 1 | 1 | 2 | 2 | 2 | 2 |
| | | Rank 3 | | | 0 | 0 | 0 | 0 | 1 | 1 | 1 | 1 |
| | | Rank 4 | | | 0 | 0 | 0 | 0 | 1 | 1 | 1 | 1 |
| Quantity of differential amplitude indication information or phase indication information of weighting coefficients included in the group 2 | $\lceil (K^{NZ} - \nu)/2 \rceil$ | Rank 1 | 0 | 0 | 1 | 1 | 1 | 1 | 1 | 1 | 1 | 1 |
| | | Rank 2 | 0 | 0 | 1 | 1 | 1 | 1 | 2 | 2 | 2 | 2 |
| | | Rank 3 | | | 1 | 1 | 1 | 1 | 2 | 2 | 2 | 2 |
| | | Rank 4 | | | 0 | 0 | 0 | 0 | 1 | 1 | 1 | 1 |
| Total quantity of differential amplitude indication information or phase indication information of weighting coefficients included in the group 1 and the group 2 | $K^{NZ} - \nu$ | Rank 1 | 0 | 0 | 1 | 1 | 1 | 1 | 2 | 2 | 2 | 2 |
| | | Rank 2 | 0 | 0 | 2 | 2 | 2 | 2 | 4 | 4 | 4 | 4 |
| | | Rank 3 | | | 1 | 1 | 1 | 1 | 3 | 3 | 3 | 3 |
| | | Rank 4 | | | 0 | 0 | 0 | 0 | 2 | 2 | 2 | 2 |

For example, in Table 3, $N_f=9$, $v=4$, $R=1$, $L=2$, $\beta=1/4$, $p_1=1/4$, and $p_v=1/8$. The following may be obtained by using the formula (11):

$$M_4 = \left\lceil p_4 \cdot \frac{N_f}{R} \right\rceil = 2, \text{ and}$$

$$M_1 = \left\lceil p_1 \cdot \frac{N_f}{R} \right\rceil = 3.$$

The following may be obtained by using the formula (12): $K_0 = \lceil \beta \cdot 2LM_1 \rceil = 3$. A maximum value of a maximum quantity $K^{NZ}$ of reported weighting coefficients is as follows: $2K_0=6$. A strongest weighting coefficient at each spatial layer is 1. Therefore, an upper limit of a total quantity of differential amplitude indication information and phase indication information, reported in the group 1 and the group 2 in a CSI part 2, of remaining weighting coefficients is $2K_0-v=2$. That is, in this example, it is assumed that $K^{NZ}=6$ and $v=4$.

As described in the implementation 2.1, the group 1 includes $\lfloor (K^{NZ}-v)/2 \rfloor$ elements, namely, one element, with higher priorities in a set $i_{2,5,l}$ of differential amplitude indication information and a set $i_{2,5,l}$ of phase indication information of reported two weighting coefficients. That is, the group 1 includes one piece of differential amplitude indication information and one piece of phase indication information with higher priorities. The group 2 includes $\lceil (K^{NZ}-v)/2 \rceil$ elements, namely, one element, with lower priorities in the set $i_{2,4,l}$ of the differential amplitude indication information and the set $i_{2,5,l}$ of the phase indication information of the reported two weighting coefficients. That is, the group 2 includes one piece of differential amplitude indication information and one piece of phase indication information with lower priorities. It can be learned that, in this implementation, the problem is avoided where quantities of differential amplitude indication information and phase indication information, reported in the group 1, of weighting coefficients are negative values and quantities of differential amplitude indication information and phase indication information, reported in the group 2, of weighting coefficients exceed the total quantity $K^{NZ}-v$.

It can be learned that, in some embodiments, the quantities of the differential amplitude indication information and the phase indication information of the weighting coefficients included in the group 1 are at least 0. In addition, total quantities of the differential amplitude indication information and the phase indication information of the weighting coefficients included in the group 1 and the group 2 are both $K^{NZ}-v$. In this allocation manner, the problem in a current protocol can be avoided where when some configuration parameters are used, the quantities of the differential amplitude indication information and the phase indication information of the weighting coefficients included in the group 1 are negative values, and the quantities of the differential amplitude indication information and the phase indication information of the weighting coefficients included in the group 2 exceed the total quantity of the reported weighting coefficients.

In addition, in some embodiments, it can be ensured that a quantity of weighting coefficients included in the group 1 and a quantity of weighting coefficients included in the group 2 are approximately close, and are approximately $K^{NZ}/2$. In this way, a strongest weighting coefficient of each spatial layer is the most important. The strongest weighting coefficient of each spatial layer separately forms a group, and is included in the group 0, and information of remaining weighting coefficients is allocated to the group 1 and the group 2 as evenly as feasibly possible based on priorities. It is assumed that the strongest weighting coefficient of each spatial layer corresponds to a $1^{st}$ priority, and the remaining weighting coefficients correspond to a $2^{nd}$ priority. In addition, the remaining weighting coefficients may be further classified into two types based on priorities, and quantities of weighting coefficients in the two types are approximately equal. In this case, when CSI does not meet a requirement for reporting overheads, one type of weighting coefficients at the $2^{nd}$ priority may be first deleted, and then the other type of weighting coefficients at the $2^{nd}$ priority is deleted. It can be learned that, in this design, weighting coefficients are allocated in a more fine-grained manner, so that precision and performance of reporting precoding matrix indicator information can be ensured to the maximum extent.

Figure 7:
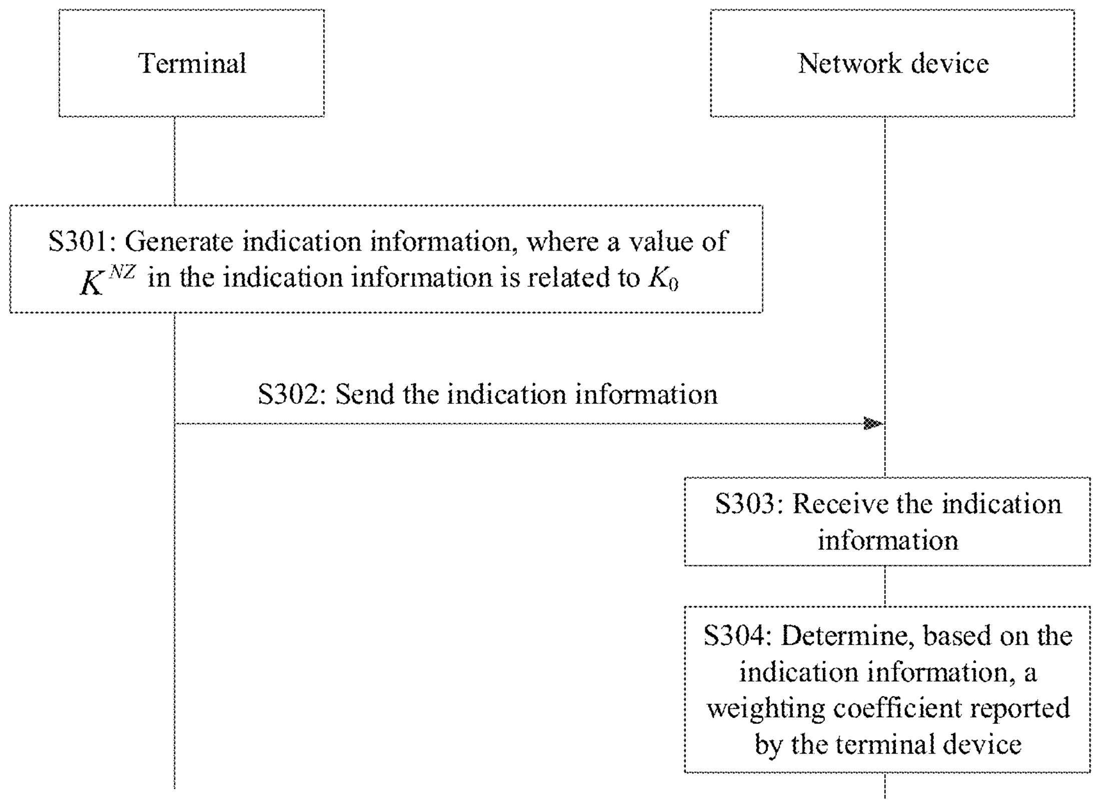
FIG. 7 is a schematic flowchart of a channel state information reporting method 300 according to an embodiment of this application.

FIG. 7 is a schematic flowchart of another channel state information reporting method 300 according to an embodiment of this application. As shown in FIG. 7, the channel state information reporting method 300 may include but is not limited to the following steps.

S301: A terminal device generates indication information.

S302: The terminal device sends the indication information.

The indication information includes amplitude information and phase information of $K^{NZ}$ weighting coefficients. A value of $K^{NZ}$ is related to $K_0$. $K^{NZ}$ is a total quantity of weighting coefficients correspondingly reported at all spatial layers. $K_0$ is configured by a network device and is used to determine a maximum value within a value range of $K^{NZ}$. Both $K^{NZ}$ and $K_0$ are integers. For example, when v>1, the maximum value within the value range of $K^{NZ}$ is $2K_0$ or when v=1, the maximum value within the value range of $K_{NZ}$ is $K_0$.

It can be learned that, in this implementation, the maximum value within the value range of $K_{NZ}$ is determined by using $K_0$. This helps avoid the problem that the maximum value of $K^{NZ}$ is less than 2v. As a result, when some configuration parameters are used, quantities of amplitude information and phase information of weighting coefficients included in a group 1 are negative values, and a quantity of amplitude information or phase information of weighting coefficients included in a group 2 exceeds a total quantity of reported weighting coefficients.

In an implementation, a value of $K^{NZ}$ is related to $K_0$. This may be implemented as follows: when v>1 and $K_0$<v, or when v=1 and $K_0$<2v, $K^{NZ}$=2v. To be specific, in this case, a total of 2v weighting coefficients are reported in a CSI part 2.

In an optional implementation, the 2v weighting coefficients are v first weighting coefficients and v second weighting coefficients. The first weighting coefficient is a weighting coefficient corresponding to each spatial layer. The second weighting coefficient is a weighting coefficient corresponding to a polarization direction other than a polarization direction in which the first weighting coefficient corresponding to each spatial layer is located. It can be learned that, in this design manner, the problem can be avoided where, when the maximum value of $K^{NZ}$ is less than v or 2v, a quantity of amplitude information or phase information of weighting coefficients included in the group 1 is a negative value, and a total quantity of amplitude information or phase information of weighting coefficients included in the group 2 exceeds a total quantity of reported weighting coefficients. In addition, in this design manner, it can be ensured that the terminal device reports at least one weighting coefficient in each polarization direction of each spatial layer. This helps ensure accuracy of the precoding matrix indicator information.

In another optional implementation, in the case in which $K^{NZ}$=2v when v>1 and $K_0$<v or when v=1 and $K_0$<2v, each first weighting coefficient is a strongest weighting coefficient corresponding to each spatial layer, and each second weighting coefficient is a strongest weighting coefficient corresponding to a polarization direction other than a polarization direction in which the first weighting coefficient corresponding to each spatial layer is located. It can be learned that, in this implementation, because one weighting coefficient is reported in each polarization direction, no differential reporting needs to be performed. To be specific, the CSI part 2 does not include differential amplitude indication information. This helps reduce overheads.

For a group 0, the group 1, and the group 2 in the CSI part 2, in the case in which $K^{NZ}$=2v when v>1 and $K_0$<v or when v=1 and $K_0$<2v, information of the 2v weighting coefficients may be distributed in the group 0, the group 1, and the group 2. For example, the 2v weighting coefficients are a strongest weighting coefficient corresponding to each spatial layer, and a strongest weighting coefficient corresponding to a polarization direction other than a polarization direction in which the strongest weighting coefficient is located. Indication information included in the CSI part 2 may be expressed as follows:

The group 0 in the CSI part 2 includes the following indication information:

- index indication information of spatial domain vectors respectively reported in two polarization directions, where the index indication information includes $i_{1,1}$ and $i_{1,2}$, $i_{1,1}$ indicates $[q_1, q_2]$, and $i_{1,2}$ indicates and $$n_1^{(i)} \text{ and } n_2^{(i)};$$

and

- location indication information, denoted as $i_{1,8,l}$, of the first weighting coefficient corresponding to each spatial layer, where l=(1, . . . , v), and when a rank is 1, a location indicated by $i_{1,8,l}$ is one of locations of $2LM_1$ optional weighting coefficients, or when a rank is greater than 1, $i_{1,8,l}$ indicates an index of a spatial domain vector corresponding to the strongest weighting coefficient, and then a location of the strongest weighting coefficient may be determined based on the index of the spatial domain vector.

The group 1 in the CSI part 2 includes the following indication information:

- index indication information of a frequency domain vector are correspondingly reported at each spatial layer, where the index indication information includes $i_{1,5}$ and/or $i_{1,6,l}$, and indicates $n_{3,l}^{(f)}$, l=(1, . . . , v), and f=0, 1, . . . , $M_v$−1; when the quantity $N_f$ of frequency domain units is greater than 19, $i_{1,5}$ indicates a start location of a window with a length of $2M_v$, the window represents a vector index set including $2M_v$ frequency domain vectors whose indexes are cyclically consecutive, the start location of the window may be an index value corresponding to a start frequency domain vector in the vector index set including the $2M_v$ frequency domain vectors whose indexes are cyclically consecutive, $i_{1,6,l}$ indicates $M_v$−1 frequency domain vectors, included in the window with a length of $2M_v$, of remaining reported frequency domain vectors obtained by removing a frequency domain vector with an index of 0 from correspondingly reported frequency domain vectors, $i_{1,5} \in \{0, 1, \ldots, 2M_v-1\}$, and $$i_{1,6,l} = \left\{0, 1, \ldots, \binom{2M_v-1}{M_v-1} - 1\right\};$$

or when the quantity $N_f$ of frequency domain units is less than 19, the index indication information does not include $i_{15}$, $i_{1,6,l}$ indicates $M_v$−1 frequency domain vectors, included in all $N_f$−1 optional frequency domain vectors, of remaining selected frequency domain vectors obtained by removing a frequency domain vector with an index of 0 from selected frequency domain vectors, and $$i_{1,6,l} = \left\{0, 1, \ldots, \binom{N_f-1}{M_v-1} - 1\right\}; \text{ and}$$

$$\binom{2M_v-1}{M_v-1}$$

indicates a quantity of combinations, to be specific, a quantity of possible combinations of $M_v$−1 frequency domain vectors selected from $2M_v$−1 frequency domain vectors, and correspondingly, $$\binom{N_f-1}{M_v-1}$$

indicates a quantity of possible combinations of $M_v$−1 frequency domain vectors selected from $N_3$−1 frequency domain vectors;

reference amplitude indication information (denoted as $i_{1,6,l}$) corresponding to each spatial layer, used to indicate $$p_{l,0}^{(1)} \text{ or } p_{l,1}^{(1)};$$

and v2L$M_v$−v elements with higher priorities in location indication information of a weighting coefficient are correspondingly reported at each spatial layer, where a set of the location indication information of the weighting coefficient correspondingly reported at each spatial layer is denoted as $i_{1,7,l}$, that is, v2L$M_v$−v elements with higher priorities in $i_{1,7,l}$ (to be specific, v2L$M_v$−v pieces of location information with higher priorities and corresponding to $$k_{l,i,f}^{(3)} \in \{0, 1\}$$

in a bitmap including v2L$M_v$ bits) are included.

The group 2 in the CSI part 2 includes the following indication information:

v elements with lower priorities in location indication information of a weighting coefficient are correspondingly reported at each spatial layer, that is, v elements with lower priorities in $i_{1,7,l}$, where the v elements correspondingly indicate location information of v weighting coefficients with lower priorities; and phase indication information of the v second weighting coefficients.

The reference amplitude indication information corresponding to each spatial layer in the group 1 indicates amplitude information of the strongest weighting coefficient in the polarization direction other than the polarization direction in which the strongest weighting coefficient at each spatial layer is located. Therefore, the reference amplitude indication information corresponding to each spatial layer in the group 1 is amplitude information of the second weighting coefficient. To be specific, in an implementation, the indication information includes a first group of indication information and a second group of indication information, the first group of indication information includes amplitude indication information of the v second weighting coefficients, and the second group of indication information includes phase indication information of the v second weighting coefficients. The amplitude indication information is reference amplitude indication information in a polarization direction of a corresponding spatial layer, and indicates the amplitude information of the second weighting coefficient. It can be learned that, in this implementation, the group 1 may not include differential amplitude indication information of a weighting coefficient. This helps reduce reporting overheads.

In addition, in some embodiments, when v>1 and $K_0 \geq v$, or when v=1 and $K_0 \geq 2v$, the foregoing distribution solution specified in the protocol may be used: the group 1 includes $\lceil K^{NZ}/2 \rceil$−v elements with higher priorities in differential amplitude indication information and phase indication information of reported $K^{NZ}$−v weighting coefficients, and the group 2 includes $\lfloor K^{NZ}/2 \rfloor$ elements with lower priorities in the differential amplitude indication information and the phase indication information of the reported $K^{NZ}$−v weighting coefficients. This is due to v>1 and $K_0 \geq v$, or v=1 and $K_0 \geq 2v$, $\lceil K^{NZ}/2 \rceil$−v not resulting in a negative value. To be specific, a quantity of elements included in the group 1 is not a negative value, and a quantity $\lfloor K^{NZ}/2 \rfloor$ of elements included in the group 2 is not greater than $K^{NZ}$−v.

Figure 8:
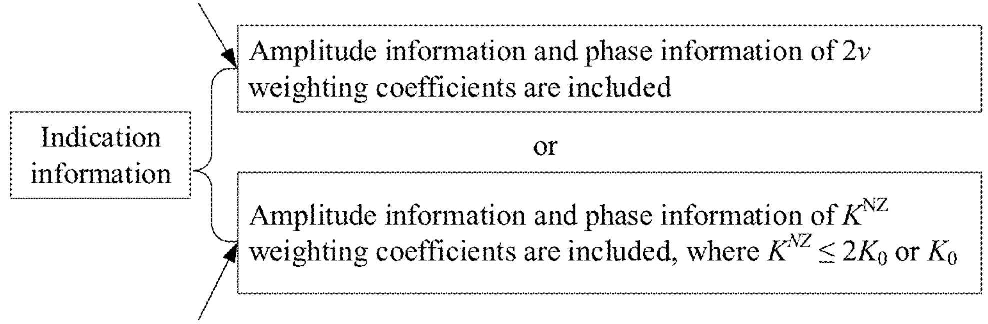
FIG. 8 is a schematic diagram of a quantity of weighting coefficients reported in indication information according to an embodiment of this application.

FIG. 8 is a schematic diagram of a quantity of weighting coefficients reported in indication information according to an embodiment of this application. As shown in FIG. 8, the indication information may include amplitude information and phase information of 2v weighting coefficients, or the indication information may include amplitude information and phase information of $K^{NZ}$ weighting coefficients. When v>1 and $K_0$<v, or when v=1 and $K_0$<2v, the indication information includes amplitude information and phase information of 2v weighting coefficients; or when v>1 and $K_0 \geq v$, or when v=1 and $K_0 \geq 2v$, the indication information includes amplitude information and phase information of $K^{NZ}$ weighting coefficients, where $K^{NZ} \leq K_0$ or $2K_0$.

S303: The network device receives the indication information.

S304: The network device determines, based on the indication information, a weighting coefficient reported by the terminal device.

That the network device determines, based on the indication information, a weighting coefficient reported by the terminal device in step S304 may include that the network device interprets a CSI part 1 to obtain the quantity v of spatial layers that is indicated by an RI. The network device calculates a value of $K_0$ by using the formula (11) and the formula (12) based on an index of configuration information and a quantity $N_f$ of frequency domain units that are configured by the network device. When v>1 and $K_0$<v, or when v=1 and $K_0$<2v, the network device determines that the terminal device reports 2v weighting coefficients. Then the network device parses out the 2v weighting coefficients from the CSI part 2 based on a distribution manner of information of the 2v weighting coefficients in the CSI part 2 in the foregoing implementation. When v>1 and $K_0 \geq v$, or when v=1 and $K_0 \geq 2v$, the network device may obtain, by interpreting the CSI part 1, a total quantity $K^{NZ}$ of weighting coefficients correspondingly reported at all spatial layers. Also in step S304, terminal device may then parse out $K^{NZ}$ weighting coefficients based on a distribution status, specified in a protocol, of information of $K^{NZ}-v$ weighting coefficients in the CSI part 2.

Optionally, after step S304, the network device may construct a precoding matrix based on each weighting coefficient reported by the terminal device. For details about construction of a precoding matrix, refer to the content described with reference to the formula (2) to the formula (9).

It can be learned that, in some embodiments, under a constraint condition that a maximum value of a total quantity of reported weighting coefficients is $K_0$ or $2K_0$, a constraint that a minimum value of the total quantity of reported weighting coefficients is 2v is added. This avoids the following problem that the upper limit $K_0$ or $2K_0$ of the total quantity of reported weighting coefficients is excessively small. Consequently, a quantity of weighting coefficients included in the group 1 in the CSI part 2 is a negative value, and a quantity of weighting coefficients included in the group 2 exceeds a predetermined quantity $K^{NZ}-v$. In addition, in some embodiments, it can be ensured, to the feasibly maximum extent, that at least one weighting coefficient is reported in each polarization direction of each spatial layer, to avoid excessively poor networking performance or even invalid reported precoding matrix indicator information.

For example, the configuration index 1 in Table 1 is used as an example. To be specific, when L=2, $\beta=1/4$, and v<3, $p_v=1/4$ or when v>2, $p_v=1/8$. Assuming that $N_f=8$, v=3, and R=1, the following may be obtained by using the formula (11):

$$M_1 = \left\lceil p_1 \cdot \frac{N_f}{R} \right\rceil = 2.$$

The following may also be obtained by using the formula (12): $K_0 = \lceil \beta \cdot 2LM_1 \rceil = 2$. It can be learned that a maximum value of a maximum quantity $K^{NZ}$ of reported weighting coefficients is $2K_0=4$. One strongest weighting coefficient is reported at each spatial layer, and information of only one additional weighting coefficient can be reported. This means that a weighting coefficient is not reported for one polarization direction of each of two spatial layers among three spatial layers. This causes an unavailability for the polarization direction. According to some embodiments, it can be learned that, in this example, v>1, and $K_0$<v. Therefore, the terminal device reports 2v weighting coefficients, namely, six weighting coefficients, by default. Optionally, the six weighting coefficients may be maximum weighting coefficients corresponding to all polarization directions of all spatial layers. Correspondingly, the network device may parse out the six weighting coefficients from the CSI part 2. It can be learned that, in some embodiments, the unavailability of a polarization direction can be avoided, and the problem can also be resolved where a total quantity of reported weighting coefficients is excessively small. Consequently, a quantity of weighting coefficients included in the group 1 in the CSI part 2 is a negative value, and a quantity of weighting coefficients included in the group 2 exceeds a predetermined quantity $K_{NZ}-v$.

Figure 9:
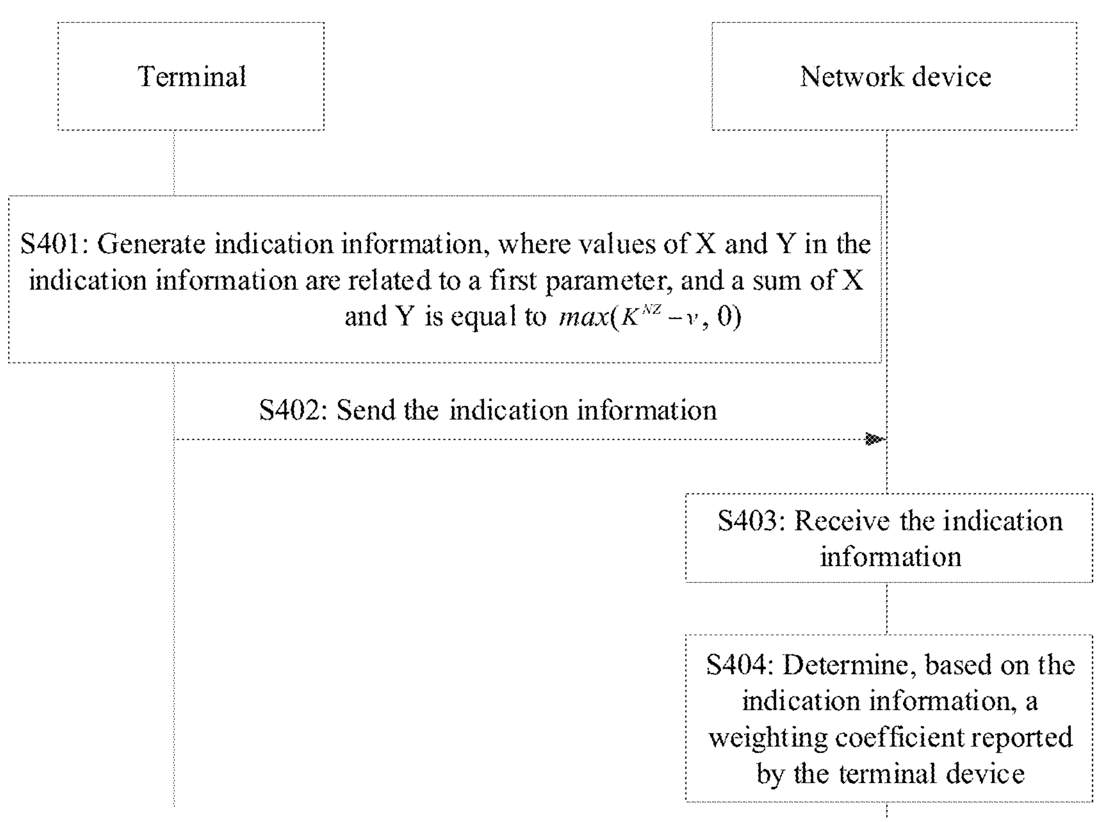
FIG. 9 is a schematic flowchart of a channel state information reporting method 400 according to an embodiment of this application.

FIG. 9 is a schematic flowchart of a channel state information reporting method 400 according to an embodiment of this application. As shown in FIG. 9, the channel state information reporting method 400 may include but is not limited to the following steps.

S401: A terminal device generates indication information.

S402: The terminal device sends the indication information.

The indication information includes a first group of indication information and a second group of indication information. The first group of indication information includes reference amplitude indication information corresponding to each spatial layer, and differential amplitude indication information and phase indication information of X weighting coefficients, where X is an integer. The second group of indication information includes differential amplitude indication information and phase indication information of Y weighting coefficients, where Y is an integer. Values of X and Y are related to a first parameter, and a sum of X and Y is equal to $\max(K^{NZ}-v, 0)$. $K^{NZ}$ is a total quantity of weighting coefficients correspondingly reported at all spatial layers, v is a quantity of spatial layers, $K^{NZ}$ is an integer, and v is a positive integer. That is, as shown in FIG. 9, the values of X and Y in the indication information are related to the first parameter, and the sum of X and Y is equal to $\max(K^{NZ}-v, 0)$.

Priorities of the differential amplitude indication information and the phase indication information in the first group of indication information are higher than priorities of the differential amplitude indication information and the phase indication information in the second group of indication information. The priorities of the differential amplitude indication information and the phase indication information may be determined based on a spatial layer l, a spatial domain vector i, and a frequency domain vector f of corresponding weighting coefficients, and based on the formula (14) and the formula (15). Details are not described herein again.

Optionally, the indication information further includes another group of indication information that may be denoted as the foregoing group 0, as described above. Details are not described herein again. In addition, the quantities X and Y of the differential amplitude indication information and the phase indication information included in the group 1 and the group 2 respectively are related to the first parameter. For an optional implementation, refer to related content in the channel state information reporting method 100, for example, the implementation 1.1 to the implementation 1.4.

In the channel state information reporting method 400, when $K^{NZ}-v$ is less than 0, the terminal device may not add differential amplitude indication information or phase indication information of weighting coefficients to the first group of indication information or the second group of indication information. This also avoids a problem that a network device cannot parse out a correct weighting coefficient when the terminal device performs incorrect grouping.

In this application, when $K^{NZ} \le v$ or $K^{NZ} < v$, X is equal to 0, and Y is equal to 0.

In this application, when $K^{NZ} \ge v$ or $K^{NZ} > v$, the sum of X and Y is equal to $K^{NZ}-v$.

In an optional implementation, when $v < K^{NZ} \le 2v$, $v < K^{NZ} < 2v$, $v \le K^{NZ} \le 2v$, or $v \le K^{NZ} < 2v$, X is equal to 0, and Y is equal to $K^{NZ}-v$; or when $K^{NZ} \ge 2v$ or $K^{NZ} > 2v$, X is equal to $\lceil K^{NZ}/2 \rceil - v$ and Y is equal to $\lfloor K^{NZ}/2 \rfloor$.

In an optional implementation, X is equal to $\max(\lceil K^{NZ}/2 \rceil - v, 0)$, and Y is equal to $\max(0, K^{NZ}-v-\max(\lceil K^{NZ}/2 \rceil - v, 0)$, where $\max(\lceil K^{NZ}/2 \rceil - v, 0)$ represents a largest value between $\lceil K^{NZ}/2 \rceil - v$ and 0, and $\max(0, K^{NZ}-v-\max(\lceil K^{NZ}/2 \rceil - v, 0)$ represents a largest value between $K^{NZ}-v-\max(\lceil K^{NZ}/2 \rceil - v, 0)$ and 0.

In another optional implementation, X is equal to $\lceil K^{NZ}/2 \rceil - \min(v, \lceil K^{NZ}/2 \rceil)$, and Y is equal to $\max(0, \lfloor K^{NZ}/2 \rfloor - v + \min(v, \lceil K^{NZ}/2 \rceil)$, where $\min(v, \lceil K^{NZ}/2 \rceil)$ represents a smallest value between v and $\lceil K^{NZ}/2 \rceil$, and $\max(0, \lfloor K^{NZ}/2 \rfloor - v + \min(v, \lceil K^{NZ}/2 \rceil))$ represents a largest value between $\lfloor K^{NZ}/2 \rfloor - v + \min(v, \lceil K^{NZ}/2 \rceil)$ and 0.

In still another optional implementation, the first parameter is related to an index of configuration information, a quantity $N_f$ of frequency domain units, and the quantity v of spatial layers, where the index of the configuration information, the quantity of frequency domain units, and the quantity v of spatial layers are used to determine a maximum value of $K^{NZ}$.

In this implementation, optionally, when the index of the configuration information is 1 and $2 < N_f < 5$, X is equal to 0, and Y is equal to 0;

when the index of the configuration information is 1, $4 < N_f < 9$, and v=3, X is equal to 0, and Y is equal to 1;

when the index of the configuration information is 1, $4 < N_f < 9$, and v=4, X is equal to 0, and Y is equal to 0;

when the index of the configuration information is 1, $8 < N_f < 13$, and v=4, X is equal to 0, and Y is equal to 2;

when the index of the configuration information is 2, $N_f=3$ or 4, and v=3, X is equal to 0, and Y is equal to 1;

when the index of the configuration information is 2, $N_f=3$ or 4, and v=4, X is equal to 0, and Y is equal to 0;

when the index of the configuration information is 3, $N_f=3$ or 4, and v=3, X is equal to 0, and Y is equal to 1; or when the index of the configuration information is 3, $N_f=3$ or 4, and v=4, X is equal to 0, and Y is equal to 0.

S403: The network device receives the indication information.

S404: The network device determines, based on the indication information, a weighting coefficient reported by the terminal device.

Step S404 may include that when determining that $K^{NZ} \le v$ or $K^{NZ} < v$, the network device may learn that the first group of indication information and the second group of indication information do not include differential amplitude indication information or phase indication information of a weighting coefficient. When the network device determines that $K^{NZ} \ge v$ or $K^{NZ} > v$, the sum of X and Y is equal to $K^{NZ}-v$. Therefore, the weighting coefficient reported by the terminal device may be determined based on the allocation status of the $K^{NZ}-v$ weighting coefficients in the first group of indication information and the second group of indication information in the implementation of the channel state information reporting method 100.

For example, the configuration index 1 in the configuration options shown in Table 1 is used as an example. Correspondingly, when L=2, β=¼, and v<3, $p_v$=¼ or when v>2, $p_v$=⅛. For different quantities $N_f$ of frequency domain units, Table 5 lists quantities of differential amplitude indication information and phase indication information of weighting coefficients included in the group 1 and the group 2 in the case of different quantities $N_f$ of frequency domain units. A maximum value of $K^{NZ}$ is used. To be specific, when rank=1, $K^{NZ}=K_0$ or when rank>1, $K^{NZ}=2K_0$. For different quantities $N_f$ of frequency domain units and different R configured by the network device, a value of $K_0$ may be calculated by using the formula (11) and the formula (12).

TABLE 7

| $N_f$ | | | 3 | 4 | 5 | 6 | 7 | 8 | 9 | 10 | 11 | 12 |
|---|---|---|---|---|---|---|---|---|---|---|---|---|
| Quantity of differential amplitude indication information or phase indication information of weighting coefficients included in the group 1 | $\max(\lceil K^{NZ}/2 \rceil - v, 0)$ or $\lceil K^{NZ}/2 \rceil - \min(v, \lceil K^{NZ}/2 \rceil)$ | Rank 1 | 0 | 0 | 0 | 0 | 0 | 0 | 1 | 1 | 1 | 1 |
| | | Rank 2 | 0 | 0 | 0 | 0 | 0 | 0 | 1 | 1 | 1 | 1 |
| | | Rank 3 | 0 | 0 | 0 | 0 | 0 | 0 | 0 | 0 | 0 | 0 |
| | | Rank 4 | 0 | 0 | 0 | 0 | 0 | 0 | 0 | 0 | 0 | 0 |
| Quantity of differential amplitude indication information or phase indication information of weighting coefficients | $\max(0, K^{NZ} - v - \max(\lceil K^{NZ}/2 \rceil - v, 0))$ or $\max(0, \lfloor K^{NZ}/2 \rfloor - v + \min(v, \lceil K^{NZ}/2 \rceil))$ | Rank 1 | 0 | 0 | 1 | 1 | 1 | 1 | 1 | 1 | 1 | 1 |
| | | Rank 2 | 0 | 0 | 2 | 2 | 2 | 2 | 2 | 3 | 3 | 3 |
| | | Rank 3 | 0 | 0 | 1 | 1 | 1 | 1 | 3 | 3 | 3 | 3 |
| | | Rank 4 | 0 | 0 | 0 | 0 | 0 | 0 | 2 | 2 | 2 | 2 |

TABLE 7-continued

| | $N_f$ | | 3 | 4 | 5 | 6 | 7 | 8 | 9 | 10 | 11 | 12 |
|---|---|---|---|---|---|---|---|---|---|---|---|---|
| included in the group 2 | | | | | | | | | | | | |
| Total quantity of differential amplitude indication information or phase indication information of weighting coefficients included in the group 1 and the group 2 | $K^{NZ}-v$ | Rank 1 | 0 | 0 | 1 | 1 | 1 | 1 | 2 | 2 | 2 | 2 |
| | | Rank 2 | 0 | 0 | 2 | 2 | 2 | 2 | 4 | 4 | 4 | 4 |
| | | Rank 3 | 0 | 0 | 1 | 1 | 1 | 1 | 3 | 3 | 3 | 3 |
| | | Rank 4 | 0 | 0 | 0 | 0 | 0 | 0 | 2 | 2 | 2 | 2 |

It can be learned that, in the foregoing optional implementations, for example, that the group 1 includes max $(\lceil K^{NZ}/2\rceil-v, 0)$ elements with higher priorities in a set $i_{2,4,l}$ of differential amplitude indication information and a set $i_{2,5,l}$ of phase indication information of reported $K^{NZ}-v$ weighting coefficients, and that the group 2 includes $\max(0, K^{NZ}-v-\max(\lceil K^{NZ}/2\rceil-v, 0)$ elements with lower priorities in the set $i_{2,4,l}$ of the differential amplitude indication information and that the set $i_{2,5,l}$ of the phase indication information of the reported $K^{NZ}-v$ weighting coefficients. It can be learned that, in a combination of these parameters, the case can be avoided where quantities of differential amplitude indication information and phase indication information, reported in the group 1, of weighting coefficients are negative values and quantities of differential amplitude indication information and phase indication information, reported in the group 2, of weighting coefficients exceed $K^{NZ}-v$.

This application further provides a channel state information reporting method 500. In the method 500, a network device determines and sends indication information. The indication information indicates an index of configuration information, and a value of the index of the configuration information is related to a quantity $N_f$ of frequency domain units. In some implementations, the indication information indicates configuration information, and a value of one or more parameters in the configuration information is related to a quantity $N_f$ of frequency domain units. Optionally, for a value of one or more parameters in configuration information corresponding to the index of the configuration information, refer to Table 1 in the following descriptions. Details are not described herein.

The configuration information includes one or more of a quantity L of space domain base vectors, a factor $p_v$ related to the quantity of frequency domain base vectors, and a scaling factor β of a quantity of weighting coefficients.

It can be learned that, in this implementation, the network device can consider the quantity $N_f$ of frequency domain units when indicating the index of the configuration information to a terminal device, to avoid a case that a quantity $\lceil K^{NZ}/2\rceil-v$ of weighting coefficients reported in a group 1 is less than 0 and a case that a quantity $\lfloor K^{NZ}/2\rfloor$ of weighting coefficients in a group 2 is greater than $K^{NZ}-v$.

The channel state information reporting method 500 is described from a perspective of the terminal device. In the method, the terminal device receives indication information, and reports a weighting coefficient based on the indication information. The indication information indicates an index of configuration information, and a value of the index of the configuration information is related to a quantity $N_f$ of frequency domain units. In some implementations, the indication information indicates configuration information, and a value of a parameter in the configuration information is related to a quantity $N_f$ of frequency domain units. Optionally, for a value of one or more parameters in configuration information corresponding to the index of the configuration information, refer to Table 1 in the following descriptions. Details are not described herein.

The configuration information includes one or more of a quantity L of space domain base vectors, a factor $p_v$ related to the quantity of frequency domain base vectors, and a scaling factor β of a quantity of weighting coefficients.

It can be learned that, in this implementation, the terminal device receives the index of the configuration information. This helps avoid a case that a quantity $\lceil K^{NZ}/2\rceil-v$ of weighting coefficients reported in a group 1 is less than 0 and a case that a quantity $\lfloor K^{NZ}/2\rfloor$ of weighting coefficients in a group 2 is greater than $K^{NZ}-v$.

In an optional implementation, that a value of the index of the configuration information is related to a quantity $N_f$ of frequency domain units may include one or more of the following:

when $N_f \geq 13$, a value of the indicated index of the configuration information is one of 1 to 8;

when $5 \leq N_f < 13$, a value of the indicated index of the configuration information is one of 2 to 8; or when $N_f < 5$, a value of the indicated index of the configuration information is one of 4 to 8.

In an optional implementation, that a value of the index of the configuration information is related to a quantity $N_f$ of frequency domain units may include one or more of the following:

when $N_f < 13$, a value of the indicated index of the configuration information is a value other than 1;

when $N_f < 5$, a value of the indicated index of the configuration information is a value other than 2, and/or a value of the indicated index of the configuration information is a value other than 3;

when $N_f < 13$, a value of the index of the configuration information being 1 is invalid, that is, the indicated index of the configuration information cannot be 1;

when $N_f < 5$, a value of the index of the configuration information being 2 is invalid, that is, the indicated index of the configuration information cannot be 2; or when $N_f<5$, a value of the index of the configuration information being 3 is invalid, that is, the indicated index of the configuration information cannot be 3.

This application further provides a channel state information reporting method 600. In the method 600, a terminal device receives indication information, where the indication information indicates an index of configuration information. Also in the method, the terminal device reports a quantity v of spatial layers based on the index of the configuration information, where a value range of the quantity v of spatial layers is related to a value of the index of the configuration information. Optionally, PMI information reported by the terminal device corresponds to the quantity v of spatial layers.

Alternatively, the indication information indicates configuration information, and a value of a parameter in the configuration information is related to a value range of the quantity v of spatial layers. Optionally, for a value of one or more parameters in the configuration information corresponding to the index of the configuration information, refer to Table 1 in the following descriptions. Details are not described herein.

The configuration information includes one or more of a quantity L of space domain base vectors, a factor $p_v$ related to the quantity of frequency domain base vectors, and a scaling factor β of a quantity of weighting coefficients.

It can be learned that, in this implementation, when determining a total quantity of to-be-reported weighting coefficients, the terminal device can determine the quantity v based on the value of the index of the configuration information, to avoid a case that a quantity $\lceil K^{NZ}/2 \rceil - v$ of weighting coefficients reported in a group 1 is less than 0 and a case that a quantity $\lfloor K^{NZ}/2 \rfloor$ of weighting coefficients in a group 2 is greater than $K^{NZ}-v$.

The channel state information reporting method 600 is described from a perspective of a network device. In the method, the network device may determine and send indication information, and then the network device may receive a quantity v of spatial layers that is reported by a terminal device. The indication information indicates an index of configuration information, or indicates configuration information. A value range of the quantity v of spatial layers is related to a value of the index of the configuration information. Optionally, PMI information reported by the terminal device corresponds to the quantity v of spatial layers.

The configuration information includes one or more of a quantity L of space domain base vectors, a factor $p_v$ related to the quantity of frequency domain base vectors, and a scaling factor β of a quantity of weighting coefficients. Optionally, for a value of one or more parameters in the configuration information corresponding to the index of the configuration information, refer to Table 1 in the following descriptions. Details are not described herein.

It can be learned that, in this implementation, when determining a total quantity of to-be-reported weighting coefficients, the terminal device can determine, based on the value of the index of the configuration information, the quantity v of spatial layers that is to be reported, so as to avoid a case that a quantity $\lceil K^{NZ}/2 \rceil - v$ of weighting coefficients reported in a group 1 is less than 0 and a case that a quantity $\lfloor K^{NZ}/2 \rfloor$ of weighting coefficients in a group 2 is greater than $K^{NZ}-v$. In this way, when the network device determines, based on the index of the configuration information, that the quantity v of spatial layers that is reported by the terminal device is invalid, the network device does not need to further interpret the indication information in a CSI part 2.

In an optional implementation, that a value range of the quantity v of spatial layers is related to a value of the index of the configuration information may include one or more of the following:

when a value of the indicated index of the configuration information is 1, the quantity v of spatial layers that is reported by the terminal device is equal to 1;

when a value of the indicated index of the configuration information is 2, the quantity v of spatial layers that is reported by the terminal device is equal to 1 or 2;

when a value of the indicated index of the configuration information is 3, the quantity v of spatial layers that is reported by the terminal device is equal to 1 or 2; or when a value of the indicated index of the configuration information is greater than 3, the quantity v of spatial layers that is reported by the terminal device is greater than or equal to 1 and is less than or equal to 4.

In other words, on the network device side, that a value range of the quantity v of spatial layers is related to a value of the index of the configuration information may include one or more of the following:

when a value of the indicated index of the configuration information is 1, the quantity v of spatial layers that is reported by the terminal device being greater than 1 is invalid;

when a value of the indicated index of the configuration information is 2, the quantity v of spatial layers that is reported by the terminal device being greater than 3 is invalid; or when a value of the indicated index of the configuration information is 3, the quantity v of spatial layers that is reported by the terminal device being greater than 3 is invalid.

This application further provides a channel state information reporting method 700. In the method 700, a terminal device may receive indication information, where the indication information indicates an index of configuration information. Also in the method, the terminal device reports a quantity v of spatial layers based on the indication information. A value range of the quantity v of spatial layers is related to a value of the index of the configuration information and/or a quantity $N_f$ of frequency domain units. Optionally, PMI information reported by the terminal device corresponds to the quantity v of spatial layers.

It can be learned that, in this implementation, when determining a total quantity of to-be-reported weighting coefficients, the terminal device can determine the quantity v based on the value of the index of the configuration information and/or the quantity $N_f$ of frequency domain units, so as to avoid a case that a quantity $\lceil K^{NZ}/2 \rceil - v$ of weighting coefficients reported in a group 1 is less than 0 and a case that a quantity $\lfloor K^{NZ}/2 \rfloor$ of weighting coefficients in a group 2 is greater than $K^{NZ}-v$.

The channel state information reporting method 700 is described from a perspective of a network device. In the method, the network device determines and sends indication information, where the indication information indicates an index of configuration information and then the network device may receive a quantity v of spatial layers that is reported by a terminal device.

In a manner, a value range of the quantity v of spatial layers is related to a value of the index of the configuration information and/or a quantity $N_f$ of frequency domain units. In another manner, a value range of the quantity v of spatial layers is related to a value of the index of the configuration information. Optionally, in the two manners, the value of the index of the configuration information is related to the quantity $N_f$ of frequency domain units. To be specific, the network device considers a constraint relationship between the value of the index of the configuration information and the quantity $N_f$ of frequency domain units when indicating the value of the index of the configuration information. Optionally, PMI information reported by the terminal device corresponds to the quantity v of spatial layers.

The configuration information includes one or more of a quantity L of space domain base vectors, a factor $p_v$ related to the quantity of frequency domain base vectors, and a scaling factor β of a quantity of weighting coefficients.

Optionally, the value of the index of the configuration information may alternatively be expressed as a value of one or more parameters in the configuration information. Optionally, for a value of one or more parameters in configuration information corresponding to the index of the configuration information, refer to Table 1 in the following descriptions. Details are not described herein.

It can be learned that, in this implementation, when determining a total quantity of to-be-reported weighting coefficients, the terminal device can determine the quantity v based on the value of the index of the configuration information and/or the quantity $N_f$ of frequency domain units, to avoid a case that a quantity $\lceil K^{NZ}/2 \rceil - v$ of weighting coefficients reported in a group 1 is less than 0 and a case that a quantity $\lfloor K^{NZ}/2 \rfloor$ of weighting coefficients in a group 2 is greater than $K^{NZ}-v$. In this way, when the network device determines, based on the index of the configuration information, that the quantity v of spatial layers that is reported by the terminal device is invalid, the network device does not need to further interpret indication information in a CSI part 2. Further, the network device may consider the constraint relationship between the value of the index of the configuration information and the quantity $N_f$ of frequency domain units when determining the indicated index of the configuration information, to avoid, to the maximum extent, a case that a quantity $\lceil K^{NZ}/2 \rceil - v$ of weighting coefficients in a group 1 reported by the terminal device is less than 0 and a case that a quantity $\lfloor K^{NZ}/2 \rfloor$ of weighting coefficients in a group 2 is greater than $K^{NZ}-v$.

The following describes optional implementations applicable to the method in the thirteenth aspect or the fourteenth aspect.

In an optional implementation, that a value range of the quantity v of spatial layers is related to a value of the index of the configuration information and/or a quantity $N_f$ of frequency domain units may include one or more of the following:

- when a value of the indicated index of the configuration information is 1 and $N_f \geq 13$, the quantity v of spatial layers that is reported by the terminal device needs to meet the following condition: $1 \leq v \leq 4$;
- when a value of the indicated index of the configuration information is 1 and $9 \leq N_f < 13$, the quantity v of spatial layers that is reported by the terminal device needs to meet the following condition: $1 \leq v \leq 3$;
- when a value of the indicated index of the configuration information is 1 and $5 \leq N_f < 9$, the quantity v of spatial layers that is reported by the terminal device needs to meet the following condition: $1 \leq v \leq 2$;
- when a value of the indicated index of the configuration information is 1 and $N_f < 5$, the quantity v of spatial layers that is reported by the terminal device needs to meet the following condition: $v=1$;
- when a value of the indicated index of the configuration information is 2 and $N_f \geq 5$, the quantity v of spatial layers that is reported by the terminal device needs to meet the following condition: $1 \leq v \leq 4$;
- when a value of the indicated index of the configuration information is 2 and $N_f < 5$, the quantity v of spatial layers that is reported by the terminal device needs to meet the following condition: $1 \leq v \leq 2$;
- when a value of the indicated index of the configuration information is 3 and $N_f \geq 5$, the quantity v of spatial layers that is reported by the terminal device needs to meet the following condition: $1 \leq v \leq 4$; or
- when a value of the indicated index of the configuration information is 3 and $N_f < 5$, the quantity v of spatial layers that is reported by the terminal device needs to meet the following condition: $1 < v < 2$.

In other words, on the network device side, that a value range of the quantity v of spatial layers is related to a value of the index of the configuration information and/or a quantity $N_f$ of frequency domain units may include one or more of the following:

- when a value of the indicated index of the configuration information is 1 and $9 < N_f < 13$, the quantity v of spatial layers that is reported by the terminal device being 4 is invalid;
- when a value of the indicated index of the configuration information is 1 and $5 < N_f < 9$, the quantity v of spatial layers that is reported by the terminal device being greater than 2 is invalid;
- when a value of the indicated index of the configuration information is 1 and $N_f < 5$, the quantity v of spatial layers that is reported by the terminal device being greater than 1 is invalid;
- when a value of the indicated index of the configuration information is 2 and $N_f < 5$, the quantity v of spatial layers that is reported by the terminal device being greater than 2 is invalid; or
- when a value of the indicated index of the configuration information is 3 and $N_f < 5$, the quantity v of spatial layers that is reported by the terminal device being greater than 2 is invalid.

In the foregoing embodiments provided in this application, the methods provided in embodiments of this application are described from the perspectives of the terminal device and the network device. To implement the functions in the methods provided in embodiments of this application, the terminal device and the network device may include a hardware structure and a software module, and implement the foregoing functions by using the hardware structure, the software module, or a combination of the hardware structure and the software module. A specific function of the foregoing functions may be performed by using the hardware structure, the software module, or the combination of the hardware structure and the software module. The following describes in detail a communication apparatus in embodiments of this application with reference to FIG. 10 to FIG. 12. The communication apparatus is a terminal device or a network device. Optionally, the communication apparatus may be an apparatus in a terminal device or a network device.

Figure 10:
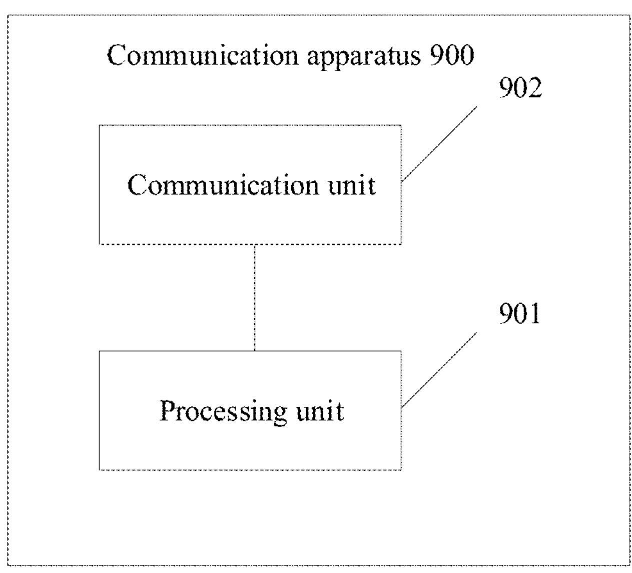
FIG. 10 is a schematic diagram of a structure of a communication apparatus 900 according to an embodiment of this application.

FIG. 10 is a schematic block diagram of a communication apparatus 900. The communication apparatus 900 may perform related operations of the terminal device in the foregoing method embodiments, and the communication apparatus 900 includes but is not limited to: a processing unit 901, configured to generate indication information and a communication unit 902 (e.g., communication circuit), configured to send the indication information.

Alternatively, the communication apparatus 900 may perform related operations of the network device in the foregoing method embodiments, and the communication apparatus 900 includes but is not limited to: a communication unit 902, configured to receive indication information; and a processing unit 901, configured to determine, based on the indication information, a weighting coefficient reported by a terminal device.

In an optional implementation, in the communication apparatus 900, the indication information may be implemented in the manner, the optional manner, or the like described in reference to the channel state information reporting method 100 or the channel state information reporting method 400. To be specific, the indication information includes a first group of indication information and a second group of indication information. The first group of indication information includes reference amplitude indication information corresponding to each spatial layer, and differential amplitude indication information and phase indication information of X weighting coefficients. The second group of indication information includes differential amplitude indication information and phase indication information of Y weighting coefficients. Both X and Y are integers. Values of X and Y are related to a first parameter, and a sum of X and Y is equal to $K^{NZ}-v$ or values of X and Y are related to a first parameter, and a sum of X and Y is equal to $\max(K^{NZ}-v, 0)$. $K^{NZ}$ is a total quantity of weighting coefficients correspondingly reported at all spatial layers, v is a quantity of spatial layers, $K^{NZ}$ is an integer, and v is a positive integer. It can be learned that, in this manner, a manner of allocating the differential amplitude indication information and the phase indication information of the $K^{NZ}-v$ weighting coefficients to the first group of indication information and the second group of indication information is determined based on the first parameter. This helps avoid a situation where a terminal device incorrectly groups to-be-reported differential amplitude indication information and phase indication information, and a network device cannot correctly interpret the differential amplitude indication information or the phase indication information of a reported weighting coefficient after receiving the indication information.

In another optional implementation, in the communication apparatus 900, the indication information may be implemented in the manner, the optional manner, or the like described in reference to the channel state information reporting method 200. To be specific, a difference between the indication information and the foregoing indication information lies in that a difference between X and Y is less than or equal to 1, and a sum of X and Y is equal to $K^{NZ}-v$ where $K^{NZ}$ is a total quantity of weighting coefficients correspondingly reported at all spatial layers, v is a quantity of spatial layers, $K^{NZ}$ is an integer, and v is a positive integer. It can be learned that the differential amplitude indication information and the phase indication information of the $K^{NZ}-v$ weighting coefficients are allocated to the first group of indication information and the second group of indication information as evenly as feasibly possible. This helps avoid a situation where a terminal device incorrectly groups to-be-reported differential amplitude indication information and phase indication information, and a network device cannot correctly the interpret differential amplitude indication information or the phase indication information of a reported weighting coefficient after receiving the CSI.

In still another optional implementation, in the communication apparatus 900, the indication information may be implemented in the manner, the optional manner, or the like described in reference to the channel state information reporting method 300. To be specific, the indication information includes amplitude indication information and phase indication information of $K^{NZ}$ weighting coefficients. A value of $K^{NZ}$ is related to $K_0$. $K^{NZ}$ is a total quantity of weighting coefficients correspondingly reported at all spatial layers. $K_0$ is configured by a network device and is used to determine a maximum value within a value range of $K^{NZ}$. Both $K^{NZ}$ and $K_0$ are integers.

For a related implementation of determining, by the communication apparatus, precoding matrices of N frequency domain resources based on M precoding indicators, refer to related descriptions in reference to the implementation 2.1 to the implementation 2.3 and the implementation 3.1 to the implementation 3.3 in the foregoing method embodiments. Details are not described herein again. It can be learned that, in this manner, 2v weighting coefficients can be reported when an upper limit, configured by the network device, of a quantity of to-be-reported weighting coefficients is excessively small. For example, when v>1 and $K_0$<v, or when v=1 and $K_0$<2v. This helps avoid the situation where a quantity of reported weighting coefficients is excessively small. Consequently, a quantity of weighting coefficients included in one group of indication information in a CSI part 2 is a negative value, and a quantity of weighting coefficients included in another group of indication information exceeds a predetermined total quantity of to-be-reported weighting coefficients. In addition, this further helps avoid an unavailability of some polarization directions of some spatial layers due to a reporting of an excessively small quantity of weighting coefficients, and therefore ensures availability of each polarization direction of each spatial layer to the maximum feasible extent.

Optionally, the communication apparatus 900 may alternatively perform the solutions described in the channel state information reporting method 500 to the channel state information reporting method 700. Details are not described herein again.

Figures 11, 12:
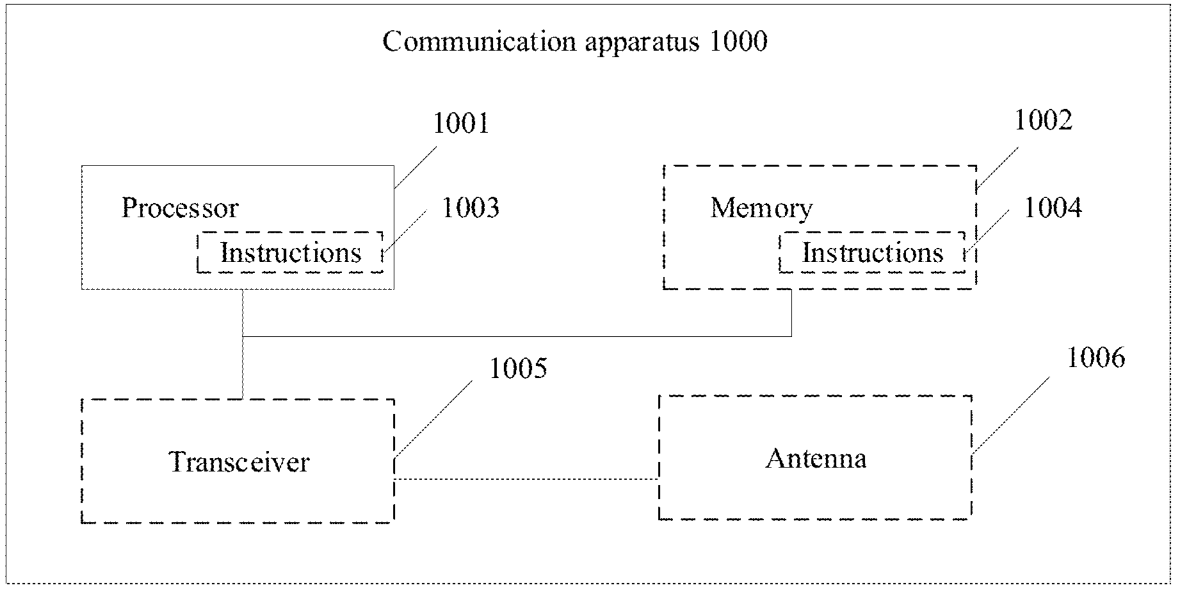
FIG. 11 is a schematic diagram of a structure of a communication apparatus 1000 according to an embodiment of this application.
FIG. 12 is a schematic diagram of a structure of a chip according to an embodiment of this application.

FIG. 11 is a schematic block diagram of a communication apparatus 1000.

In an implementation, the communication apparatus 1000 corresponds to the terminal device in the foregoing channel state information reporting method. Optionally, the communication apparatus 1000 is an apparatus, such as a chip, a chip system, or a processor, in a terminal device for performing the foregoing method embodiments. The communication apparatus 1000 may be configured to implement the methods described in the foregoing method embodiments. For details, refer to the descriptions in the foregoing method embodiments.

In another implementation, the communication apparatus 1000 corresponds to the network device in the foregoing channel state information reporting method. Optionally, the communication apparatus 1000 is an apparatus, such as a chip, a chip system, or a processor, in a network device for performing the foregoing method embodiments. The communication apparatus 1000 may be configured to implement the methods described in the foregoing method embodiments. For details, refer to the descriptions in the foregoing method embodiments.

The communication apparatus 1000 may include one or more processors 1001. The processor 1001 may be a general-purpose processor, a dedicated processor, or the like. For example, the processor 1001 may be a baseband processor or a central processing unit. The baseband processor may be configured to process a communication protocol and communication data. The central processing unit may be configured to control a communication apparatus (for example, a base station, a baseband chip, a terminal, a terminal chip, a DU, or a CU), execute a computer program, and process data of the computer program.

The communication apparatus 1000 may further include a transceiver 1005. The transceiver 1005 may be referred to as a transceiver unit, a transceiver device, a transceiver circuit, or the like, and is configured to implement a receiving function and a sending function. The transceiver 1005 may include a receiver and a transmitter. The receiver may be referred to as a receiving device, a receiver circuit, or the like, and is configured to implement the receiving function. The transmitter may be referred to as a transmitting device, a transmitter circuit, or the like, and is configured to implement the sending function. Optionally, the communication apparatus 1000 may further include an antenna 1006.

Optionally, the communication apparatus 1000 may include one or more memories 1002. The memory 1002 may store instructions 1004. The instructions 1004 may be a computer program. The computer program may be run on the communication apparatus 1000, so that the communication apparatus 1000 performs the methods described in the foregoing method embodiments. Optionally, the memory 1002 may further store data. The communication apparatus 1000 and the memory 1002 may be separately disposed or integrated.

In an implementation, the communication apparatus 1000 is configured to implement the functions of the terminal device in the foregoing method embodiments:

The processor 1001 is configured to perform step S101 in FIG. 2, step S201 in FIG. 5, step S301 in FIG. 7, or step S401 in FIG. 9.

The transceiver 1005 is configured to perform step S102 in FIG. 2, step S202 in FIG. 5, step S302 in FIG. 7, or step S402 in FIG. 9.

In another implementation, the communication apparatus 1000 is configured to implement the functions of the network device in the foregoing method embodiments:

The transceiver 1005 is configured to perform step S103 in FIG. 2, step S203 in FIG. 5, step S303 in FIG. 7, or step S403 in FIG. 9.

The processor 1001 is configured to perform step S104 in FIG. 2, step S204 in FIG. 5, step S304 in FIG. 7, or step S404 in FIG. 9.

In an implementation, the processor 1001 may include a transceiver for implementing a receiving function and a sending function. For example, the transceiver may be a transceiver circuit, an interface, or an interface circuit. A transceiver circuit, an interface, or an interface circuit for implementing the receiving function and that for implementing the sending function may be separated or integrated. The transceiver circuit, the interface, or the interface circuit may be configured to read and write code/data or the transceiver circuit, the interface, or the interface circuit may be configured to transmit or transfer a signal.

In an implementation, the processor 1001 may store instructions 1003. The instructions may be a computer program. The computer program 1003 is run (e.g., executed) on the processor 1001, so that the communication apparatus 1000 performs the methods described in the foregoing method embodiments. The computer program 1003 may be permanently configured in the processor 1001. In this case, the processor 1001 may be implemented by using hardware.

In an implementation, the communication apparatus 1000 may include a circuit, and the circuit may implement the sending, receiving, or communication function in the foregoing method embodiments. The processor and the transceiver described in this application may be implemented in an integrated circuit (IC), an analog IC, a radio frequency integrated circuit (RFIC), a mixed-signal IC, an application-specific integrated circuit (ASIC), a printed circuit board (PCB), an electronic device, or the like. The processor and the transceiver may alternatively be manufactured by using various IC process technologies, for example, a complementary metal oxide semiconductor (CMOS), an N-channel metal oxide semiconductor (NMOS), a P-channel metal oxide semiconductor (PMOS), a bipolar junction transistor (BJT), a bipolar CMOS (BiCMOS), silicon germanium (SiGe), or gallium arsenide (GaAs).

The communication apparatus described in the foregoing embodiments may be an access point (AP) multi-link device (MLD) or an AP of an AP MLD. However, a scope of the communication apparatus described in this application is not limited thereto, and a structure of the communication apparatus may not be limited by FIG. 12. The communication apparatus may be an independent device, or may be a part of a large device. For example, the communication apparatus may be:

(1) an independent integrated circuit (IC), a chip, or a chip system or subsystem;

(2) a set including one or more ICs, where optionally, the set of ICs may also include a storage component for storing data and a computer program;

(3) an ASIC, such as a modem;

(4) a module that can be embedded in another device;

(5) a receiver, a terminal device, an intelligent terminal, a cellular phone, a wireless device, a handheld device, a mobile unit, a vehicle-mounted device, a network device, a cloud device, an artificial intelligence device, or the like; or (6) others.

For a case in which the communication apparatus may be a chip or a chip system, refer to a schematic diagram of a structure of a chip shown in FIG. 12. The chip shown in FIG. 12 includes a processor 1101 and an interface 1102. There may be one or more processors 1101, and there may be a plurality of interfaces 1102.

The chip is configured to implement the functions of the terminal device in the foregoing method embodiments:

The processor 1101 is configured to perform step S101 in FIG. 2, step S201 in FIG. 5, step S301 in FIG. 7, or step S401 in FIG. 9.

The interface 1102 is configured to perform step S102 in FIG. 2, step S202 in FIG. 5, step S302 in FIG. 7, or step S402 in FIG. 9.

Optionally, the chip may alternatively perform the functions of the network device in the foregoing method embodiments:

The transceiver 1105 is configured to perform step S103 in FIG. 2, step S203 in FIG. 5, step S303 in FIG. 7, or step S403 in FIG. 9.

The processor 1101 is configured to perform step S104 in FIG. 2, step S204 in FIG. 5, step S304 in FIG. 7, or step S404 in FIG. 9.

Optionally, the chip may alternatively perform related implementations in the foregoing method embodiments. Details are not described herein again. For example, optionally, the communication apparatus 1000 may alternatively perform the solutions described in the channel state information reporting method 500 to the channel state information reporting method 700. Details are not described herein again.

A person skilled in the art can further understand that various illustrative logical blocks and steps that are listed in embodiments of this application may be implemented by electronic hardware, computer software, or a combination thereof. Whether the functions are implemented by hardware or software depends on particular applications and a design requirement of an entire system. A person skilled in the art may use various methods to implement the functions for each particular application, but it should not be considered that the implementation goes beyond the scope of embodiments of this application.

This application further provides a computer-readable storage medium. The computer-readable storage medium stores a computer program. When the computer-readable storage medium is executed by a computer, the functions in any one of the foregoing method embodiments are implemented.

This application further provides a computer program product. When the computer program product is executed by a computer, the functions in any one of the foregoing method embodiments are implemented.

All or some of the foregoing embodiments may be implemented by software, hardware, firmware, or any combination thereof. When software is used to implement the embodiments, all or some of the embodiments may be implemented in a form of a computer program product. The computer program product includes one or more computer programs. When the computer program is loaded and executed on a computer, all or some of the processes or the functions according to embodiments of this application are generated. The computer may be a general-purpose computer, a dedicated computer, a computer network, or another programmable apparatus. The computer program may be stored in a computer-readable storage medium, or may be transmitted from a computer-readable storage medium to another computer-readable storage medium. For example, the computer program may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The correspondences shown in the tables illustrated in this application may be configured or predefined (e.g., predetermined). The values of the information in the tables are merely examples, and other values may be configured. This is not limited in this application. When correspondences between information and parameters are configured, not all the correspondences shown in the tables need to be configured. For example, in the tables illustrated in this application, correspondences shown in some rows may alternatively not be configured. For another example, proper variations and adjustments such as splitting and combination may be performed based on the tables. Names of the parameters shown in the titles of the tables may alternatively be other names that can be understood by a communication apparatus, and values or representation manners of the parameters may alternatively be other values or representation manners that can be understood by the communication apparatus. During implementation of the tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "define in advance", "store", "prestore", "pre-negotiate", "preconfigure", "predetermined", "solidify", or "pre-burn".

A person of ordinary skill in the art may be aware that, in combination with examples described in embodiments disclosed in this specification, units and algorithm steps can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

It can be clearly understood by a person skilled in the art that, for ease and brevity of description, for a detailed operating process of the foregoing system, apparatus, and unit, reference may be made to a corresponding process in the foregoing method embodiments, and details are not described herein again.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel state information reporting method comprising:

generating indication information comprising a first group of indication information and a second group of indication information, wherein:

the first group of indication information comprises reference amplitude indication information corresponding to each spatial layer of a precoding matrix, and differential amplitude indication information and phase indication information of X weighting coefficients;

the second group of indication information comprises differential amplitude indication information and phase indication information of Y weighting coefficients; and values of X and Y are related to a first parameter, a sum of X and Y is equal to K-v, K is a total quantity of weighting coefficients correspondingly reported at all of the spatial layers, v is a quantity of the spatial layers, K is an integer, X is an integer that is not less than 0, Y is a positive integer, and v is a positive integer; and sending the indication information.

2. The method according to claim 1, wherein the first parameter is $\lceil K/2 \rceil - v$.

3. The method according to claim 2, wherein when $\lceil K/2 \rceil - v \leq 0$ or $\lceil K/2 \rceil - v < 0$, X is equal to 0, and Y is equal to K-v.

4. The method according to claim 2, wherein when $\lceil K/2 \rceil - v \geq 0$ or $\lceil K/2 \rceil - v > 0$, X is equal to $\lceil K/2 \rceil - v$, and Y is equal to $\lceil K/2 \rceil$.

5. The method according to claim 1, wherein the first parameter is $\lceil K/2 \rceil$.

6. The method according to claim 5, wherein when $\lceil K/2 \rceil \geq v$ or $\lceil K/2 \rceil < v$, X is equal to 0, and Y is equal to K−v.

7. A communication apparatus comprising: at least one processor, and one or more memories communicatively coupled to the at least one processor and being configured to store programming instructions for execution by the at least one processor to perform operations comprising:

generating indication information comprising a first group of indication information and a second group of indication information, wherein:

the first group of indication information comprises reference amplitude indication information corresponding to each spatial layer of a precoding matrix, and differential amplitude indication information and phase indication information of X weighting coefficients;

the second group of indication information comprises differential amplitude indication information and phase indication information of Y weighting coefficients; and values of X and Y are related to a first parameter, a sum of X and Y is equal to K−v, K is a total quantity of weighting coefficients correspondingly reported at all of the spatial layers, v is a quantity of the spatial layers, K is an integer, X is an integer that is not less than 0, Y is a positive integer, and v is a positive integer; and sending the indication information.

8. The apparatus according to claim 7, wherein the first parameter is $\lceil K/2 \rceil - v$.

9. The apparatus according to claim 8, wherein $\lceil K/2 \rceil - v \leq 0$ or $\lceil K/2 \rceil - v < 0$, X is equal to 0, and Y is equal to K−v.

10. The apparatus according to claim 8, wherein when $\lceil K/2 \rceil - v \geq 0$ or $\lceil K/2 \rceil - v > 0$, X is equal to $\lceil K/2 \rceil - v$, and Y is equal to $\lceil K/2 \rceil$.

11. The apparatus according to claim 7, wherein the first parameter is $\lceil K/2 \rceil$.

12. The apparatus according to claim 11, wherein when $\lceil K/2 \rceil \leq v$ or $\lceil K/2 \rceil < v$, X is equal to 0, and Y is equal to K−v.

13. The apparatus according to claim 11, wherein when $\lceil K/2 \rceil \geq v$ or $\lceil K/2 \rceil > v$, X is equal to K−v, and Y is equal to K/2.

14. A communication apparatus comprising: at least one processor, and one or more memories communicatively coupled to the at least one processor and being configured to store programming instructions for execution by the at least one processor to perform operations comprising:

receiving indication information comprising a first group of indication information and a second group of indication information, wherein:

the first group of indication information comprises reference amplitude indication information corresponding to each spatial layer of a precoding matrix, and differential amplitude indication information and phase indication information of X weighting coefficients;

the second group of indication information comprises differential amplitude indication information and phase indication information of Y weighting coefficients; and values of X and Y are related to a first parameter, a sum of X and Y is equal to K−v, K is a total quantity of weighting coefficients correspondingly reported at all of the spatial layers, v is a quantity of the spatial layers, K is an integer, X is an integer that is not less than 0, Y is a positive integer, and v is a positive integer; and determining, based on the indication information, a weighting coefficient correspondingly reported by a terminal device.

15. The apparatus according to claim 14, wherein the first parameter is $\lceil K/2 \rceil - v$.

16. The apparatus according to claim 15, wherein when $\lceil K/2 \rceil - v \leq 0$ or $\lceil K/2 \rceil - v < 0$, X is equal to 0, and Y is equal to K−v.

17. The apparatus according to claim 14, wherein when $\lceil K/2 \rceil - v \geq 0$ or $\lceil K/2 \rceil - v > 0$, X is equal to $\lceil K/2 \rceil - v$, and Y is equal to $\lceil K/2 \rceil$.

18. The apparatus according to claim 14, wherein the first parameter is $\lceil K/2 \rceil$.

19. The apparatus according to claim 18, wherein when $\lceil K/2 \rceil \leq v$ or $\lceil K/2 \rceil < v$, X is equal to 0, and Y is equal to K−v.

20. The apparatus according to claim 18, wherein when $\lceil K/2 \rceil \geq v$ or $\lceil K/2 \rceil > 0$, X is equal to K−v, and Y is equal to K/2.

* * * * *